United States Patent
Lam et al.

(10) Patent No.: US 8,762,609 B1
(45) Date of Patent: Jun. 24, 2014

(54) SYSTEM AND METHOD FOR MULTIENGINE OPERATION WITH SUPER DESCRIPTOR IN SAS/SATA CONTROLLER WHEREIN PORTION OF SUPER-DESCRIPTOR IS EXECUTED WITHOUT INTERVENTION OF INITIATOR

(75) Inventors: Raymond Lam, Vancouver (CA); Cheng Yi, Vancouver (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 157 days.

(21) Appl. No.: 13/288,599

(22) Filed: Nov. 3, 2011

Related U.S. Application Data

(60) Provisional application No. 61/409,764, filed on Nov. 3, 2010, provisional application No. 61/409,656, filed on Nov. 3, 2010.

(51) Int. Cl.
*G06F 13/14* (2006.01)

(52) U.S. Cl.
USPC ............... 710/74; 710/22; 710/72; 710/73; 718/106

(58) Field of Classification Search
USPC ................................ 710/22, 72–74
See application file for complete search history.

(56) References Cited

U.S. PATENT DOCUMENTS

| | | | |
|---|---|---|---|
| 6,993,472 B2 | 1/2006 | Redpath | |
| 7,089,559 B2 | 8/2006 | Redpath | |
| 7,954,023 B2 * | 5/2011 | Otsuga et al. | 714/726 |
| 8,200,934 B2 * | 6/2012 | Kasahara et al. | 711/168 |
| 8,271,700 B1 * | 9/2012 | Annem et al. | 710/26 |

* cited by examiner

*Primary Examiner* — Tammara Peyton
(74) *Attorney, Agent, or Firm* — Dennis R. Haszko

(57) ABSTRACT

A method of chaining a plurality of engines for a system on chip (SOC) controller device and a SOC controller device are disclosed herein. The method comprises: generating, at an initiator, a super-descriptor for providing instructions to the plurality of engines of the SOC controller; passing the super-descriptor from the initiator to a first engine of the plurality of engines; and executing a portion of the super-descriptor at each of the plurality of engines in series without the intervention of the initiator.

20 Claims, 48 Drawing Sheets

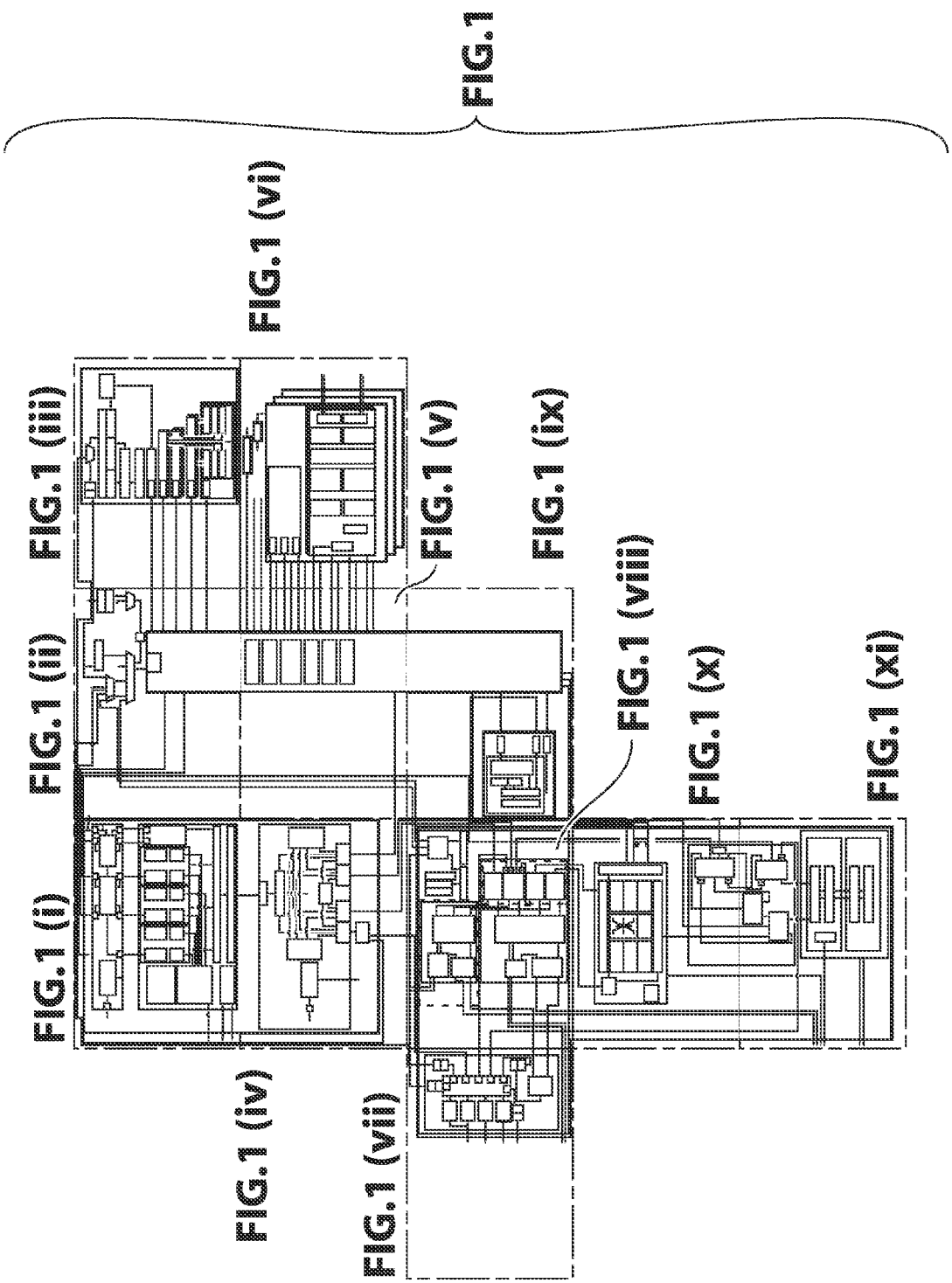

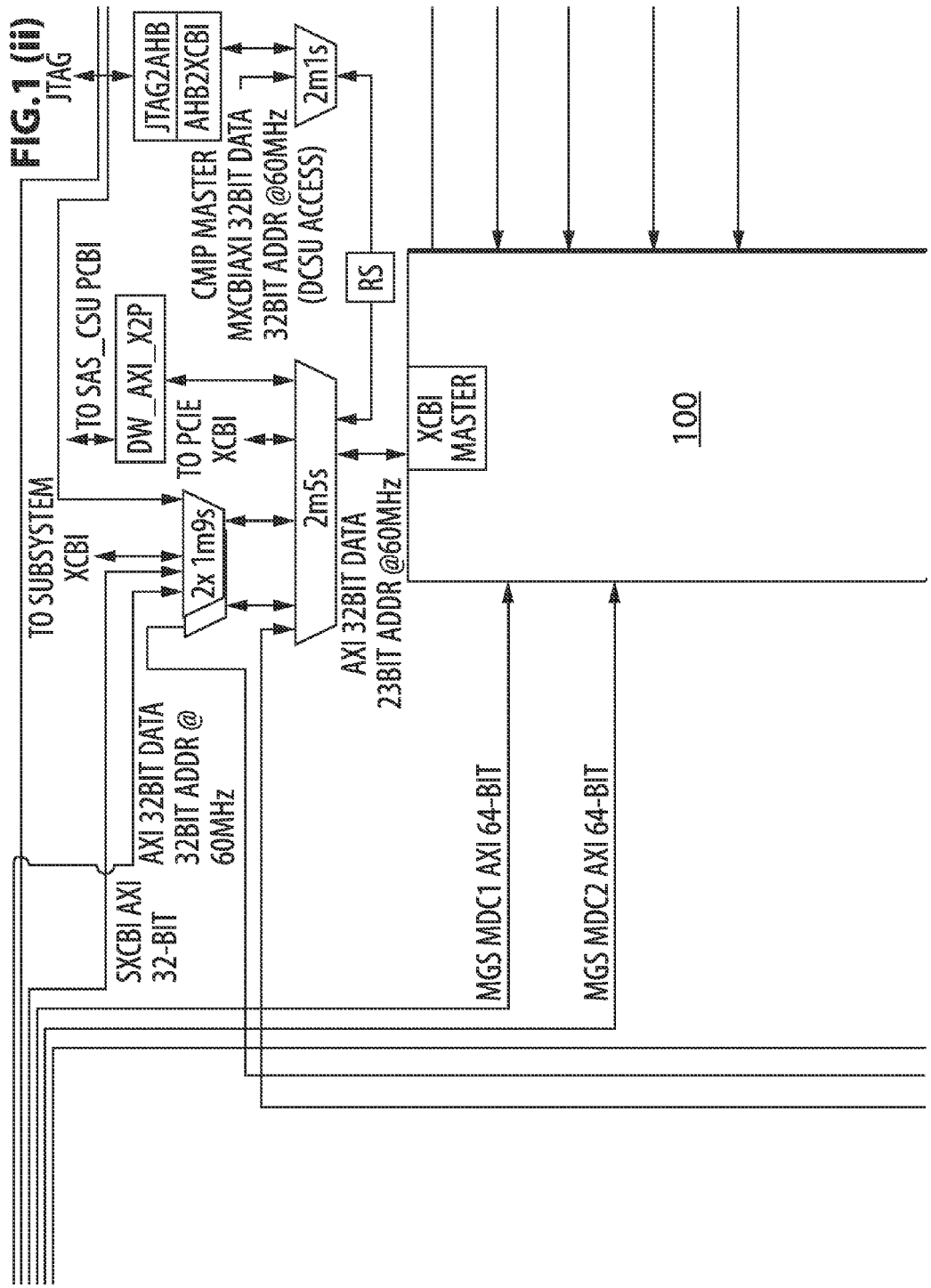

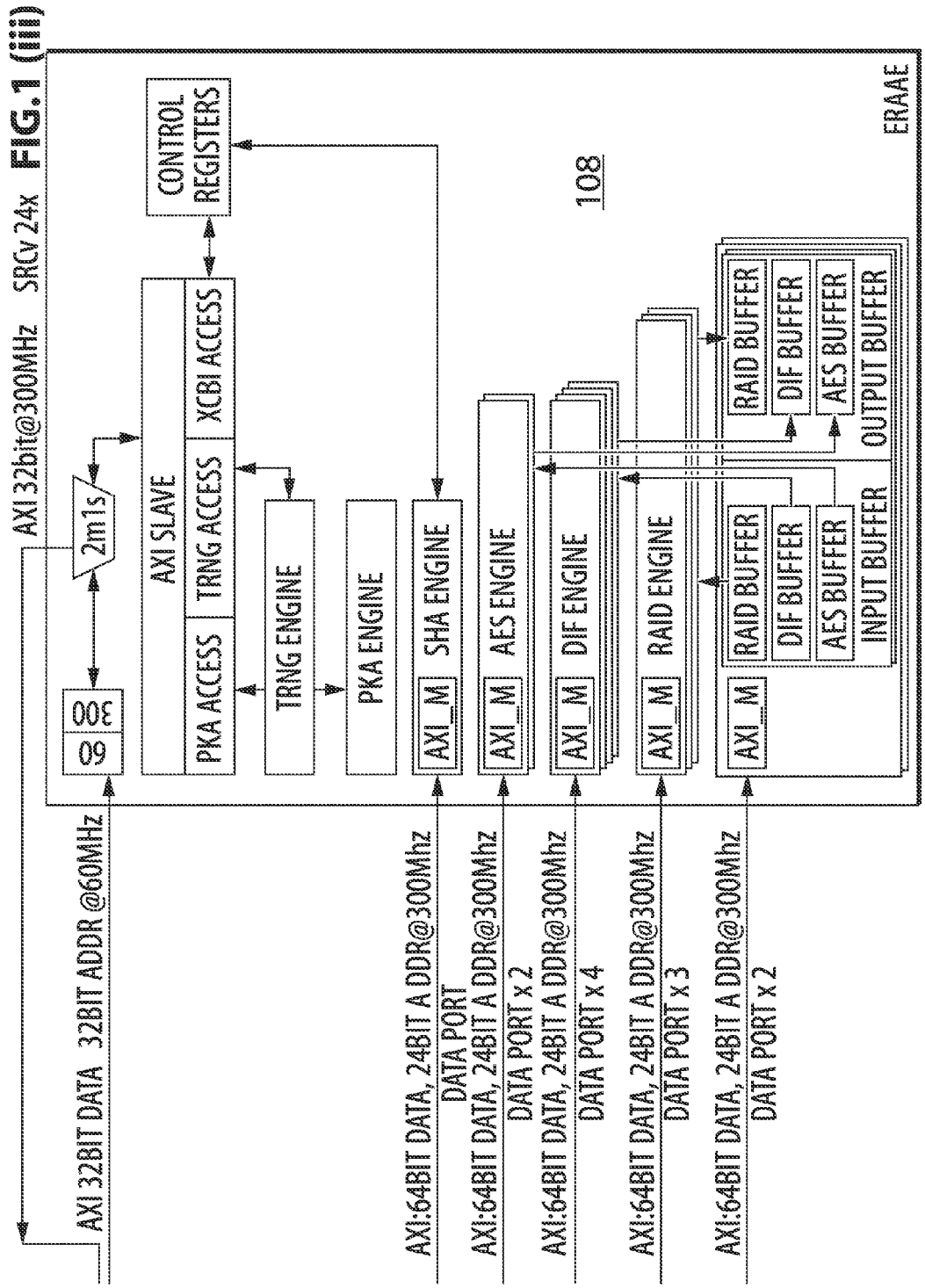
FIG. 1 (iii)

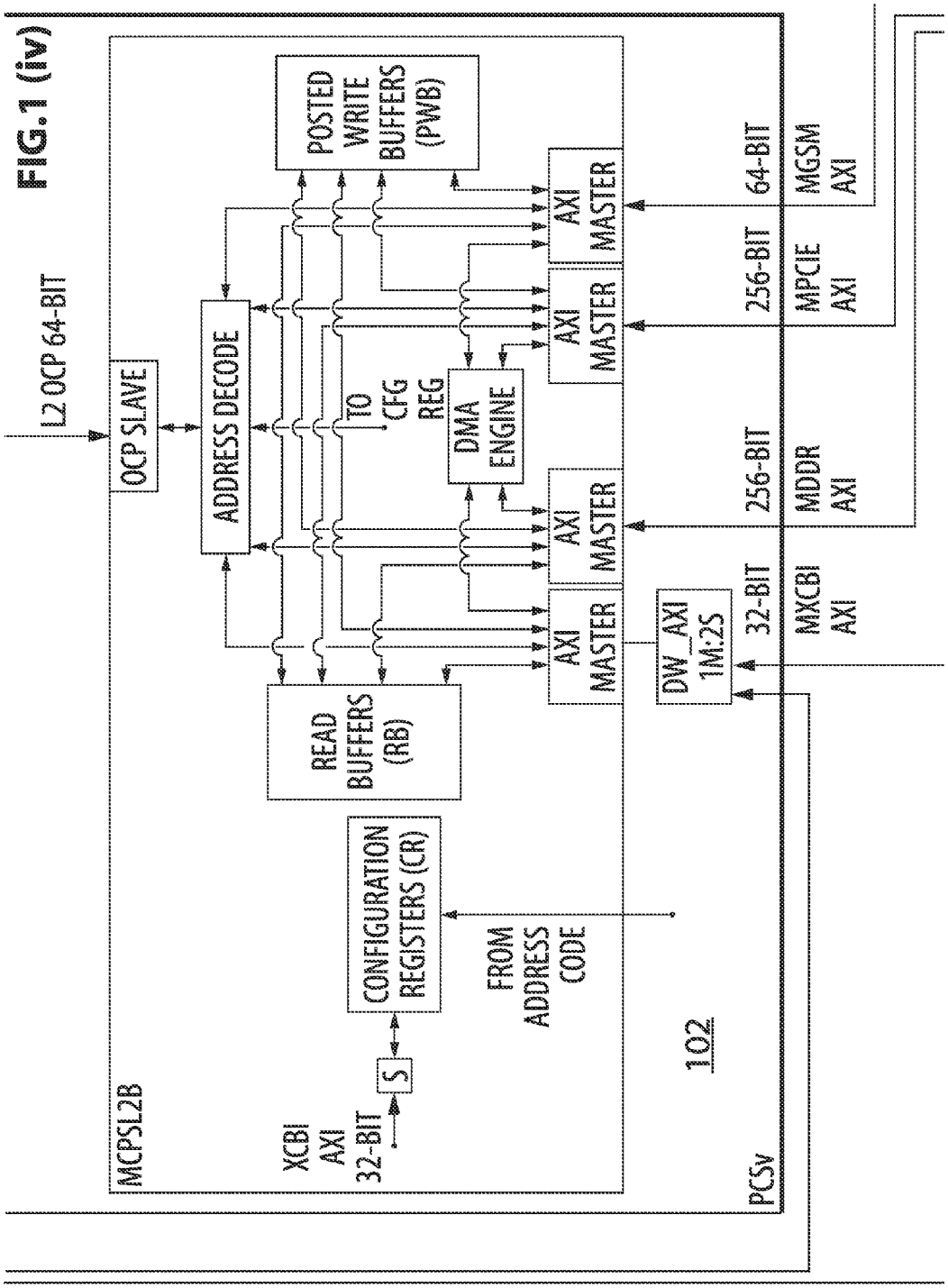

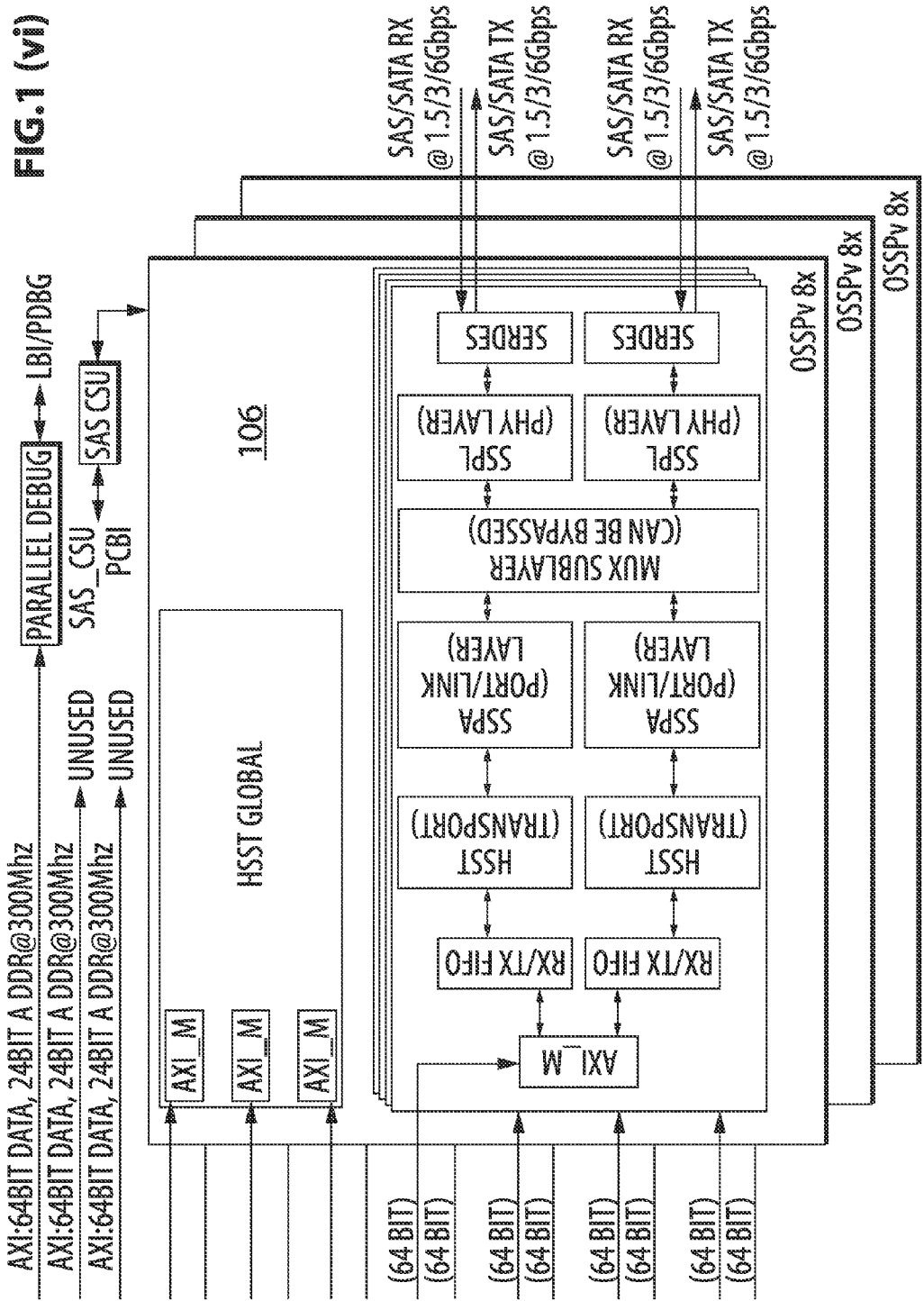
FIG.1 (vi)

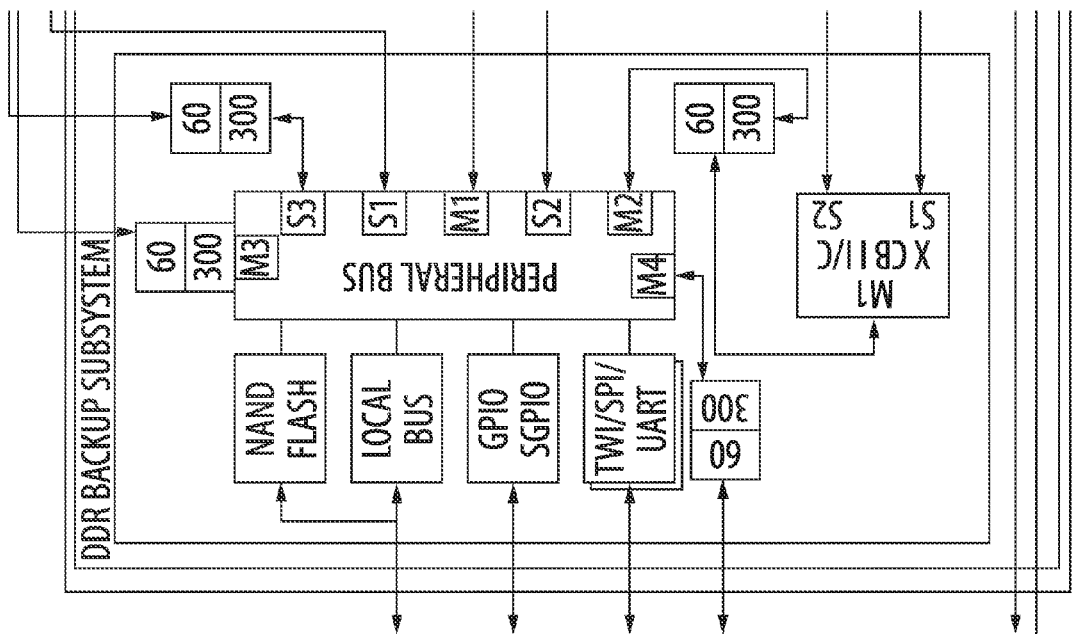
FIG.1 (vii)

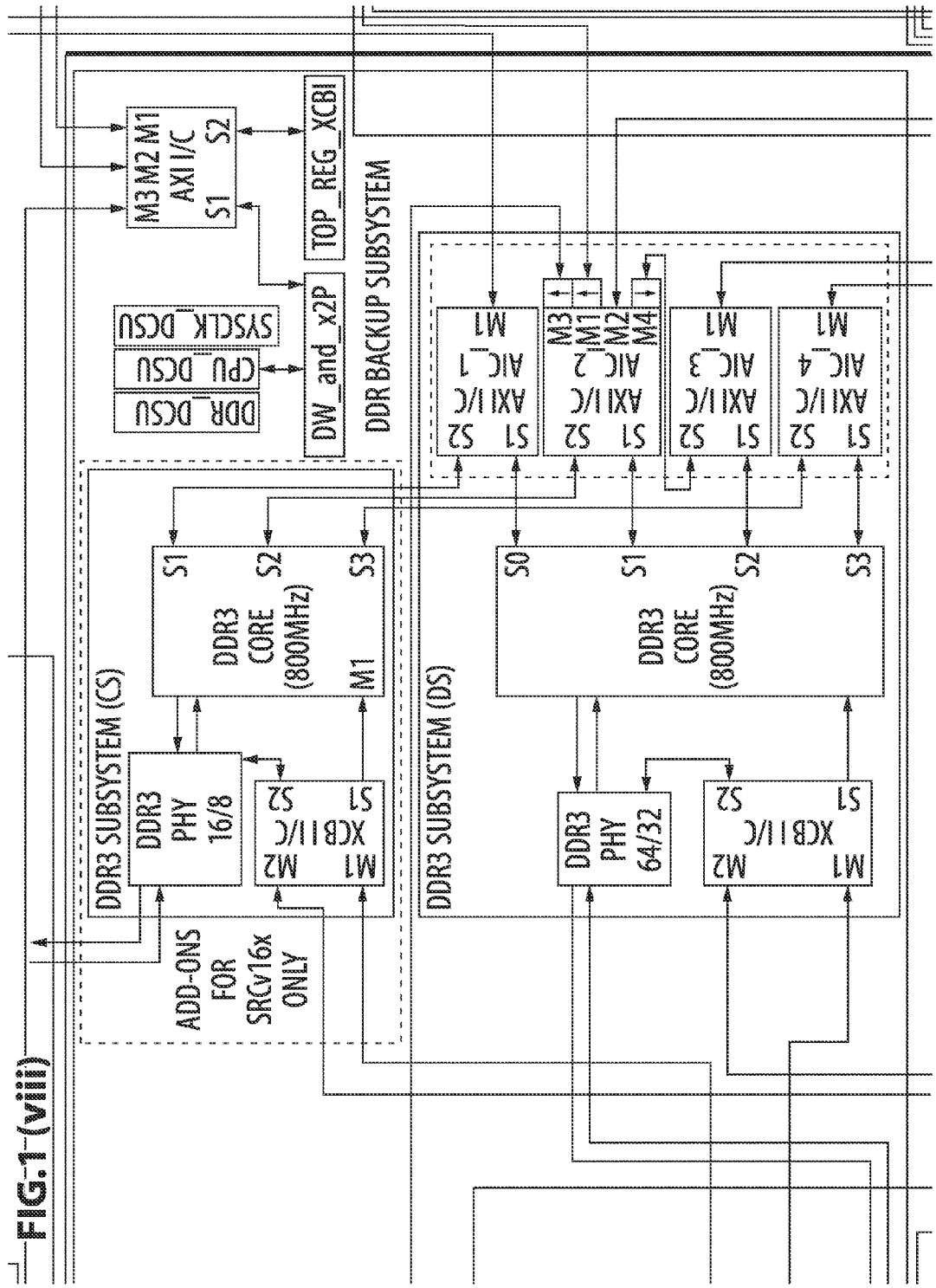

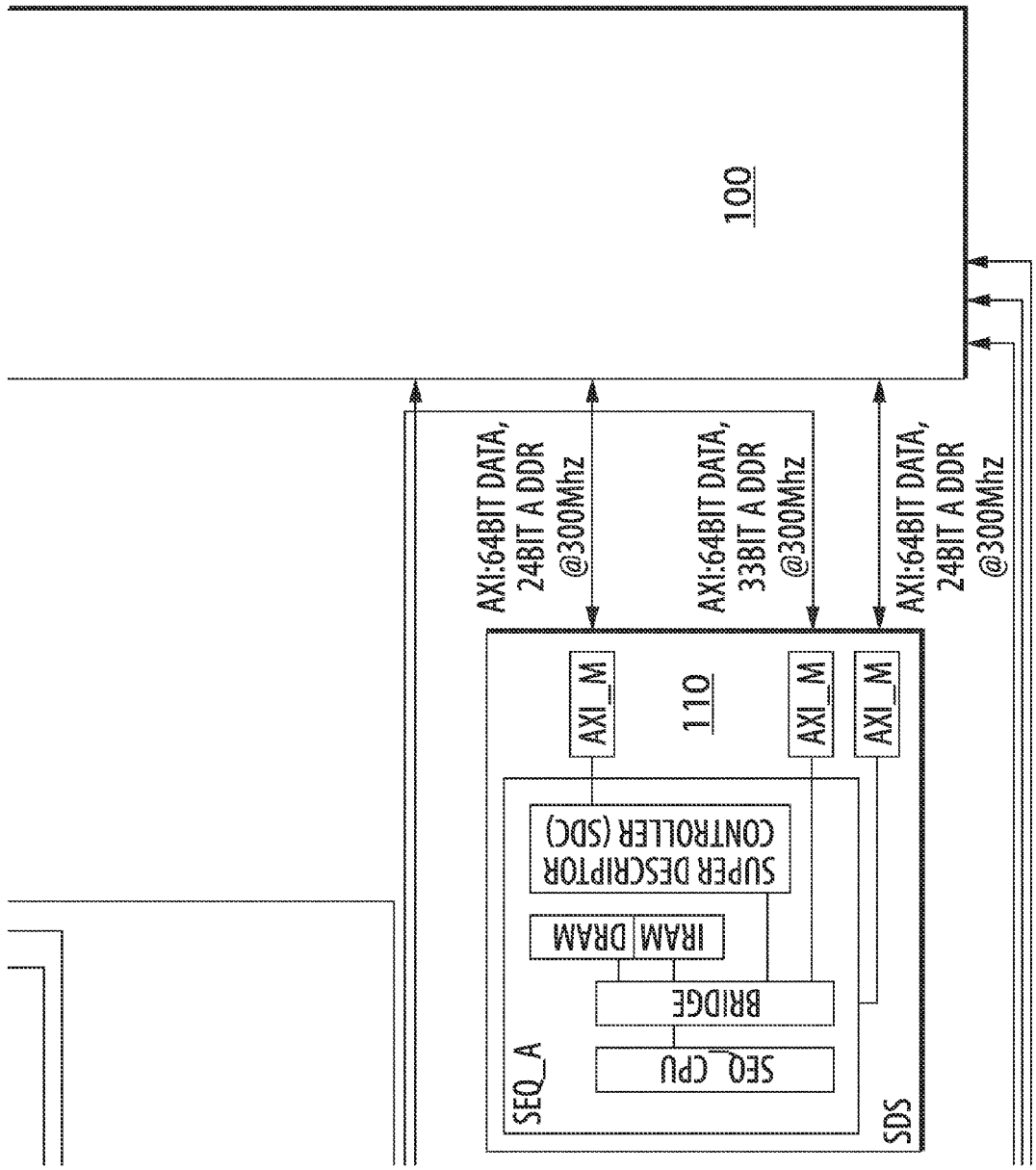
FIG. 1 (ix)

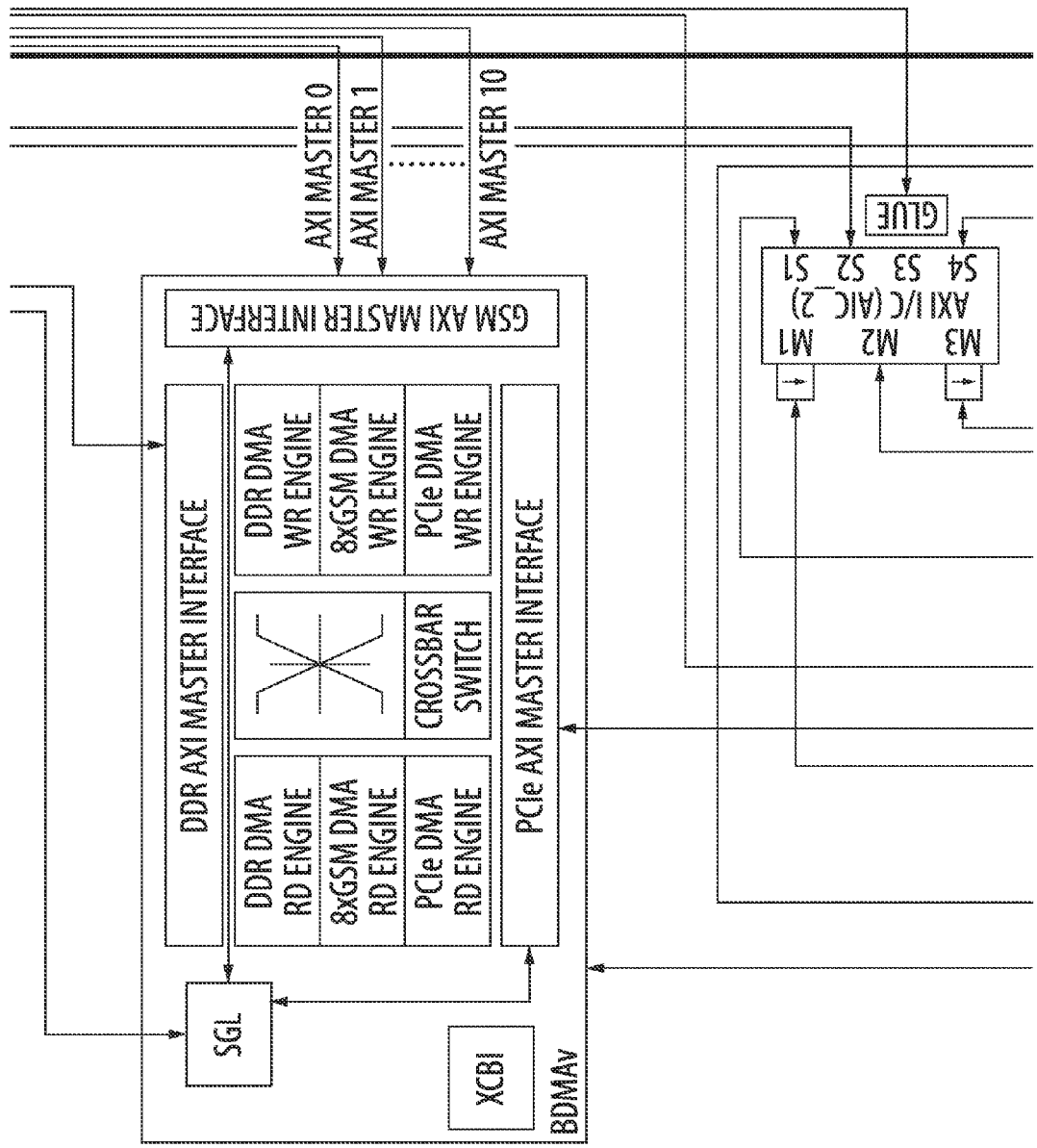

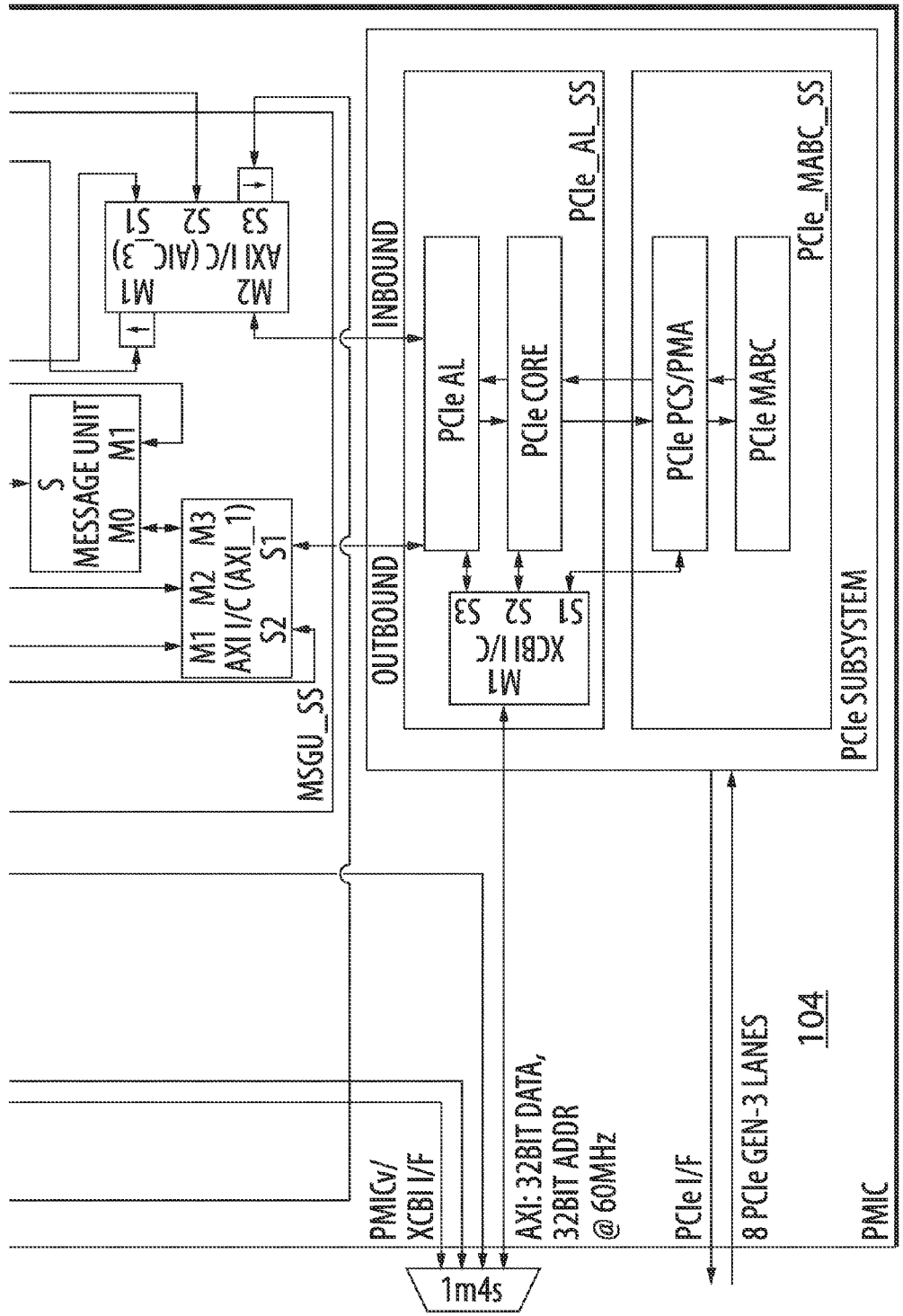
FIG. 1 (xi)

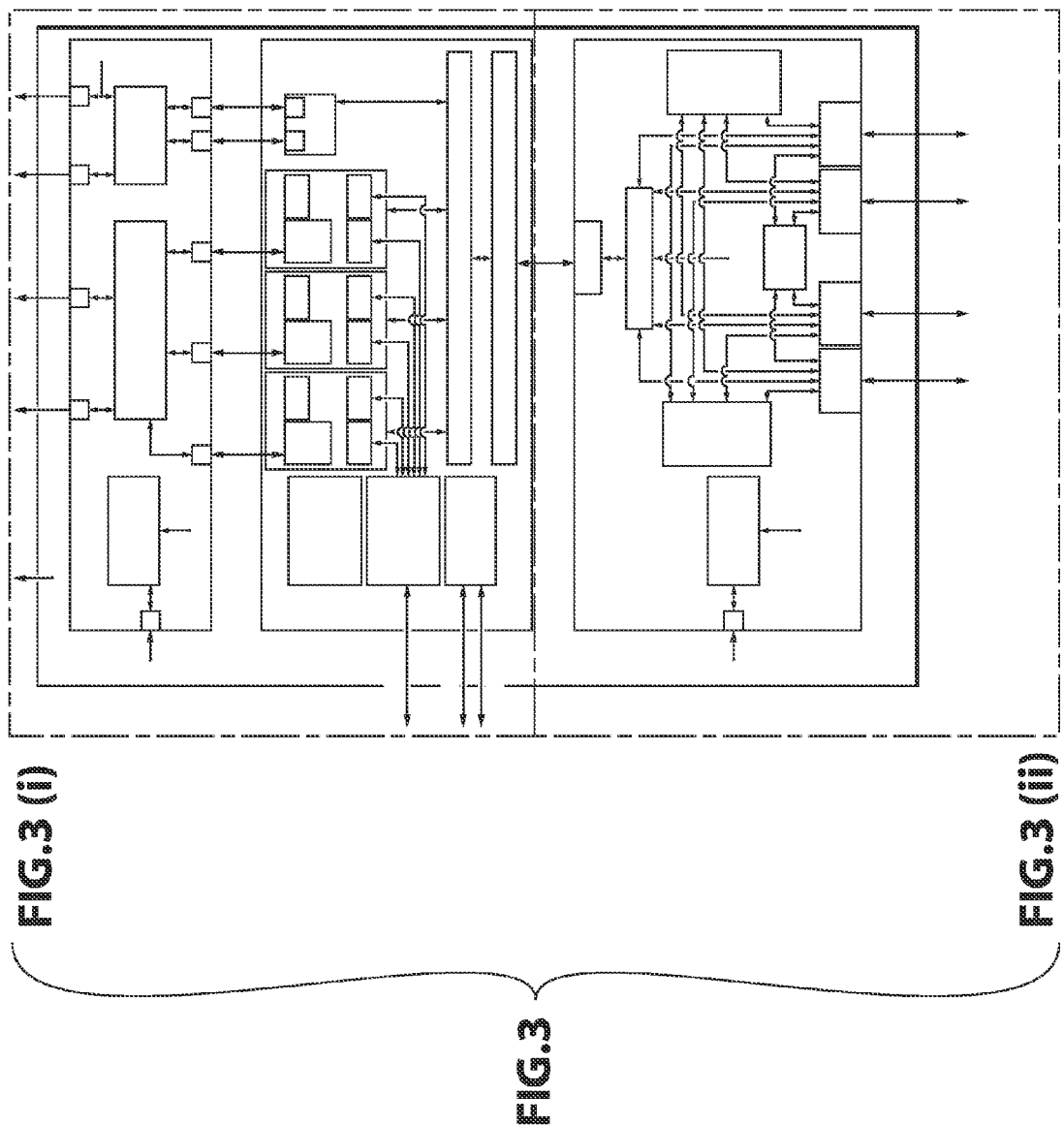

FIG.3 (i) 102

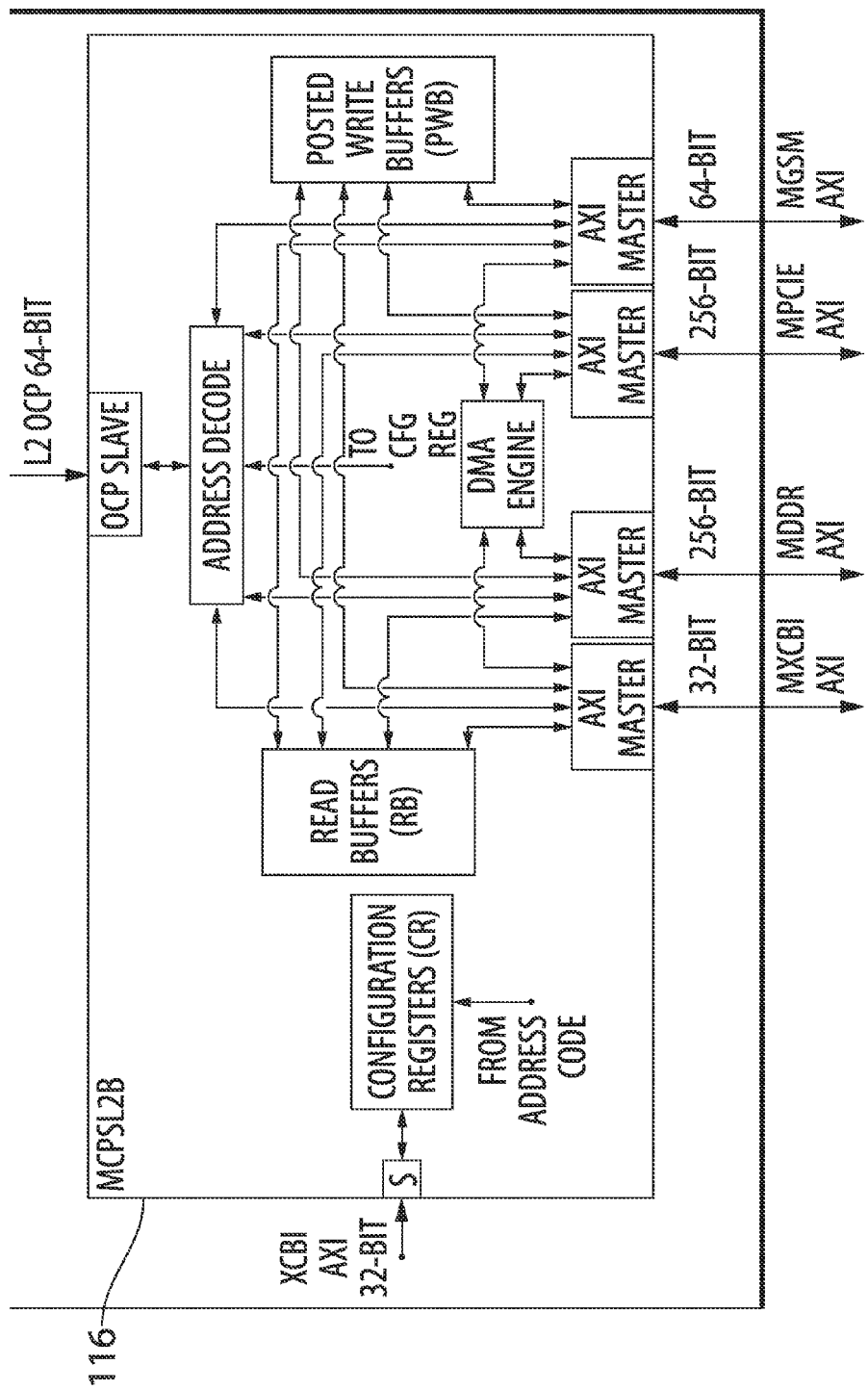
FIG. 3 (iii)

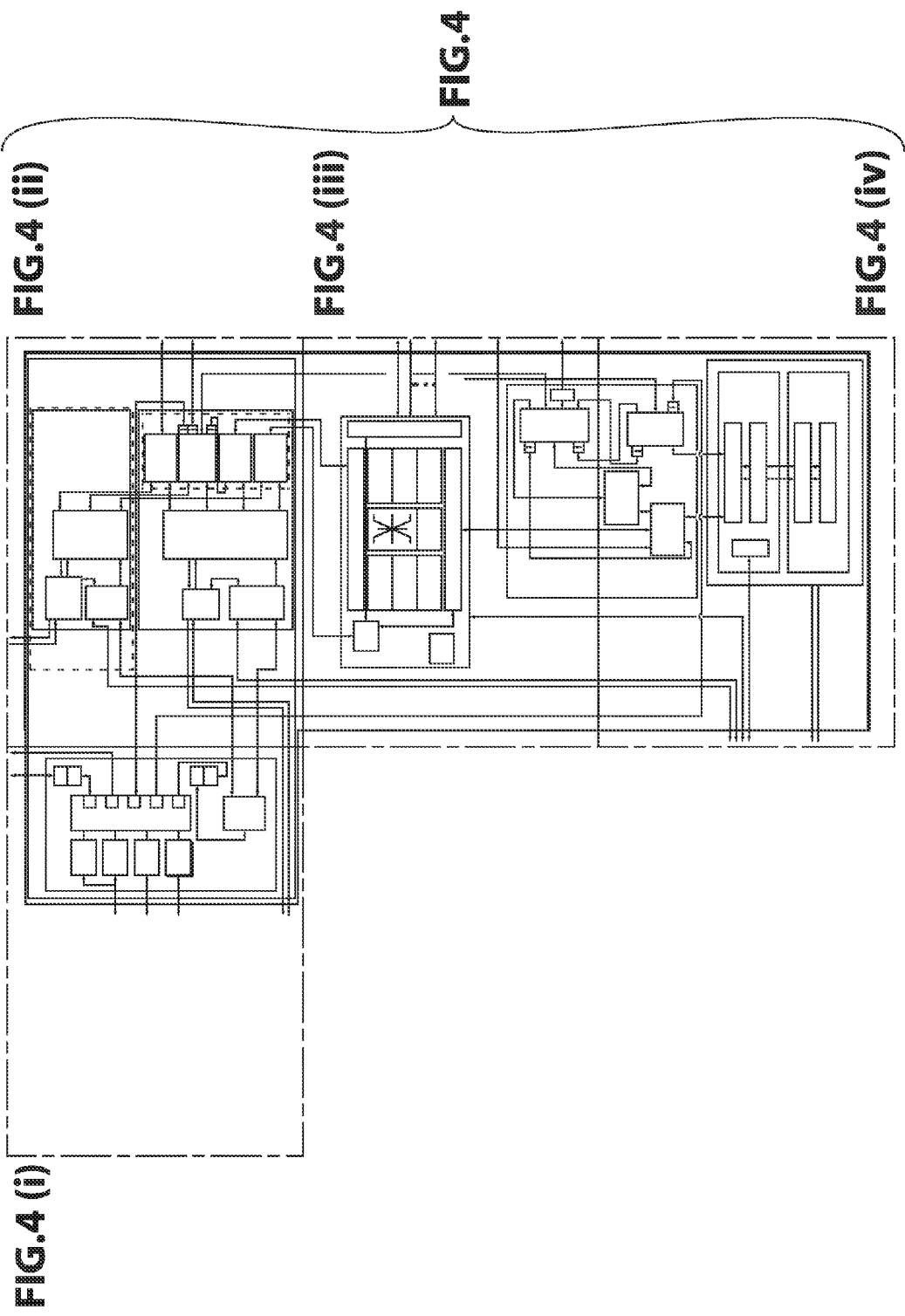

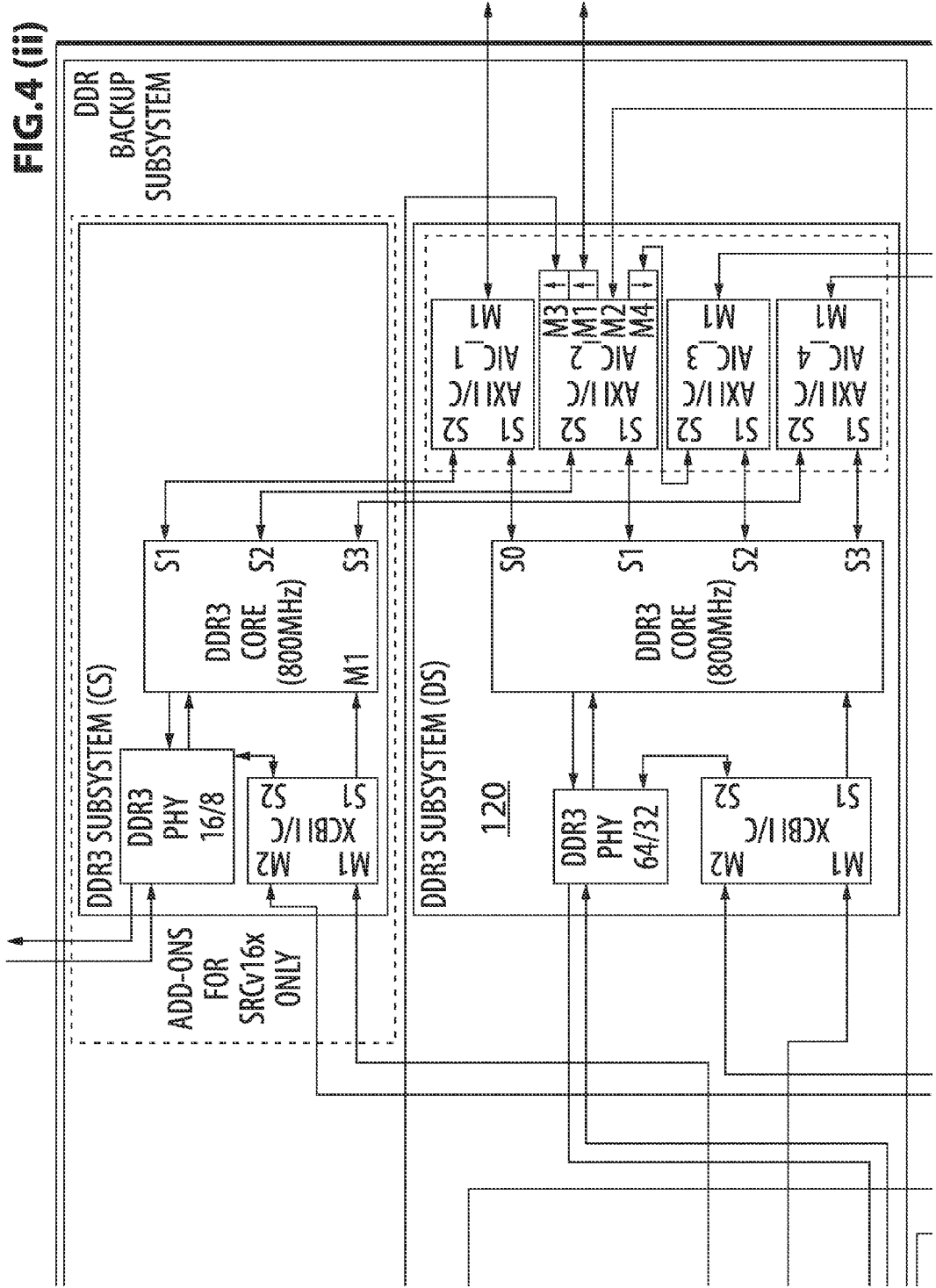
FIG.4 (ii)

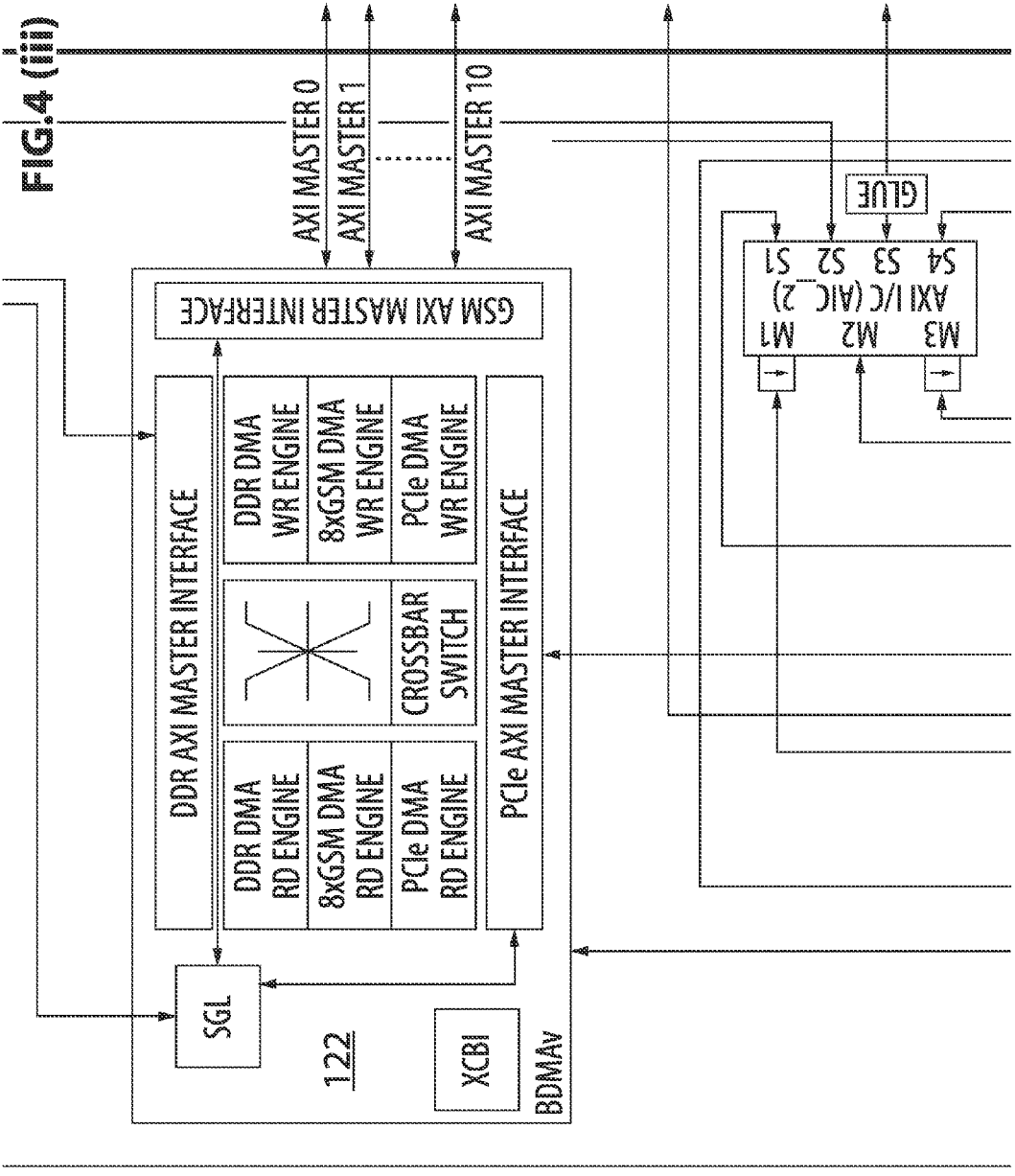

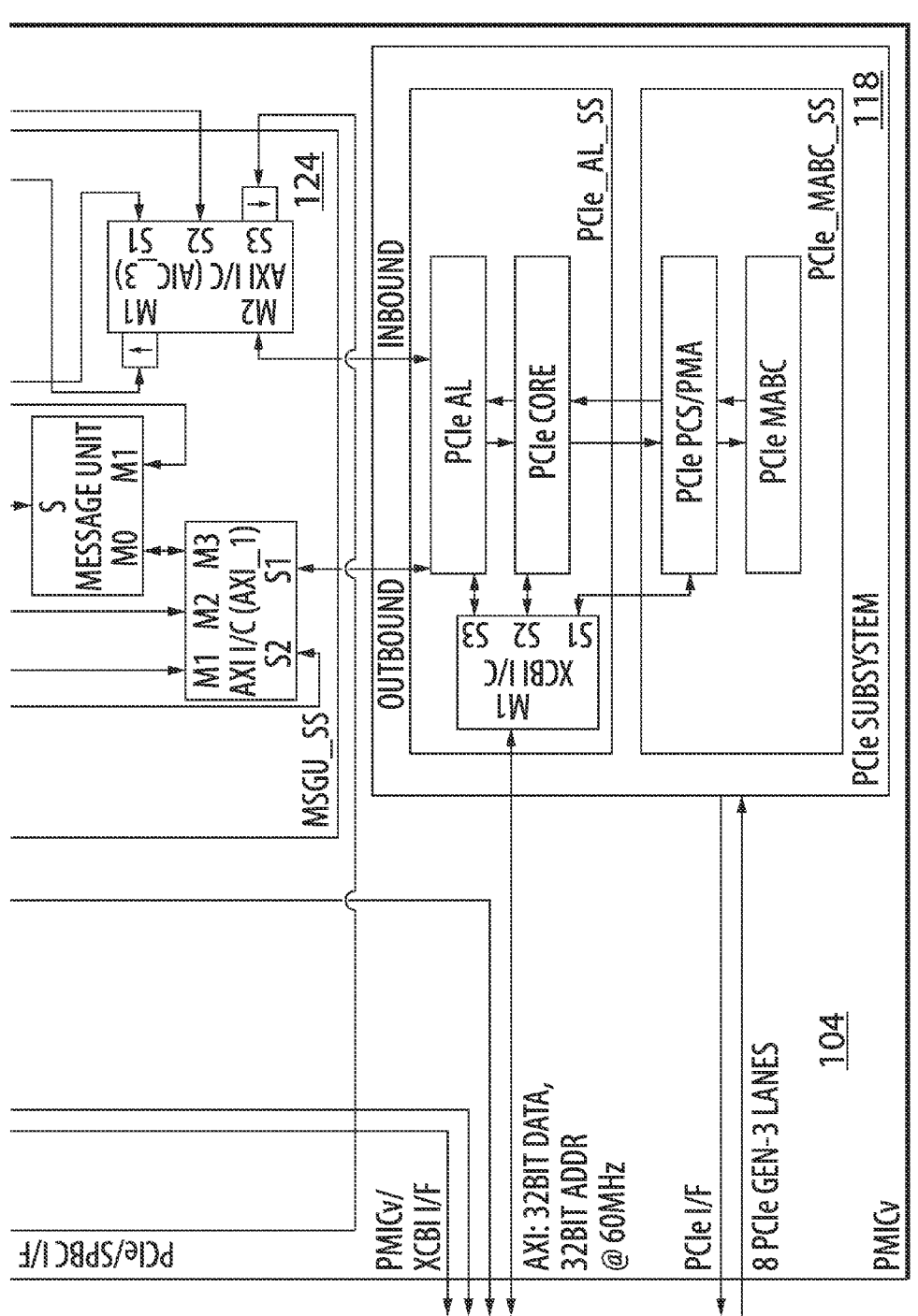
FIG. 4 (iv)

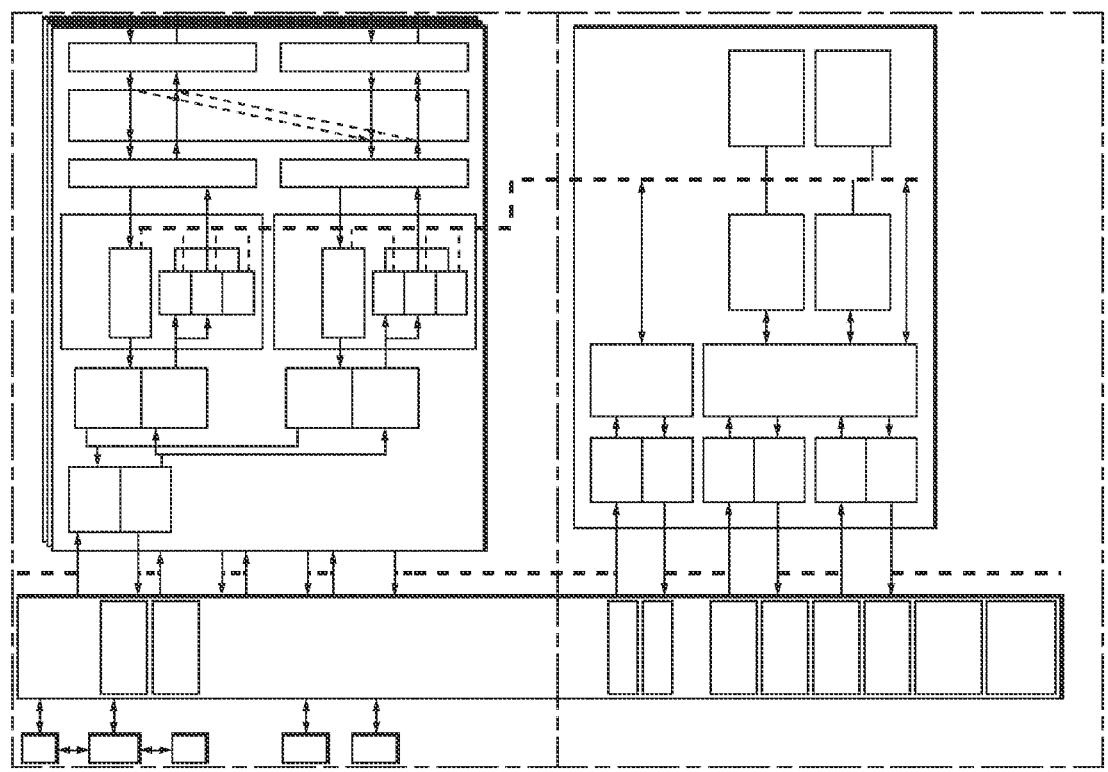

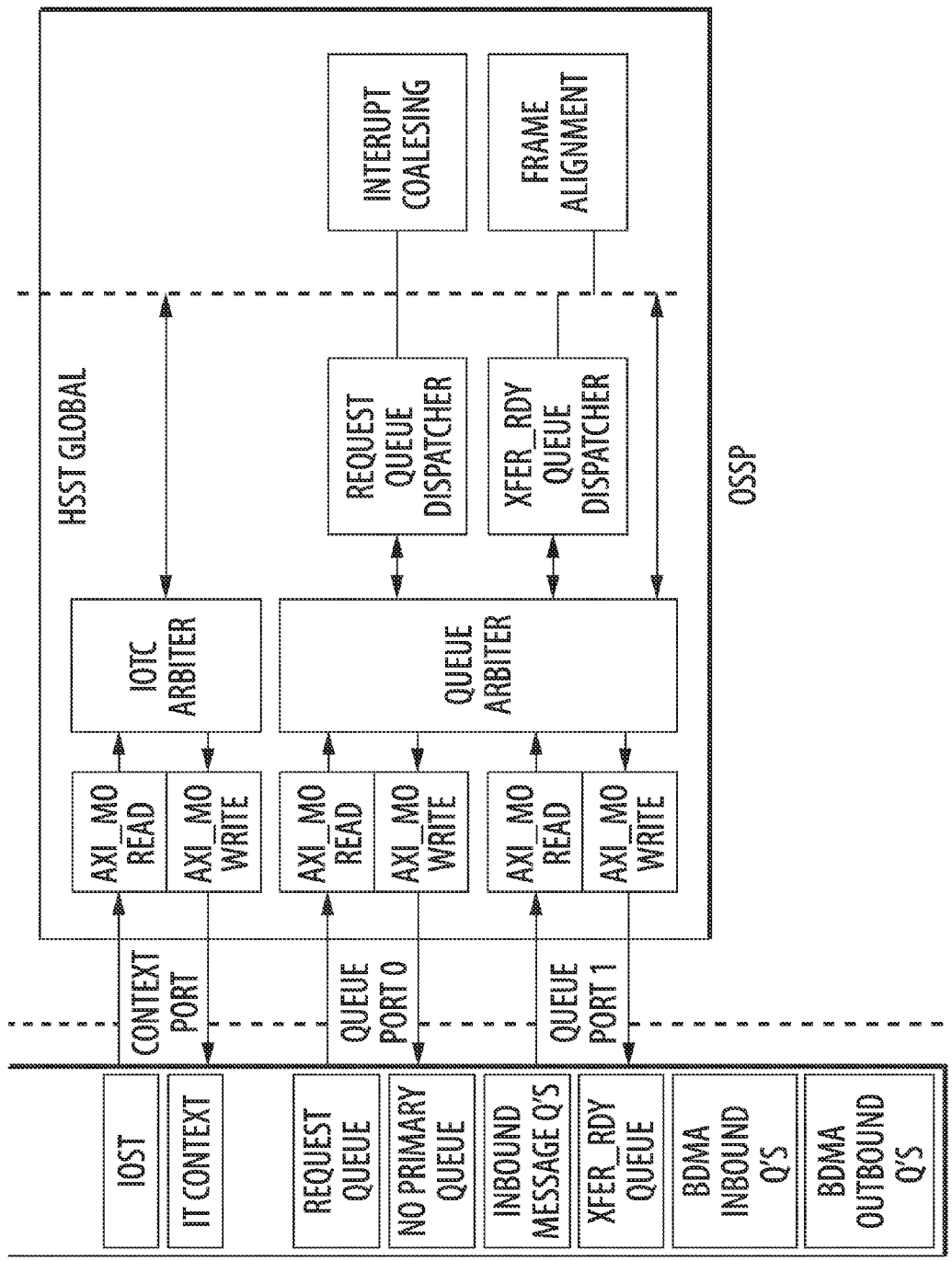
FIG. 6 (ii)

| Source Address (SGL information) | | | | | | |
|---|---|---|---|---|---|---|
| Destination Address (SGL information) | | | | | | |
| Block Offset | VF | VS | ATT | BS | AM | BC |
| Inter-Descriptor | | | | | | |

| Bit | Function |
|---|---|
| 31 | Fail |
| 30 | In-line XOR |
| 29 | CRC Error |
| 28:24 | Error Status[4:0] |
| 23 | CRC Enable |
| 22 | RAID Engine Num Enable/PHYID[2:1] |
| 21 | RAID Type/PHYID[0] |
| 20:0 | MF[23:3] |

| Bit | Function |
|---|---|
| 63:48 | Application Tag/ IO Tag [15:0] |
| 47:46 | Reserved |
| 45 | BDMA DNPC |
| 44 | Reserved |
| 43:40 | RAID Engine Num |
| 39:32 | End-to-end CRC [7:0] |

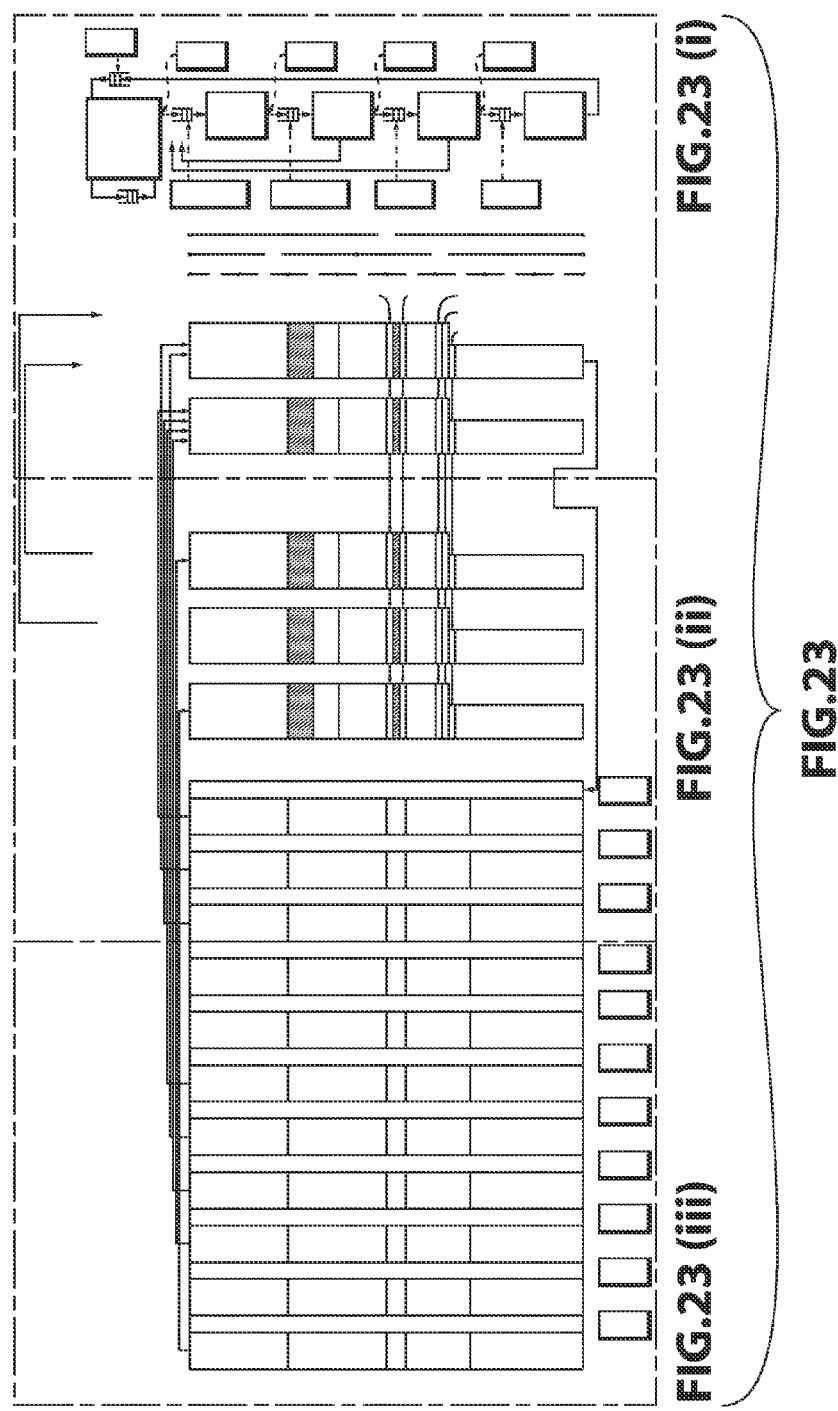

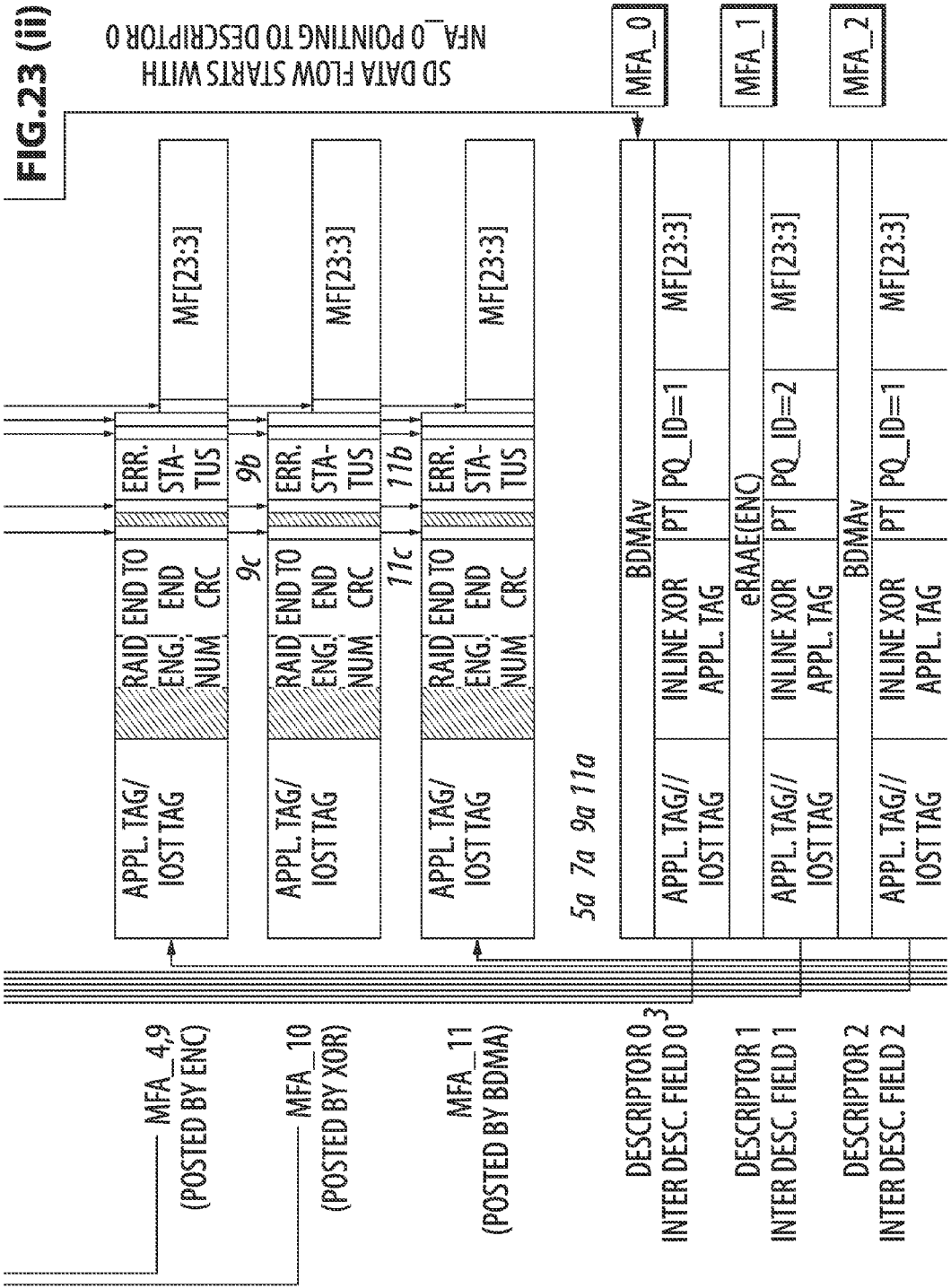

FIG.23 (iiii)

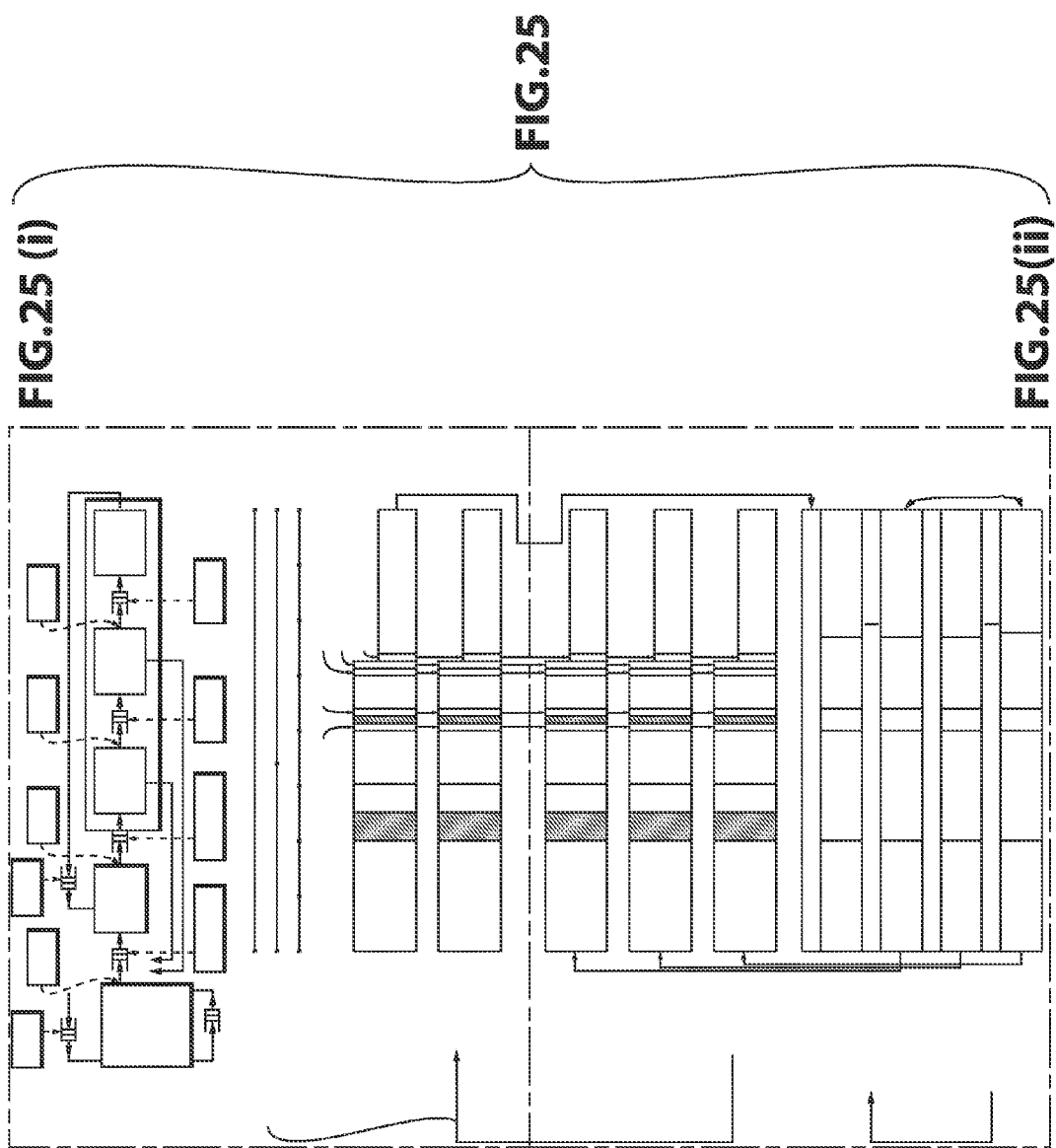

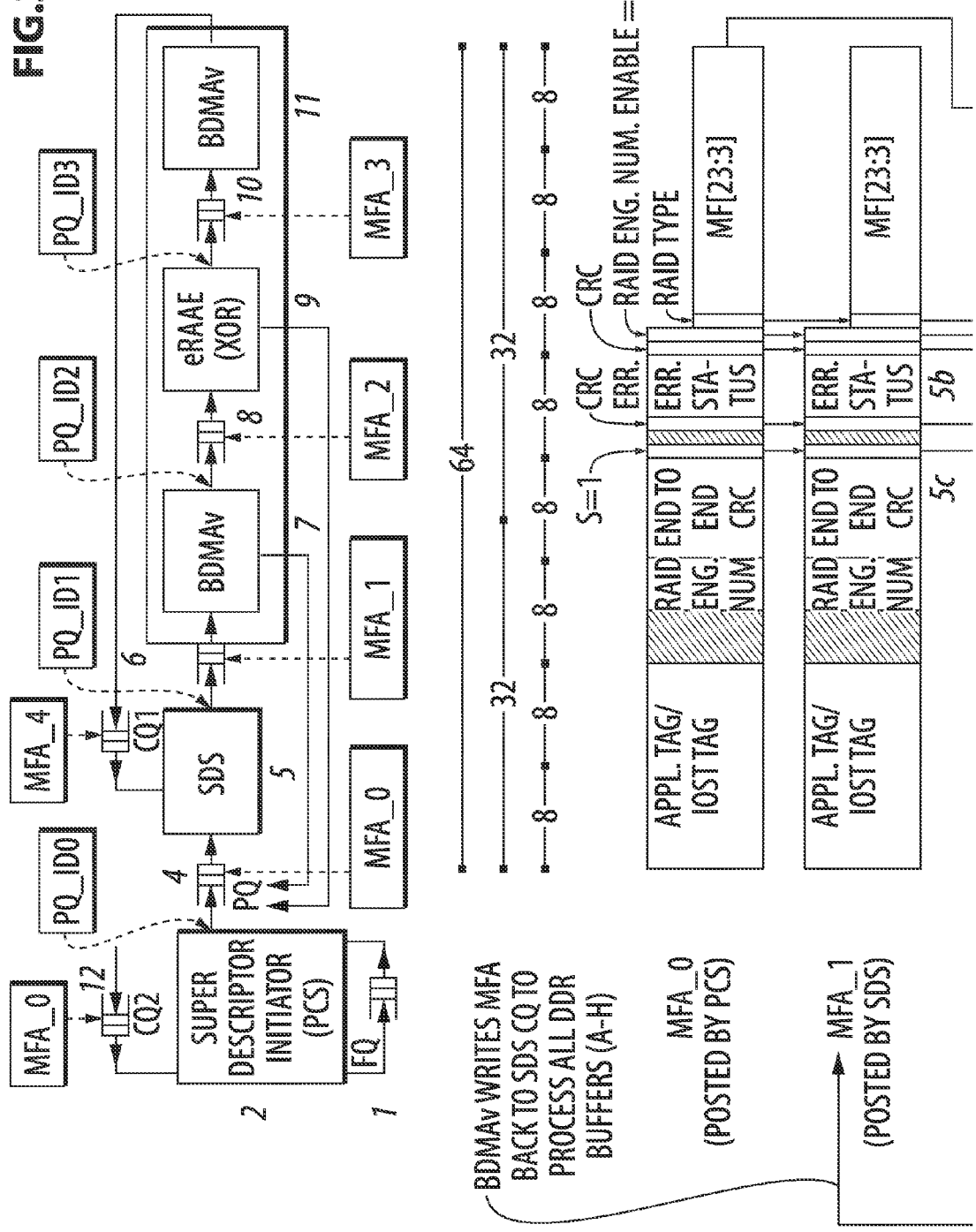

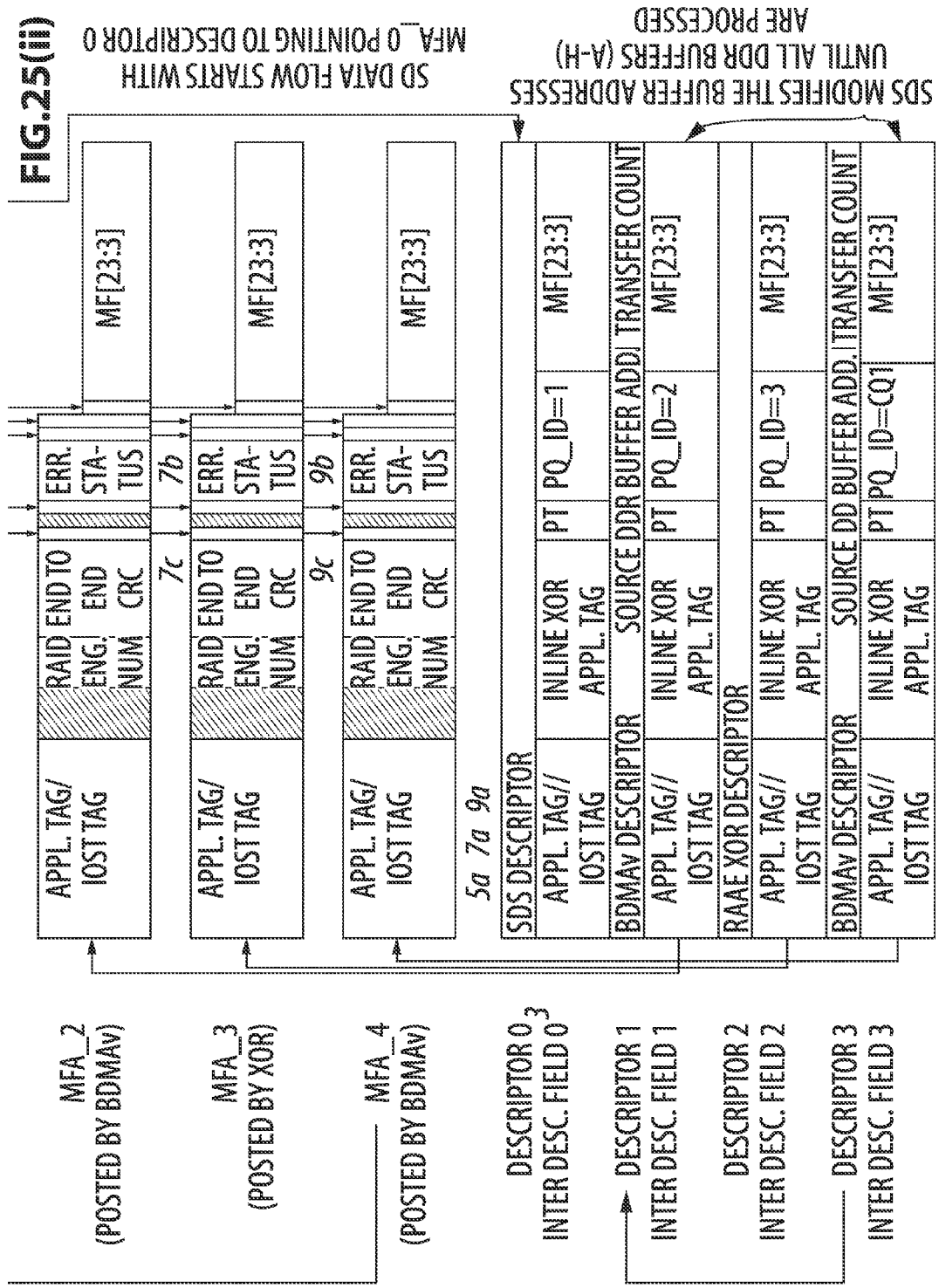

SYSTEM AND METHOD FOR MULTIENGINE OPERATION WITH SUPER DESCRIPTOR IN SAS/SATA CONTROLLER WHEREIN PORTION OF SUPER-DESCRIPTOR IS EXECUTED WITHOUT INTERVENTION OF INITIATOR

CROSS REFERENCE TO RELATED APPLICATIONS

This application claims the benefit of priority of U.S. Provisional Patent Application No. 61/409,764 filed on Nov. 3, 2010 and U.S. Provisional Patent Application No. 61/409,656 filed on Nov. 3, 2010, both of which are incorporated herein by reference in their entirety.

FIELD

The present disclosure relates generally to enterprise storage. More particularly, the present disclosure relates to a method and architecture for chaining multiple engines in a controller to provide data flows.

BACKGROUND

Modern computer devices, such as storage devices and network devices, often make sue of systems on chip (SOC) controllers. SOCs are integrated circuits that include a variety of components such as processors, which can run firmware, and hardware blocks that perform specific functions.

An example is the RAID-on-chip (RoC) controller which is used as part of a RAID (Redundant Array of Independent Disks) system. Such systems provide increased reliability and functions through redundancy.

Improvements in SOC and RoC architecture and the data flows they support are desirable.

SUMMARY

The present disclosure provides a Super-Descriptor data flow as described below.

According to a first aspect, some embodiments disclosed herein relate to a method of chaining a plurality of engines for a system on chip (SOC) controller device, the method comprising: generating, at an initiator, a super-descriptor for providing instructions to the plurality of engines of the SOC controller; passing the super-descriptor from the initiator to a first engine of the plurality of engines; and executing a portion of the super-descriptor at each of the plurality of engines in series without the intervention of the initiator. In various embodiments, the term "send" can be used interchangeably with the term "pass".

In some embodiments, the initiator comprises a hardware block.

In other embodiments, the initiator comprises a processor. In some embodiments, the processor includes firmware.

In various embodiments, the method further comprises passing the super-descriptor between each engine of the plurality of engines in series.

In some embodiments, the first engine passes the super-descriptor to a second engine by writing a pointer to a queue in a global shared memory, the queue corresponding the second engine, the pointer pointing to the super-descriptor.

In various embodiments, the super-descriptor comprises a plurality of descriptors, each descriptor comprising instructions for at least one of the engines of the plurality of engines.

In some embodiments, the super-descriptor specifies a loop in which the super-descriptor is passed to at least one of the engines of the plurality of engines at least twice.

In various embodiments, the SOC controller device comprises a RAID controller. In other embodiments, the SOC controller device comprises a host bus adapter.

According to another aspect, some embodiments disclosed herein relate to a system on chip (SOC) controller device, comprising: a plurality of engines, for carrying out the operations specified by a super descriptor; and an initiator configured to: generate a super-descriptor for providing instructions to the plurality of engines, the super descriptor specifying a series of operations to be carried out by the plurality of engines without the intervention of the initiator; and pass the super-descriptor to a first engine of the plurality of engines.

In some embodiments, the initiator comprises a hardware block.

In other embodiments, the initiator comprises a processor. In some embodiments, the processor includes firmware.

In some embodiments, the plurality of engines are configured to pass the super-descriptor between each other in series.

In some embodiments, the SOC controller device comprises a global shared memory. In various embodiments, the global shared memory includes queues corresponding to each of the global shared memory. In various embodiments, one engine passes the super-descriptor to second engine by writing a pointer to the queue that corresponds to the second engine in the global shared memory. In various embodiments, the pointer points to the super-descriptor.

In some embodiments, the super-descriptor comprises a plurality of descriptors, each descriptor comprising instructions for at least one of the engines of the plurality of engines.

In various embodiments, the super-descriptor specifies a loop in which the super-descriptor is passed to at least one of the engines of the plurality of engines at least twice.

In some embodiments, the SOC controller device comprises a RAID controller. In other embodiments, the SOC controller device comprises a host bus adapter.

According to another aspect, some embodiments described herein relate to the design and construction of a new controller based on an old controller that makes use of a super descriptor data flow as described in greater detail below. In various embodiments, the new controller is designed and built without altering the hardware engines of the previous controller. In other words, the functionality of each individual engine is kept intact. In various embodiments, the functionality of the new controller is made different than that of the previous controller based on specifying functions through the super-descriptor rather than altering the functionality of the individual hardware engines.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 3 shows a PCSv block diagram, according to embodiments of the present disclosure;

FIG. 25 shows a RAID standalone XOR with SDS, according to embodiments of the present disclosure;

DETAILED DESCRIPTION

Figure 1:
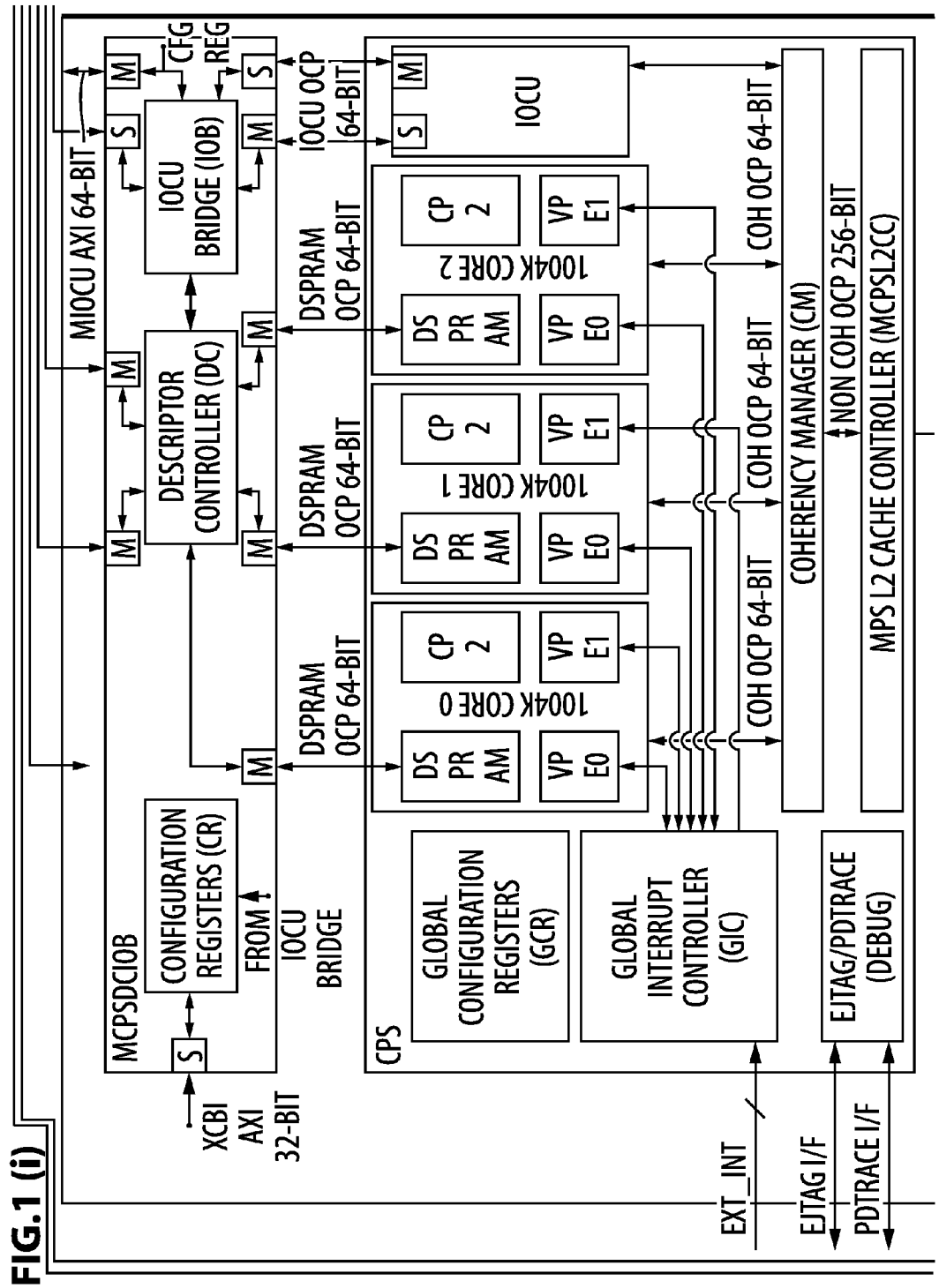
FIG. 1 shows a schematic diagram of an RoC architecture, according to embodiments of the present disclosure.
Figure 1:
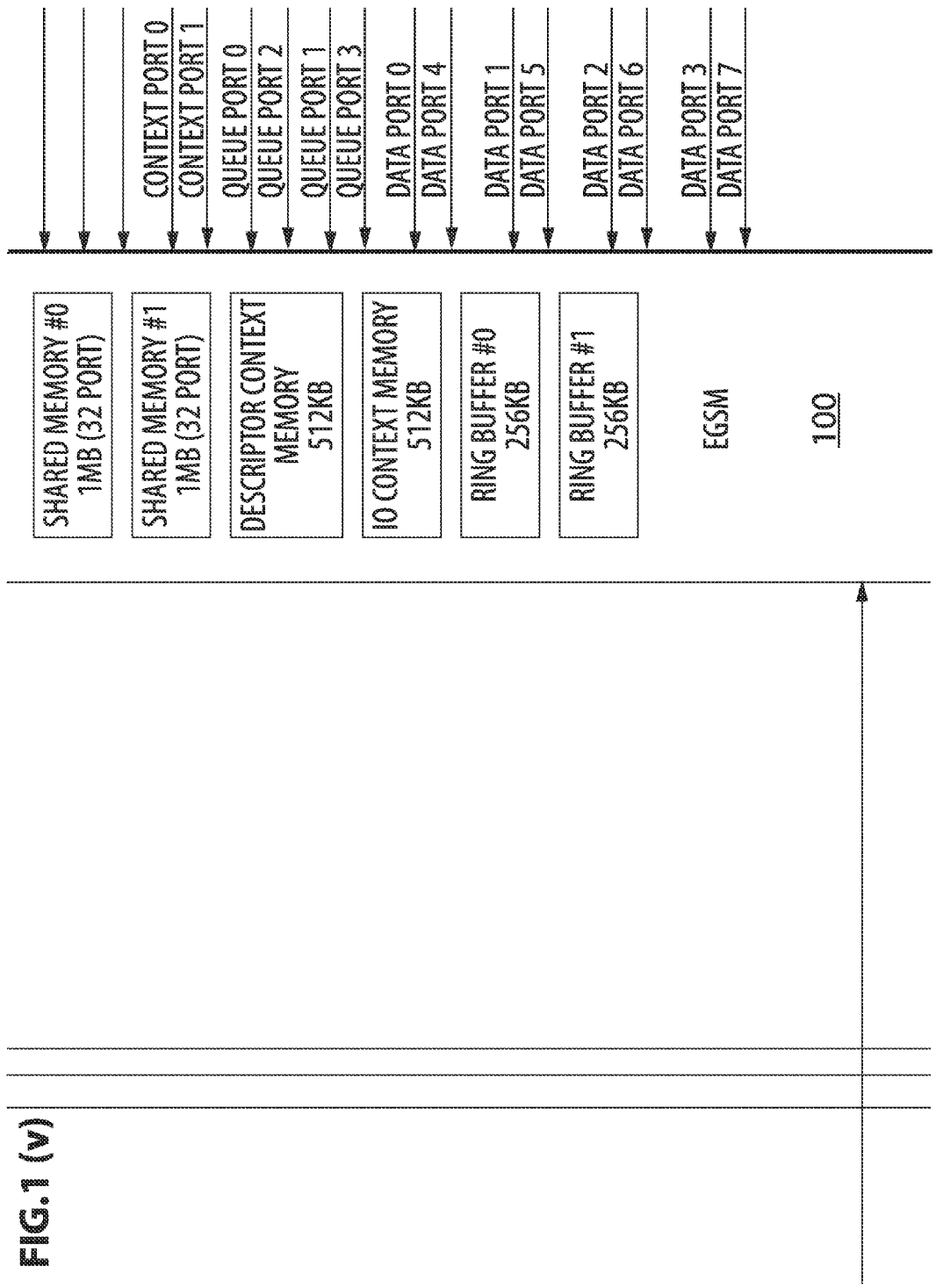

The present disclosure introduces a new way of doing RAID or storage controller. The present disclosure uses a descriptor chaining architecture that provides a flexible way to configure a controller to carry out various functionalities. The present disclosure provides a centralized shared memory and queuing approach for RAID systems. As such, the present disclosure provides multiple chains (data flows) being carried out simultaneously. This can significantly improve efficiency. Other than processors, the present disclosure provides hardware blocks that can function as initiators of data flows. This can offload processors and increase efficiency.

The present disclosure involves a RAID or storage controller which contains multiple engines to carry out different functions. These engines handle data movement, data integrity checking, RAID functions, encryptions/decryptions, and SAS protocol ports. In various embodiments disclosed herein, the term "engine" refers to a hardware block that performs a specific function.

Typically in older controllers, firmware issues a request (or descriptor) to one of the engines for the necessary operation on a chunk of data. When the operation is completed, firmware sends a second descriptor to another engine to operate on the same chunk of data.

The present disclosure provides a way for chaining up operations. By doing so, firmware overhead is greatly reduced and hence the chip performance is improved. In addition, hardware data flows can also take advantage of this descriptor chaining to provide the multiengine functions efficiently. When the architecture of the controller is changed due to functionality addition or subtraction, the super descriptor data flows can be modified easily without impacting individual engines.

Some embodiments disclosed herein relate to a method of chaining multiple engines for a SOC (System on Chip) controller. The SOC controller can be but is not limited to a RAID controller device, such as for example, but not limited to a RAID on chip controller (RoC), or a host bus adapter device. Various embodiments disclosed herein are based on an architecture which utilizes a shared memory structure as interconnect mechanism among various hardware components. The shared memory structure provides centralized buffer locations for holding data or context that is in process, and provides queues for message passing using a common communication method that is agnostic to the implementation of the hardware components. The hardware components in the device includes but not limited to: processors, DMA engines that communicate with DDR, PCIe, or other memory interface blocks, Serial SCSI and Serial ATA engines, encryption/decryption engines, RAID acceleration engines that carries out XOR for RAID functions, compression engines, etc. This unique architecture provides high throughput performance, flexibility in design and scalability in both functionality and performance.

In various embodiments, each engine in the controller is responsible for a specific function, for example, but not limited to, moving data from system memory, writing data to a disk drive etc. On-chip firmware issues a request to an engine to start the operation. To improve the performance of the controller using this architecture, a way of chaining the operations of the hardware engines is provided. The operations being chained form an in-line operation, which does not require any firmware intervention until the operation is finished. This significantly reduces the firmware overhead, and hence improves the performance. Although the primary application of the present disclosure is for RoC devices, it can also be applied to other SOC devices with similar characteristics such as storage processors or network processors.

FIG. 1 shows an integrated RAID-on-chip (RoC) controller comprised of several subsystems, according to embodiments of the present disclosure. At the heart of the controller is a shared-memory based inter-connect called the Extended Global Shared Memory (EGSM) 100 tying all the subsystems together in a system on chip (SoC) architecture. The main subsystems include a Processor Complex Subsystem (PCSv) 102, a PCI/Memory Interface Controller (PMICv) 104, an Octal SAS/SATA Processor (OSSPV) subsystem 106, an Enhanced RAID Assist Acceleration Engine (ERAAE) 108, and a Super Descriptor Subsystem (SDS) 110.

The RoC controller of FIG. 1 is different from known approaches in a number of ways. For example, known approaches do not utilize super descriptors and therefore do not include blocks such as SDS 110. In addition, in various embodiments, various components of the RoC controller of FIG. 1, such as, for example, but not limited to, PCSv 102, PMIC 104, OSSPv 106, and ERAAE 108 are variously configured to generate, interpret or otherwise work with super descriptors. In addition, in some embodiments, the RoC controller of FIG. 1 utilizes a larger Global Shared Memory than known controllers.

Extended Global Shared Memory (EGSM)

The EGSM 100 serves the critical functions of tying together all the subsystems in the controller and of providing the key communication mechanism.

The main features of EGSM shared-memory include:
Large system bandwidth
Rate coupling between the different subsystems
Large intermediate buffer space, taking advantage of time-based multiplexing.

The EGSM unit data (page) size is designed to optimize the aggregate throughput of the EGSM. The controller uses a deeply pipelined flow for data across the EGSM. Consequently, the larger transfer latency through the EGSM compared to other interconnects does not impact performance. Moreover, the EGSM transfer latency is very small compared to the inherent latency of hard drives.

The EGSM 100 also provides other communication mechanisms between the subsystems connected to it including hardware message queues and semaphores. The queues combined with the EGSM's high data throughput interfaces provide an efficient and effective mechanism to move large and small blocks of data between the interfaces.

Typical applications use the EGSM 100 to move data between different blocks and interfaces, hold data and program code, lock resources using the semaphores, or exchange control and synchronization messages using the queues.

The EGSM 100 contains: Shared memory systems, a Dynamic queue system, Context memory for the OSSPv 106 and the ERAAE 108, and a Register interface.

The EGSM 100 can implement a variation of standard AMBA AXI interface. AXI Masters (other sub-systems) communicate to the EGSM 100, through 54 read and 54 write, slave AXIs. The 54 EGSM AXI slaves are augmented to support the following: parity generation, parity checking, priority requests and read-modify-write operations. The EGSM master interface allows AXI slave connections such as an XCBI slave or an AXI interconnect. The EGSM master interface performs AXI slave-to-master bridging, stepping down the frequency across a pair of synchronous clock domains.

EGSM Shared Memory System

The EGSM 100 has 2 main shared memory systems. Each system enables 40 AXI masters to access 1 Mbyte of memory space in each of the shared memory systems. Up to 16 masters can concurrently access the shared memory to perform read or write operations. Arbitration for shared memory access can be a priority based round-robin arbitration scheme. Masters are not prohibited from reading and writing concurrently. The maximum throughput of each shared memory system is 96 Gbyte/s.

The shared memory system can include of a 40-port shared memory switch surrounded by a secondary switch and an arbiter. The shared memory system also contains AXI logic. This interface logic handles the AXI transaction and response signaling.

Figure 2:
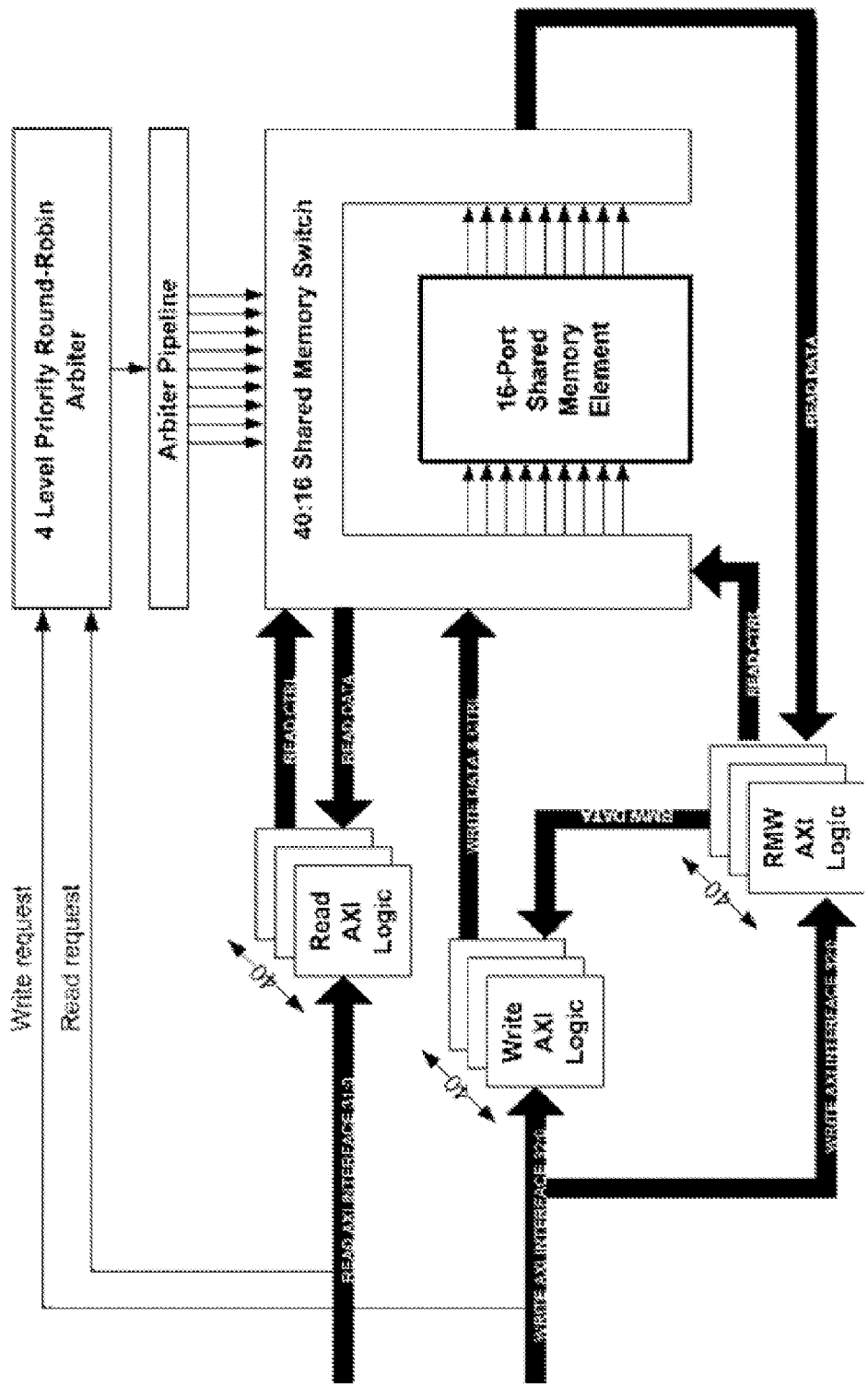
FIG. 2 shows an EGSM shared memory block diagram, according to embodiments of the present disclosure.

The arbiter is priority-based with a round-robin scheme for each of the priorities. The arbiter-controlled switch is made up of 16 40:1 multiplexers. The switch treats the 16-port shared memory element as a single memory with sixteen individual access ports. FIG. 2 shows a high level view of the shared memory block diagram, according to embodiments of the present disclosure.

EGSM Dynamic Queue System

There can be two dynamic queue systems in EGSM 100 to allow sub-system message passing. Each dynamic queue system enables 17 AXI masters to access 128 KByte of dynamic queue storage. Each dynamic queue system is configurable up to 384 dynamic queues. Arbitration for dynamic queue access is a priority based round-robin arbitration scheme. The maximum throughput of each dynamic queue system is 2.4 Gbyte/s, giving the total bandwidth of 4.8 Gbyte/s. Each dynamic queue system can access up to 300 million 64 bit word messages per second. The dynamic queue system contains a 128 KByte storage RAM for storing dynamic queue contents.

EGSM Context Memory System

There can be 2 context memory subsystems in the EGSM 100; namely "Descriptor context memory" & "IO context memory". The descriptor context shared memory system enables 17 AXI masters to access 512 Kbytes of memory space. The IO context shared memory system enables 12 AXI masters to access 768 Kbytes of memory space. Up to 4 masters can concurrently access the context memory to perform read or write operations.

The arbitration scheme for context memory accesses is a priority-based round robin. Masters are not prohibited from reading and writing concurrently. The maximum throughput of the context shared memory system is 9.6 Gbyte/s.

EGSM Register Interface

The controller uses an AXI-based synchronous XCBI to provide access to configuration, status, control, and debug registers in the different device blocks and subsystems.

All of the blocks are slaves on the XCBI. The EGSM has both a slave interface on the XCBI, similar to all other blocks, and a master interface to control and drive all the block transactions on the XCBI bus.

Processor Complex System (PCSv)

Figure 3:
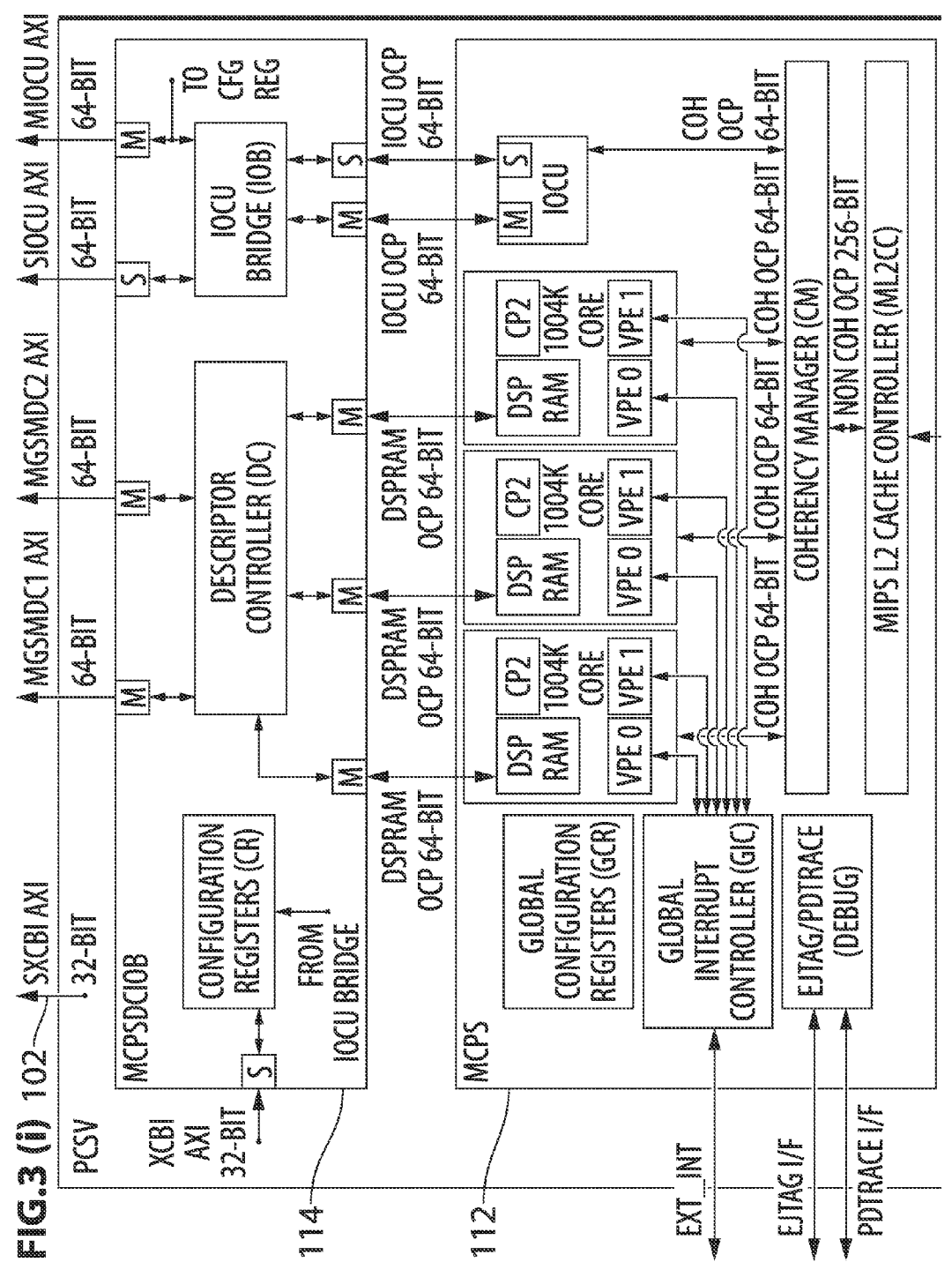

FIG. 3 illustrates the PCSv 102 of FIG. 1 in greater detail, according to embodiments of the present disclosure. As shown at FIG. 3, the Processor Complex Subsystem (PCSv) 102 can comprise three major components: a Multi-Core Processor System (MCPS) 112, Multi Core Processor Subsystem Descriptor Controller and I/O Bridge (MCPSDCIOB) 114, and a Multi Core Processor Subsystem L2 Bridge (MCPSL2B) 116.

The PCSv 102 can use several AMBA AXI interconnects to transfer data between each of its major functions. It can also support multiple external AXI ports for data transfers between itself and the EGSM, PMICv (PCIe, DDRetc) and ERAAE subsystems. A slave XCBI can be used for register control of the various blocks in the PCSv.

Multi-Core Processor System (MCPS)

The MCPS 112 can contains 3 MIPS32® 1004Kc™ cores (from MIPS Technologies, Inc.), a Coherency Manager (CM), Global Configuration Registers (GCR), Global Interrupt Controller (GIC), IO Coherency Unit (IOCU) and 512 KB L2 Cache Controller (ML2CC).

Details regarding the 1004Kc core can be obtained at: MD00418, MIPS32® 1004Kc™ Processor Core Datasheet, Rev 1.02, Aug. 25, 2006, MIPS Technology Inc.; MD00427, Programming the MIPS32® 1004K™ Core Family, Rev 1.30, May 25, 2006, MIPS Technology Inc.; and MD00452, MIPS® MT Principles of Operation, Rev 1.00, Sep. 28, 2005, MIPS Technology Inc.

The Coherency Manager (CM) supports cache-to-cache data transfer and speculative fetch from L2/main memory.

The Global Configuration Registers (GCR) supports programmable base exception vector, register controlled reset of cores 1 and 2, register controlled entry/exit to/from coherency domain.

The Global Interrupt Controller (GIC) supports 256 external input interrupts, Level and edge triggered interrupts and per input vector assignment to selected VPE.

Multi Core Processor Subsystem Descriptor Controller and I/O Bridge (MCPSDCIOB)

The MCPSDCIOB 114 can provide all of the necessary functionality to pre-fetch completion messages into CPU local memory and provide L2 direct deposit path. The MCPSDCIOB 114 is intended for use in a subsystem where the CPU local memory is either data scratchpad RAM or L2 cache.

The MCPSDCIOB 114 can provide a simple pre-fetch unit to offload processor fetching of completion messages into low latency memory. The pre-fetch unit is intended to remove the latency associated with SW controlled pre-fetching (and associated stalls) of completion messages (MFA/MF).

The MCPSDCIOB 114 can provide bridging functionality to/from the IOCU interface of a coherent multiprocessor system. A slave AXI interface (for connectivity to the MSGU) drives a master IOCU OCP interface to provide direct deposit access into the L2 cache. The bridging function can also handle any necessary clock domain crossing, data bus width conversions, bursting restrictions, etc.

Multi Core Processor Subsystem L2 Bridge (MCPSL2B)

The MCPSL2B 116 can provide all of the necessary functionality to connect a L2 cache controller to system resources. The MCPSL2B 116 is intended for use in a subsystem where the main request generator is a MIPS SoC-It L2 Cache Controller generating OCP requests and the system memory is accessed using AXI requests. The MCPSL2B 116 functionality includes bridging functions and a simple DMA engine for memory initialization and offloaded data movements.

The MCPSL2B 116 provides bridging functionality to the device connected to the OCP slave interface. The bridge routes requests from the main OCP slave interface to destinations based on programmable address range decodes. The destination of requests can be to any of the master AXI interfaces on the bridge as well as the internal register space within the bridge. The bridging function can also handle any necessary clock domain crossing, data bus width conversions, bursting restrictions, etc.

The MCPSL2B 116 provides a simple DMA engine to offload processor intensive copy/initialization routines. The DMA engine is intended to be medium performance with the main benefit being simply processor offload. The DMA engine can move data from any source AXI interface to any destination AXI interface. In addition, the DMA engine can be used to initialize memory.

PCIe/Memory Interface Controller (PMICv) Subsystem

Figure 4I:
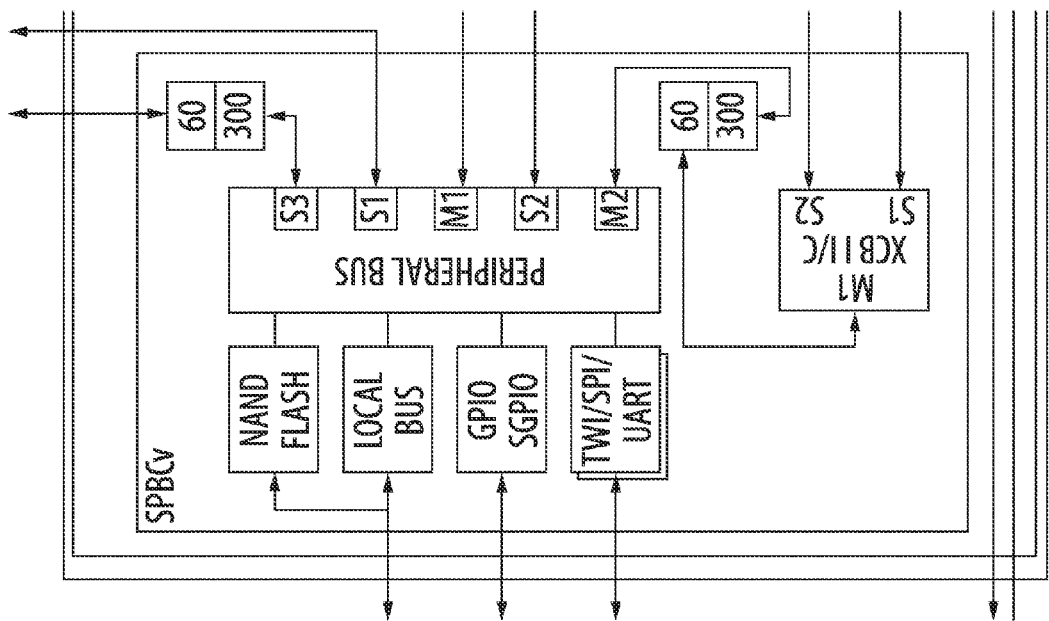
FIG. 4 shows a PMICv block diagram, according to embodiments of the present disclosure.

FIG. 4 illustrates the PMICv 104 of FIG. 1 in greater detail, according to embodiments of the present disclosure. As shown at FIG. 4, the PMICv 104 subsystem is comprised of four major components: PCI Express (PCIe) controller 118, a DDR3 Backup subsystem (DDRB) 120, aBlock DMA (BD-MAV) controller 122, and a Message unit (MSGU) 124.

The PMICv 104 can use several AMBA AXI interconnects to transfer data between each of its major functions. It also supports multiple external AXI ports for data transfers between itself and the EGSM 100 and PCSv subsystems 102.

PCI Express (PCIe) Controller

The PCIe 118 subsystem integrates: a PCIe application layer, a Gen3 Dual Mode (Root Complex/End Point) core, a PCIe Physical Coding Sublayer (PCIe PCS), and a PCIe Physical Media Attachment (PCIe PMA) Sublayer.

The PCIe application logic is responsible for providing both inbound and outbound AXI address translation. The translation tables are programmed via the application layer registers. The application layer is also responsible for converting interrupt requests received via the outbound AXI to MSI/MSI-X/INTx requests to the PCIe core. These requests are done using the same data path as normal data so ordering is maintained. The application logic converts inbound MSI/MSI-x/INIT-x received by the PCIe core into in-band memory mapped writes on the in-band AXI and optionally generating interrupts to the processor.

The Physical Coding Sublayer (PCS) logic interfaces directly to the PCIe Core's interface. In Gen 1 and Gen 2 modes, it performs 8 B/10 B encoding/decoding on data that is transferred between the PCIe Core and the Physical Media Attachment (PMA) Sublayer. In Gen 3 mode, it performs 128 B/130 B encoding/decoding. This logic also contains an elastic FIFO used to retime received data from the recovered clock domain to the PCIe core clock domain. Transmitted data is synchronized to the Analog logic's Transmit Clock, while receive data is synchronized off of the Analog logic's Recovered Clock.

The PMA logic provides a direct interface to the PCIe PHY. In Gen 1 and Gen 2 modes, it aligns receive data on 10-bit boundaries and manages the digital loopback on PCIe lanes. In Gen 3 modes, it aligns receive data on 130-bit boundaries. Transmitted data is synchronized to the MABC's Transmit Clock, while receive data is synchronized to the MABC's Recovered Clock.

DDR3 Backup Subsystem

The DDRB subsystem 120 integrates: a Data Store DDR3 subsystem, and a Control Store DDR3 subsystem.

When the controller is in DDR backup mode, the DDRB subsystem 120 continues to be powered by an external supercapacitor after chip power is lost. This allows the controller to store the DDR contents on an external NAND-flash device, which can be reloaded after power is restored.

The DDR3 SDRAM subsystem provides the memory controller function and interfaces to the external DDR3 SDRAM, which are compliant with the JEDEC 79-3C specification. The DDR3 subsystem integrates a core, a three-port AXI, and a 40 nm PHY. External SDRAM operation from 400 MHz to 800 MHz is supported for DDR3-800 through DDR3-1600.

There are two instantiations of the DDR3 SDRAM subsystem, a data store subsystem and a control store subsystem.

The core has two clock domains. The DDR3 PHY interface logic operates at the DIMM's DDR3 rate, while the majority of the core logic operates at half of the DIMM's DDR3 rate. The DDR3 core simplifies data transfer to and from external DDR3 devices and hides the intricacies of initialization, protocol sequencing, burst control and DRAM refresh from the rest of the controller blocks. The DDR3 core presents the external memory to all other blocks in the controller as a contiguous block of SRAM with multi-clock read latencies.

The DDR3 PHY resides between the DDR3 core and the physical I/O pads of the memory interface. It accounts for the physical timing requirements of the physical interface. The CSU clock synchronizes the DDR3 PHY and CSU clock divided by 2 synchronizes the DDR3 controller.

BDMAV Controller

The BDMAV 122, the host interface and the external memory interfaces are tied closely together in the PMIC subsystem as shown in FIG. 4 to ease the heavy traffic load across these system components.

BDMAv 122 provides capabilities for handling data movement between: EGSM space, PCIe space (host memory), and DDR DRAM space.

The possible data movement directions are: EGSM to PCIe, EGSM to DDR, PCIe to DDR, PCIe to EGM, DDR to PCIe, DDR to EGSM, DDR to DDR and EGSM to EGSM. The main features of BDMAv 122 are:

1. Centralized DMA engine that provides the data movement function for all system blocks;
2. Logical address to Physical address translation function provided by the BDMAv based on a plurality of scatter/gather functions that supports partial SGL partial buffer transfer per DMA operation. The DMA master can request an arbitrary length DMA transfer at an arbitrary starting position using logical address, while the DMA engine does the address translation from logical address to SGL fragment physical addresses;
3. Use of caching techniques to reduce the need to traverse the SGL for address translation purpose support a plurality of simultaneous transfers that are time interleaved with each other with frequent context switching;
4. Support free/request/complete 3 stage and request/complete 2 stage model of descriptor passing based on eGSM queues (More details are provided elsewhere in the disclosure);
5. Support pass by reference and pass by value scheme as the mechanisms for the descriptor communication. The descriptor can be located in eGSM, or other types of physical memory; and
6. Multiple prior queues per direction. This allows higher priority DMA transfers jump ahead to be executed without suffering long latency of staying behind a long low priority transfer that was started earlier.

MSGU

The MSGU block 124 provides a general set of tools for signaling interrupts and moving data to and from a Host through a messaging interface. These tools are provided by accelerated HW structures controlled through FW running on a dedicated MSGU Processor. Through an AXI slave interface, the Host is capable of reading and writing to a set of messaging queues, doorbell registers and other general MSGU controls. Conversely the MSGU processor can receive these Host indications and queue messages and issue DMA movement based on Host specific FW processing. The MSGU processor can also communicate with other on-chip processors for issuance of outbound messages and interrupts to the Host.

RAID Assist Acceleration Engine (ERAAE)

Referring back to FIG. 1, the ERAAE block 108 provides the SRCv controller with high performance hardware acceleration for critical RAID parity, data protection and encryption computations to increase IOPS (IO per second) and data throughput.

The ERAAE 108 implements: RAID 5 XOR functions; RAID 6 functions with programmable Galois Field (GF) polynomial; Generation/Extraction of the Data Integrity Field (DIF) as defined by the SBC-2 specification; Message digest function using the Secure Hashing Algorithm (SHA) and the encryption/decryption functions as defined in the Advanced Encryption Standard (AES); a Public Key Accelerator (PKA) that performs the large vector mathematical operations to assist firmware in public key data encryption/decryption; an AXI master to communicate with the shared memory and an AXI slave interface to interact with processor for device block configurations.

The ERAAE 108 can include a high-speed processor AXI and several functional processors: DIF processors (4 DIF engines); Data Encryption/Decryption processor (3 AES engines); RAID processor (3 RAID engines); Secure Hashing Algorithm processor (SHA engine); Public Key Accelerator (PKA engine); True Random Number Generator (TRNG engine); AES key wrap/unwrap engine; and 2 Descriptor controllers(DIF_DC and AES_RAID_DC).

All of the above engines rely on EGSM queues for communications. Queue entry would be fetched from an EGSM queue. It will then be processed. Once processing is done, the queue entry is written back to another queue (More details elsewhere in this disclosure).

Data Integrity Field Module (DIF Engine)

The DIF provides the protection of user data while it is being transferred between a sender (application client) and a receiver (SAS/SATA storage device). Protection information is generated at the application layer and may be checked by any object associated with the I_T_L nexus (I/O context ID).

Once the data is received, the device server retains the protection information (that is, writes and stores it in a drive, or recalculates it on read back) until it is overwritten.

Figure 5:
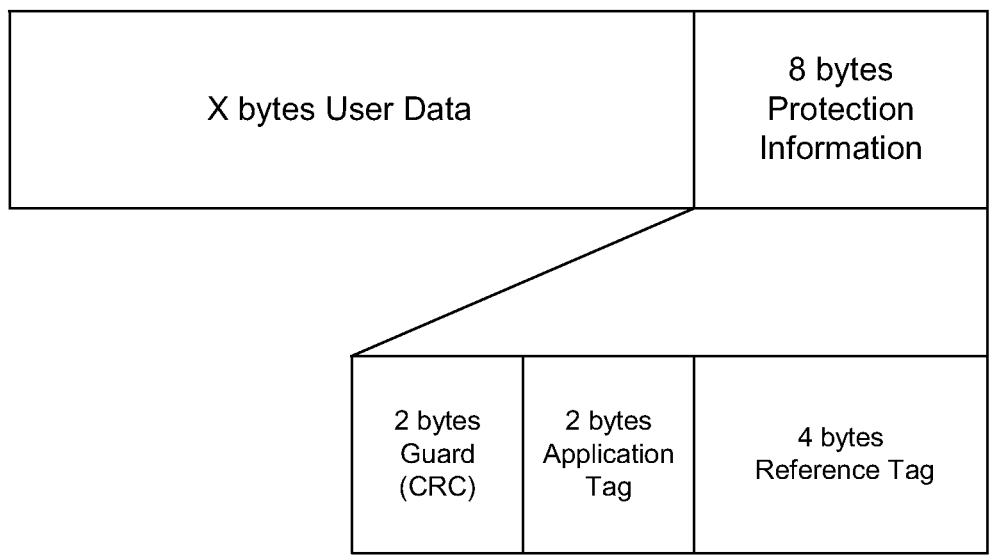
FIG. 5 shows a DIF format, according to embodiments of the present disclosure.

The format of the DIF, according to embodiments of the present disclosure, is shown at FIG. 5.

RAID XOR Module

There are two main purposes for RAID: 1. To store the same data in different areas; and 2. To speed up and stabilize storage performance.

Five levels of RAID were originally defined, each providing different trade-offs in features and performance. However, RAID 2, RAID 3 and RAID 4 are not suitable for implementation and therefore have not been used for the controller.

The following briefly summarize the various RAID functions:

For RAID 0, the firmware partitions the data into stripes and writes them into all disks.

For RAID 1, the firmware can initiate two write operations to the two disks that contain the mirroring data.

RAID 5 can be implemented on arrays of three or more drives. Parity information is calculated for each stripe of data and is placed on a drive other than the drive used to store the stripe of data. The parity information is striped across all drives in the array, and it occupies the equivalent capacity of one physical drive. Overall, RAID 5 provides good performance, but it can only withstand the loss of one drive without failure of the array.

RAID 6 is an extension of RAID 5 for implementation on arrays of four or more drives. Data and two sets of parity (hereby refer to P and Q) information are striped across all drives in the array. The additional set of parity improves the fault tolerance of the array but results in lower write performance. The two parity sets occupy the equivalent capacity of two drives in the array. RAID 6 protects against the simultaneous failure of two drives in the array.

The operation of RAID 5 and RAID 6 in software is slow and hence requires the hardware assists. The ERAAE 108 includes the required hardware to speed up RAID 5 and RAID 6 operation.

The RAID engine performs: RAID 5 parity generation by XORing up to four data disks in a single operation; RAID 6 parities (P and Q) generation by XORing up to four data disks in a single operation; Data moves from source location to one or two target locations; Input and output path data alignment (bit shift in EGSM data memory); and Descriptor result generation to inform about end of operation and error detection (if applicable).

Advanced Encryption Standard (AES) Module

The AES engine performs the basic functions of encrypting or decrypting the input data in compliant to the Advanced Encryption standard.

The AES engine provides the following functions: AXI master interface to pull data from EGSM memory; AXI master interface to push data to EGSM memory; Provides 512-byte input buffer before feeding data to the AES core for data encryption/decryption; Provides 512-byte output buffer before writing encrypted or decrypted data back to EGSM memory.

The engine supports: AES with key size of 128-bit, 192-bit and 256-bit; AES-XTS mode, AES-LRW mode, Electronic Codebook (ECB) mode, Cipher Block Chaining (CBC) mode, Counter (CTR) mode, Output Feedback (OFB) mode, Cipher Feedback (CFB) mode, and Galois Counter mode (GCM); A maximum throughput of 600 Mbyte/s data encryption/decryption for AES mode; and 128-bit Skip Mask for incrementing tweak_key in XTS mode.

Octal SAS/SATA Processor (OSSPV) Subsystem

On the controller shown at FIG. 1, there are 3 instances of the OSSPV subsystem, providing 24 high performance SAS/SATA channels. Each channel supports SMP, SSP and STP initiator functions. As an STP initiator, the design also supports SATA-II features including Native Command Queuing, Hot Plug, and Port Selector control. Each PHY also supports a SATA host function.

The OSSPV 106 interacts with firmware to achieve its transport layer function. The Hardened SAS/SATA Transport Layer (HSST) block implements highly-automated SAS/SATA transport layer functions. It takes requests of commands from firmware and processes them. Under normal scenarios, the HSST would only reply to firmware when the whole command is finished. The OSSPV subsystem supports flexible PHY-to-port assignment and automatic SAS wide-port detection. The OSSPV can form arbitrary wide-ports based on the SAS address assignment per PHY and the SAS address detected from the attached devices on each PHY. Consequently, the SRCv controller supports up to 8-PHY wide-ports, 8 narrow ports, or any other combination in between.

Figure 6:
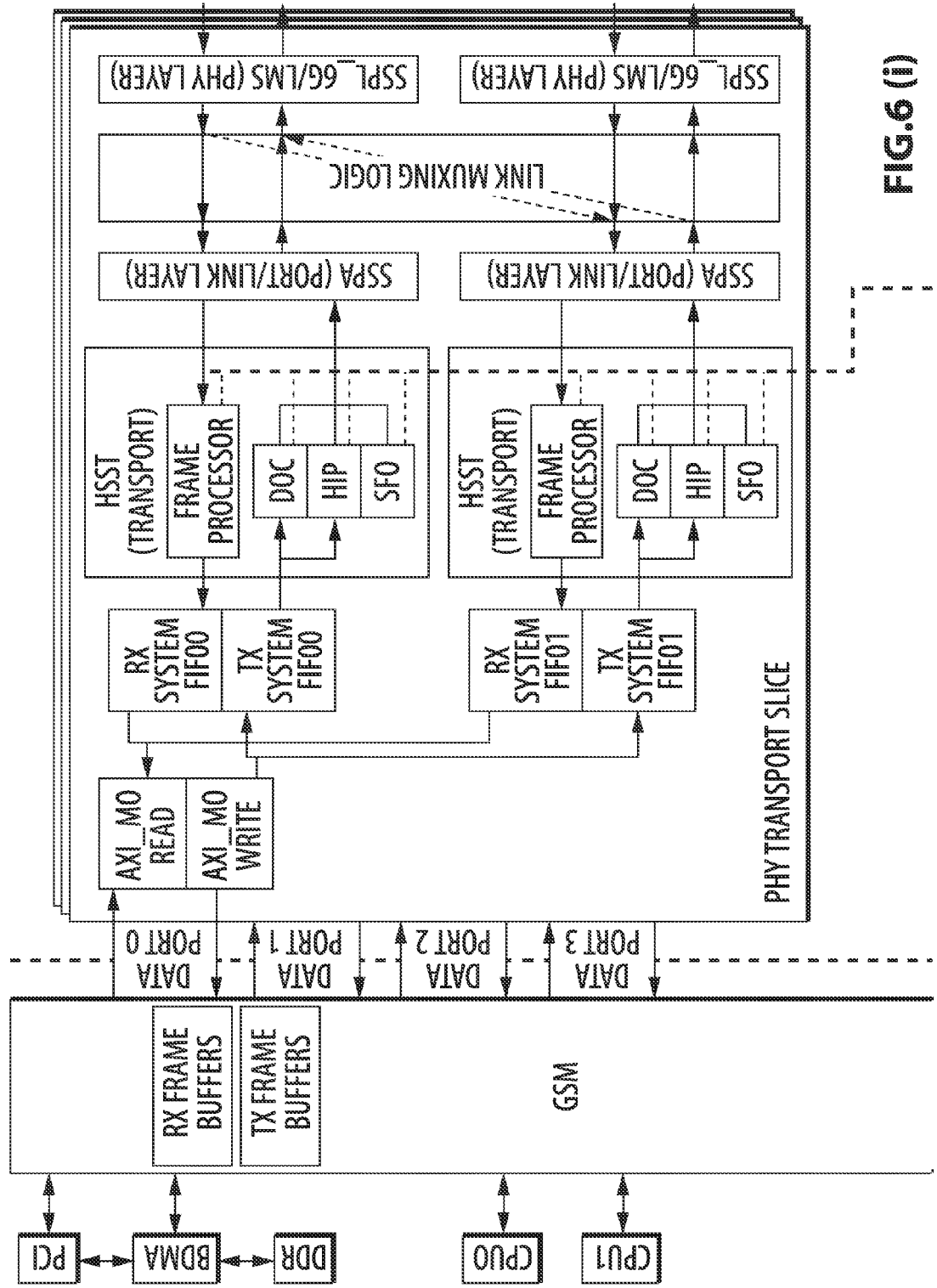
FIG. 6 shows an OSSPv subsystem, according to embodiments of the present disclosure.

FIG. 6 illustrates a portion of the OSSPv 106 of FIG. 1, according to embodiments of the present disclosure. The OSSPV subsystem, as shown in the example of FIG. 6, is mainly comprised of 8 PHY-transport slices. Each slice represents a SAS/SATA channel that includes the HSST, SSPA, and SSPL_6G blocks. In addition, there are other sub-blocks such as a muxing block, a swizzling block, and a performance monitoring block to augment the slice functions. These blocks are described below.

On the system side to/from the EGSM, the OSSPV implements 7 AXI master ports. Four of these AXI ports are used for data movement; two of them are for queue accesses and one for I/O context access. The I/O context is maintained in a dedicated memory in the EGSM that supports up to 4K simultaneous I/O contexts. The OSSPV also includes a FIFO per slice on each direction for buffering data to/from EGSM. These FIFOs are used to absorb the arbitration latency of EGSM memory.

The OSSPV subsystem implements an AXI slave interface to interact with the root AXI processor for XCBI configuration settings. There are also AXI Interconnect blocks to multiplex the AXI buses to each OSSPV block. The OSSPV also implements configuration registers for different purposes.

Super Descriptor Sequencer (SDS)

The Super Descriptor Sequencer (SDS) 110 block provides a way to process any super descriptor (super descriptors are described in greater detail below) it receives. These capabilities are provided by accelerated HW structures controlled through FW running on a dedicated Processor inside SDS (with 16 KB of I-RAM and 16 KB of D-RAM). The SDS block can receive super descriptors from up to 64 different sources through 1 read AXI master interface. These sources can be programmed to be mapped to 8 different queues inside the block. Each queue can support more than one source. Prioritize round-robin arbitration is enforced on the AXI interface. The super descriptors it receives are stored into their own inbound queues for the SDS Processor to process. The processed descriptors are written to the designated outbound memory by the SDS Processor and written out through 1 write AXI master interface. 8 kB of memory are shared by all inbound queues and 8 kB of memory is allocated for outbound traffic. The depth of each queue and the size of each entry can be separately programmed in the XCBI registers.

However, to meet the increasing requirement of RAID on a Chip applications or enterprise graded storage applications, the RoC architecture and the data flow it supports need to evolve to address the following needs:

1. To support new emerging application feature requirements for data security, data integrity, more advanced RAID processing such as RAID5/6, the RoC architecture need to support advanced hardware acceleration functions for data encryption, DIF (Data Integrity Field) as specified by T10 SBC standards, compression, hashing etc at very high data throughput. Chaining of the above operations with minimum processor interactions would be beneficial.

2. To provide efficient and uniform DMA structure that presents a consistent representation of DMA operation and scatter/gather buffer definition that is capable of handling a large number of concurrent buffers and fast context switching among partial buffer transfers. Ideally the DMA operation need to be consistent no matter which type of hardware and software acceleration/operation functions is applied to the data. The DMA also need to be able to be non-blocking in order to fully utilize the bus bandwidth on system buses, storage interfaces, and on-chip and off-chip memory interfaces. DMA operation is an important part of any data movement; accordingly, it is usually important that it interacts efficiently with other engines.

3. The architecture needs to minimize the data traffic moving across external interfaces, specifically the off-chip memory interfaces, to resolve system performance bottleneck on memory bandwidth.

In the field of computer processing, Raid on Chip device and architecture is relatively new. There is no embodiment related to chaining multiple engines to support Raid or storage functions.

There are two patent references regarding chaining blocks inside a computer. These are: 1. Method, Apparatus, and Program for Chaining Server Applications, Patent No: U.S. Pat. No. 7,089,559 B2, Aug. 8, 2006; and 2. Method, Apparatus, and Program for Chaining Machine Translation Engines to Control Error Propagation, Patent No: U.S. Pat. No. 6,993,472 B2, Jan. 31, 2006.

Figures 7, 8:
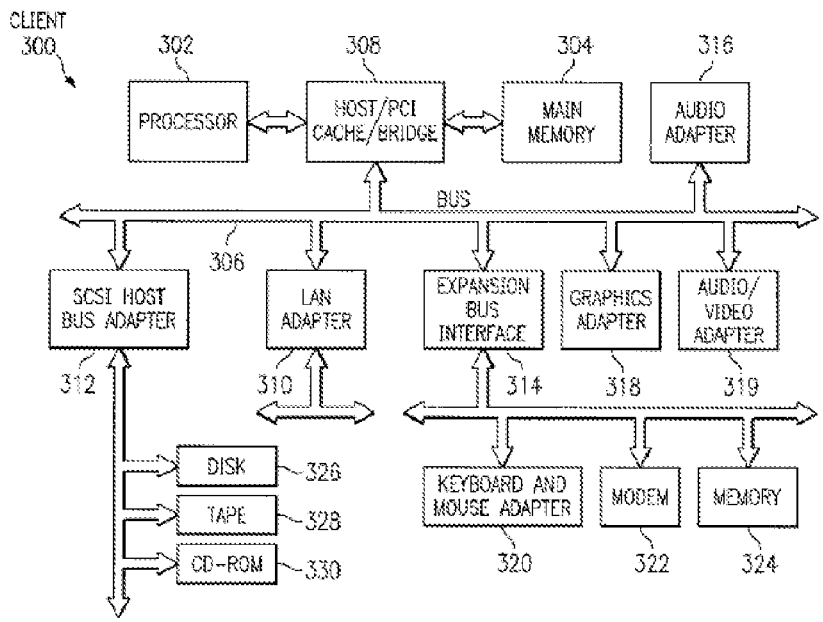
FIG. 7 shows a block diagram of a data processing system.
FIG. 8 shows a BDMAv descriptor format, according to embodiments of the present disclosure.

Both of these references discuss mechanisms for chaining server applications. FIG. 7 is a diagram extracted from reference No. 1. As for reference No. 2, it discloses a mechanism for chaining machine translation engines using linguistic annotation language. Both the embodiments use the same architecture and have the similar drawbacks.

In known approaches, each block carries out a task for the computer system. An operation is started from Processor (302), a "properties file" is passed around the blocks to carry out operations.

There are various issues that known approaches do not address. Such issues include: a) The chaining is used in a computer system. The architecture is completely different where the computer system uses shared bus architecture (one block gets on the bus each time). b) The way of chaining uses a more software based approach by passing a "properties file" among the engines for communication. This is not as efficient as using hardware queues and memories for direct communications between engines. c) The initiation in known approaches is from the processor, which can reduce processor's performance. Other than processor, current invention has hardware block being an initiator, which provides offload processor efficiently.

Descriptor Based Engines

In the controller, a descriptor is used to provide the necessary information for an engine to operate on a task. It typically contains operation specific fields, an IO index, size of data and location of data. When an engine receives the descriptor, it carries out the function (e.g. data movement). When the function is finished, the engine writes a completion message back to a queue.

The format of the descriptor is specific to each engine. Based on the functionalities of an engine, the descriptor is defined for it. In the controller, the BDMAv, eRAAE, SDS, compression engine etc all have different descriptor format.

FIG. 8 shows the BDMAv descriptor format as an example. The elements of FIG. 8 are as follows:

Source Address—defines the source address of data movement for BDMAv. The address could be contained in a scatter-gather list (SGL).

Destination Address—defines the destination address of data movement for BDMAv. The address could be contained in a scatter-gather list (SGL).

BC—Byte count field defines the transfer size for the current descriptor.

AM—Address mode defines whether the address is SGL or direct address

BS—Block size of the current transfer. It could be 512 B, 520 B, 4096 B or 4164 B.

ATT—Attribute field defines the PCIe attribute for the current transfer

VS—Virtual function is selected

VF—Virtual function number

Block Offset—defines the number of bytes into a sector

The single descriptor could be created by on-chip firmware or by another hardware engine. Once an engine receives the descriptor, it carries out the specific functions. When the function is finished, an engine writes back to a queue to acknowledge, as described elsewhere in the disclosure.

When data needs to be operated by multiple engines, firmware has to wait for one engine to finish before sending a second descriptor to another engine. This takes up precious CPU bandwidth and internal chip memory. In the current invention, a way of chaining up multiple engines without affecting each other is introduced.

Centralized eGSM Queues and Queuing Models

As discussed above, the EGSM 100 implements shared memory, context memory and queuing systems. These systems provide vital resources for every block in the controller, either for storage or for communication.

The shared memory and context memory store hardware structures, for example descriptors. The queues are used for sub-block communications. There are 2 reasons these memory systems and queues are stored outside of a block in a centralized area:

1) Both firmware (on-chip processor) and hardware (blocks like BDMAv, ERAAE) need to access these structures frequently. Having these structures in shared memory avoids bottlenecking the processor accesses at the interface of the blocks.

2) In order to support a different number of devices or different features in the controller, the memory space required in the controller needs to be adjusted. As such, having an external memory block provides flexibility when the size of memory block needs to be increased/decreased to adapt to different applications. For example, for a system that is required to support only half the number of the drives, external memory can be halved without changing any internal logic in the SAS block.

Figure 9:
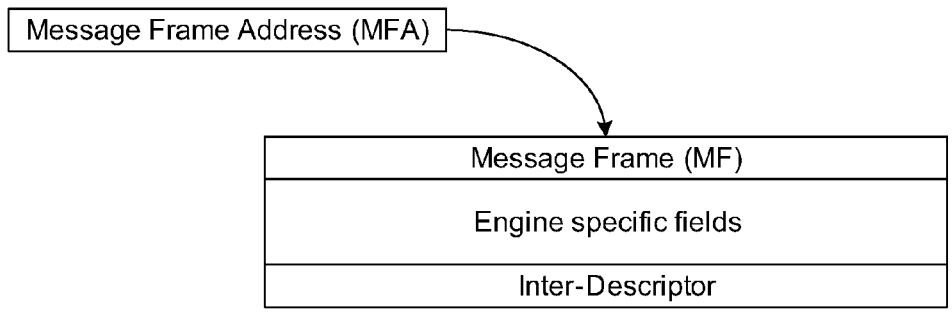
FIG. 9 shows basic components of and MFA and an MF, according to embodiments of the present disclosure.

For descriptor passing between blocks, the EGSM queues are used. Each queue in the EGSM 100 implements a First-In-First-Out (FIFO) buffers to store pointers to the descriptors. A pointer to a descriptor is called Message Frame Address (MFA) while the descriptor itself is called Message Frame (MF). FIG. 9 shows the basic components of an MFA and MF.

Various embodiments disclosed herein can implement the MFA as a 24-bit byte aligned address. It could easily be expanded to larger address size to accommodate more MFs. The MFA is decoded by each engine to locate the MF. MF contains two parts: engine specific fields and the Inter-Descriptor field. An example of a BDMAv (one of the engines) descriptor which contains fields specific only to BDMAv is provided elsewhere in the disclosure. The Inter-Descriptor field will be described elsewhere.

In order to communicate using MFA and hence MF, the queues are setup in a special way so that the engine knows which queue to read from and which queue to write back. There are two schemes for the queuing systems: 3-stage FIFO and 2-stage FIFO.

3-Stage FIFO Scheme

For every MFA passing, there is a request posted by a sender. When a MFA operation is finished, the receiver sends a completion status back to the sender. The 3-stage FIFO Scheme leverages a generic message queue mechanism provided by the EGSM. Any request is treated as a message (MFA). There are 3 queues defined in this scheme:

A) Free FIFO—contains unused MFA that on-chip firmware initializes at system startup.

B) Post FIFO—queues up MFA posted by a sending; receiver picks up the MFA from this queue.

C) Completion FIFO—queues up MFA that are completed by the receiver.

Figure 10:
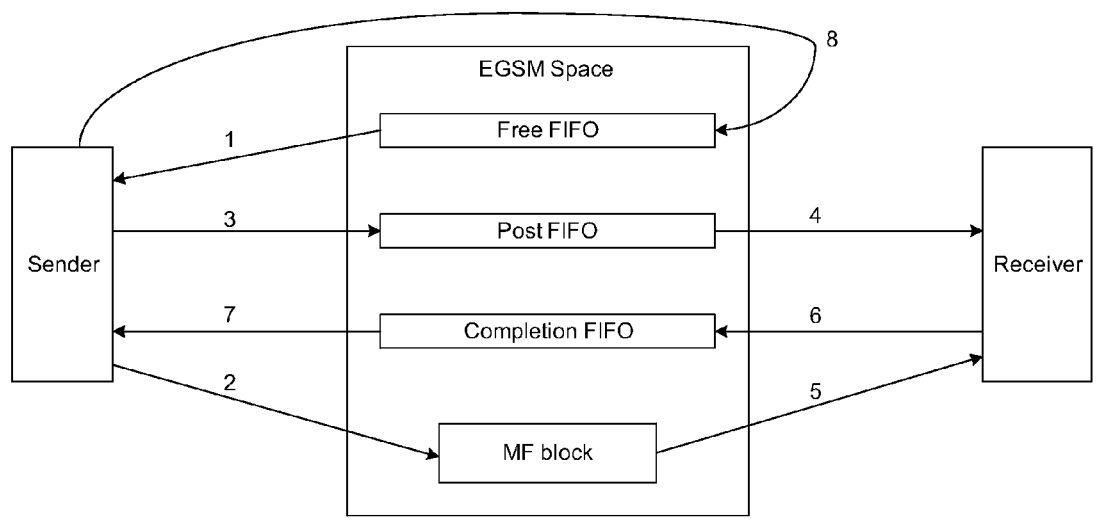
FIG. 10 shows a three-stage FIFO messaging scheme, according to embodiments of the present disclosure.

Any request is treated as a message. For example, the requester of a DMA operation is considered to be the sender of the message, while the BDMAv engine is considered to be the receiver of the message. FIG. 10 shows a diagram of 3-Stage FIFO Messaging Scheme. The operations are as follow:

1. Sender reads an MFA from the Free FIFO. The MFA contains an address of an MF stored in MF block.

2. Sender assembles the MF. It writes the engine specific field and inter-descriptor to the address pointed by MFA.

3. Sender posts the MFA into the Post FIFO. Note that Sender could go back to step in and continue to post more MFAs.

4. Receiver reads the MFA from the Post FIFO.

5. Receiver reads the MF from the address specified by the MFA from Post FIFO.

6. When receiver is done with the operation, it writes back the MFA (read from Post FIFO in step 4) to the Completion FIFO.

7. Sender reads the MFA from the Completion FIFO.

8. Sender writes MFA (recycle MFA) back to Free FIFO. The entries in the Free FIFO could then be re-used by the subsequent operations.

2-Stage FIFO Scheme

Figure 11:
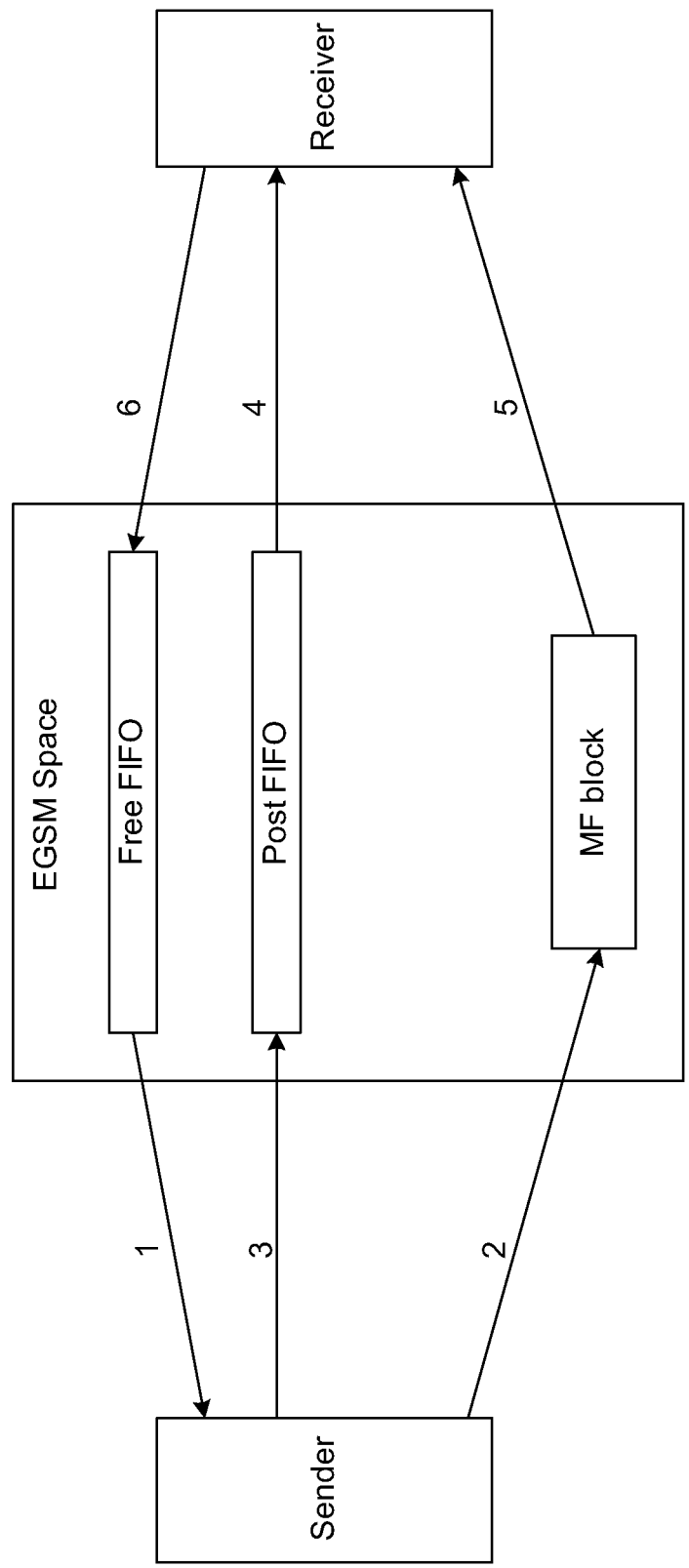
FIG. 11 shows a two-stage FIFO messaging system, according to embodiments of the present disclosure.

The two-stage messaging method is used where the sender does not need to do post processing after an operation is completed on a descriptor. This method involves two FIFO: the Free FIFO and the Post FIFO. The processing flow is captured in FIG. 11.

The operations are as follow:

1. Sender reads an MFA from the Free FIFO. The MFA contains an address of an MF stored in MF block.

2. Sender assembles the MF. It writes the engine specific field and inter-descriptor to the address pointed by MFA.

3. Sender posts the MFA into the Post FIFO. Note that Sender could repeat 3 in and continue to post more MFAs.

4. Receiver reads the MFA from the Post FIFO.

5. Receiver reads the MF from the address specified by the MFA from Post FIFO.

6. When the receiver is done with the operation, it writes back the MFA (read from Post FIFO in step 4) to the Free FIFO.

The main difference between 2-stage and 3 stage FIFO messaging scheme is that the sender does not require an acknowledgement that an operation is finished. In other words, the sender "trusts" the receiver that the operation will be carried out successfully.

Super Descriptors

A Super Descriptor is a sequence of single engine descriptors: 1. used by data operation and/or movement engines, and 2. chained together to let data operation and/or movement engines operate in the correct sequence to achieve a complex operation.

The chaining of the descriptor provides an in-line operation. An in-line operation is a sequence of data operations and/or movements from/to PCIe/DDR and/or SAS without firmware intervention or intermediate external data storage. For example, an inline encryption operation involves DMA to move data, encryption engine to pick it up and operate on after data is moved to internal memory and then SAS engine to send it out to a drive.

Figure 12:
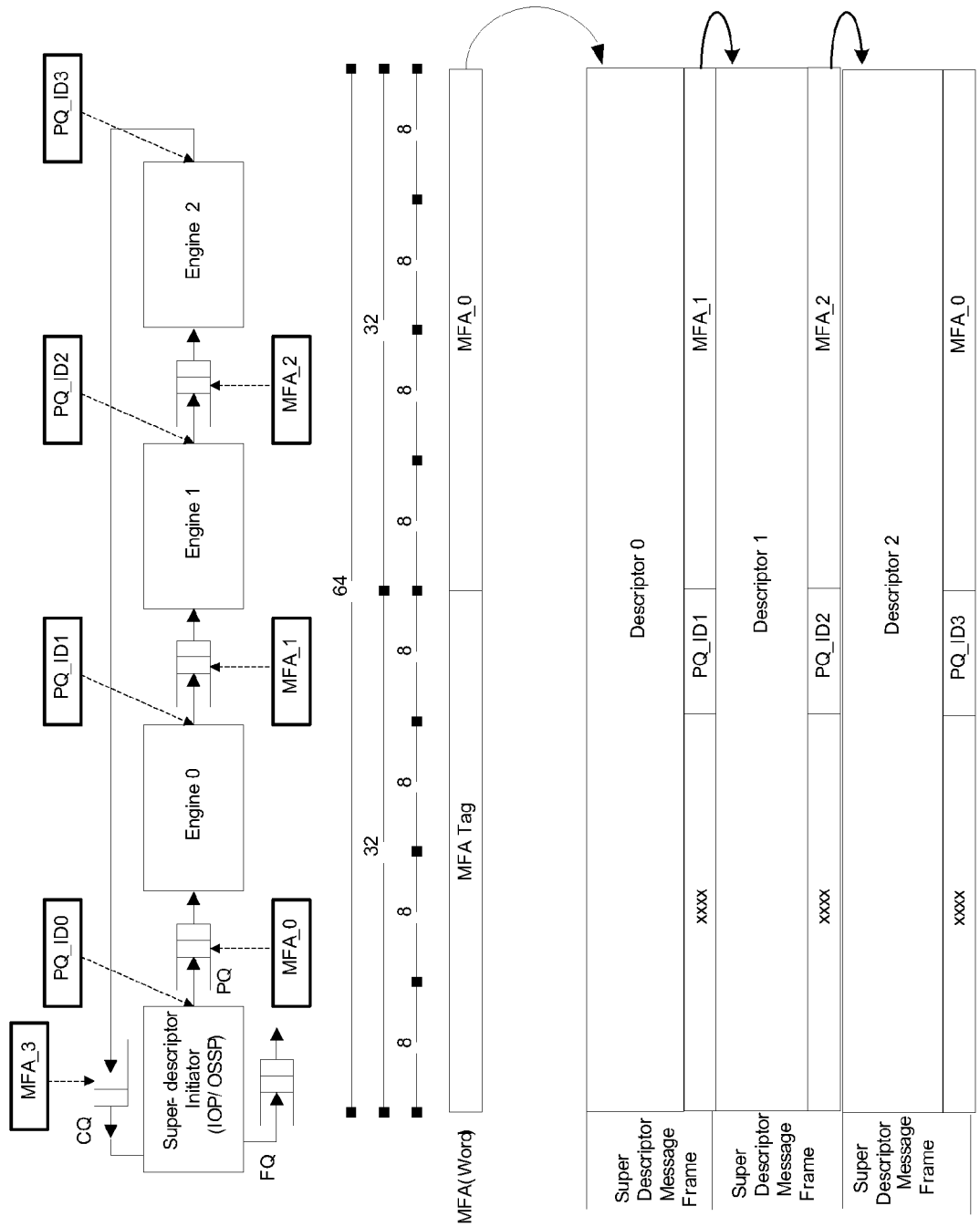
FIG. 12 shows a generic Super Descriptor diagram, according to embodiments of the present disclosure.

FIG. 12 shows a generic Super Descriptor diagram. The following abbreviations are used therein:

FQ—Free Queue or Free FIFO
PQ—Post Queue or Post FIFO
CQ—Completion Queue or Completion FIFO
PQ_ID_N—Post Queue ID represents the Queue number for the current engine to post to.
MFA_N—Message Address Frame for Engine N The diagram of FIG. 12 shows an in-line operation involving 3 engines. The in-line operation creates a data flow in which data goes from one engine to another and is operated on. The Super Descriptor Initiator uses a 3-Stage FIFO scheme while Engine 0, 1, and 2 use 2-Stage FIFO scheme. The MFA flow and the Super Descriptor Initiators (SDI) will be introduced further below. Below are the basic operations for this in-line data flow:

1. SDI starts by reading FQ for an MFA_0
2. SDI writes the MF pointed by MFA_0
3. SDI posts MFA_0 to PQ_0
4. Engine 0 reads MFA_0 from PQ_0
5. Engine 0 carries out the operation specified in MF_0
6. When done, Engine 0 posts MFA_1 into PQ_1
7. Engine 1 reads MFA_1 from PQ_1
8. Engine 1 carries out the operation specified in MF_1
9. When done, Engine 1 posts MFA_2 into PQ_2
10. Engine 2 reads MFA_2 from PQ_2
11. Engine 2 carries out the operation specified in MF_2
12. When done, Engine 2 posts MFA_0 (read from inter-descriptor) into CQ
13. SDI reads MFA_0 from CQ
14. SDI writes back MFA_0 to FQ for re-cycle In this data flow, the initiator is only involved at the beginning, once the SDI posts MFA_0, the rest of the engines operate on their own. This frees up the SDI so that it can start processing the second request. In other words, there could be as many outstanding in-line operations as the FQ can carry. For example, if FQ contains 256 MFA, then 256 could be outstanding at the same time. This architecture reduces the traditional post and wait scheme for an operation.

Super Descriptors with Loop

Super-descriptor flow supports looping. A loop can be formed by super-descriptor which is generated by Super-Descriptor Initiator. The number of times the super descriptor is looped depends on how SDI constructs the super descriptor. Whenever a super-descriptor enters a loop, it shall pass all the queues in the loop. It is allowed to have a super-descriptor pass the loop several times. All the queues for the same descriptor flow, inside or outside a loop, shall have the same queue pre-defined depth.

Figure 13:
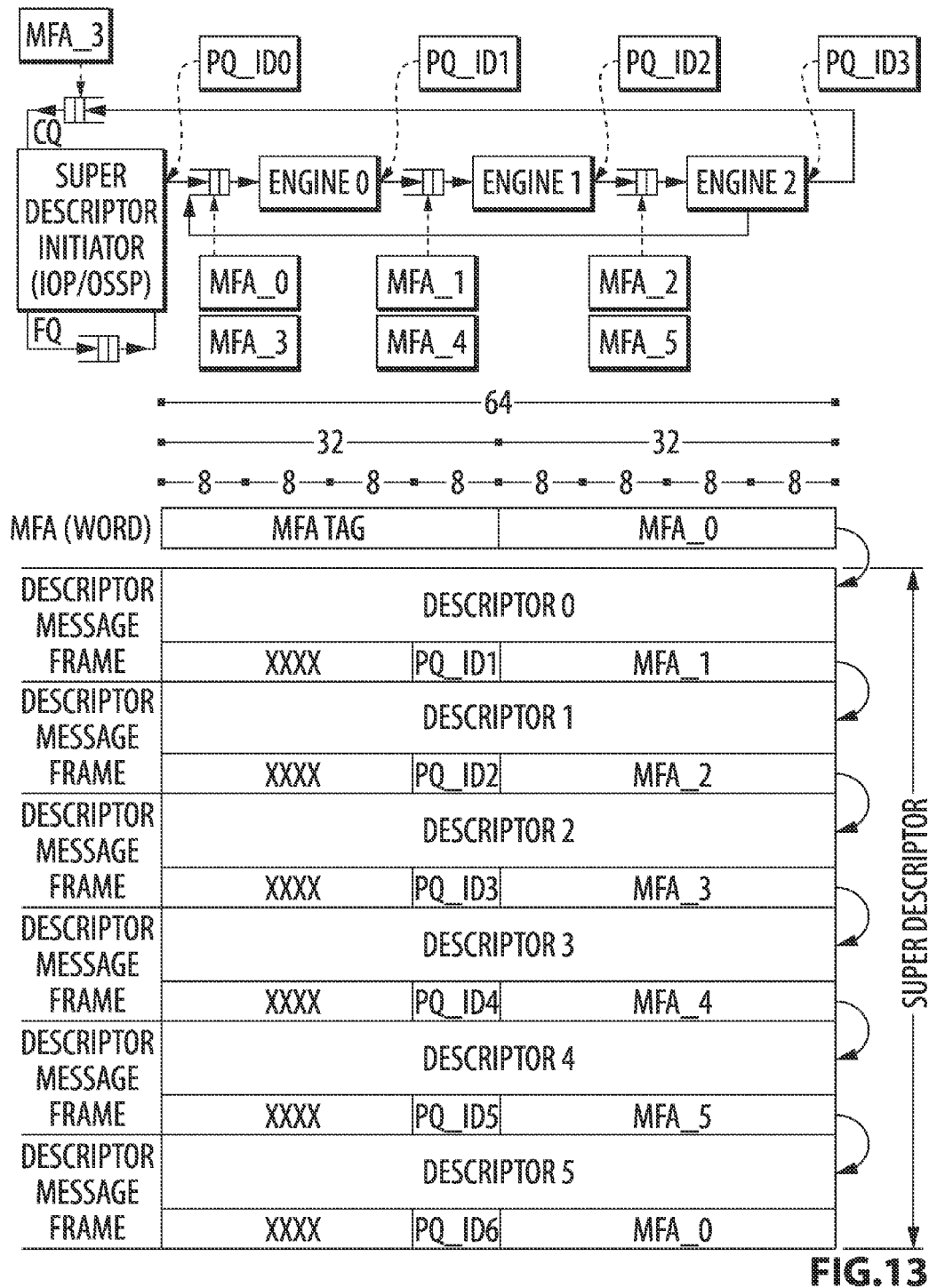
FIG. 13 shows Super Descriptors with loops, according to embodiments of the present disclosure.

FIG. 13 shows a Super Descriptor with a Loop diagram. The diagram shows an in-line operation involving 3 engines. The in-line operation creates a data flow in which data goes from one engine to another and is operated on. The Super Descriptor Initiator uses a 3-Stage FIFO scheme while Engine 0, 1, and 2 use 2-Stage FIFO scheme. After the first pass through Engine 2, it goes back to Engine 0 for another round. Below are the basic operations for this in-line data flow:

1. Steps 1 to 11 are the same as those described above in relation to FIG. 12.
12. When done, Engine 2 posts MFA_3 to PQ_0.
13. Engine 0 reads MFA_3 from PQ_0
14. Engine 0 carries out the operation specified in MF_3
15. When done, Engine 0 posts MFA_4 into PQ_1
16. Engine 1 reads MFA_4 from PQ_1
17. Engine 1 carries out the operation specified in MF_4
18. When done, Engine 1 posts MFA_5 into PQ_2
19. Engine 2 reads MFA_5 from PQ_2
20. Engine 2 carries out the operation specified in MF_5
21. When done, Engine 2 posts MFA_0 (read from inter-descriptor) into CQ
22. SDI reads MFA_0 from CQ
23. SDI writes back MFA_0 to FQ for re-cycle Super Descriptor Initiators In the present disclosure, the controller has two Super Descriptor Initiators (SDI). The two SDI are: SAS subsystem OSSPv and on-chip processor PCSv. These initiators start the in-line data flows by creating individual descriptors and chaining them together. The Inter-Descriptors are filled out by an SDI as part of creating the Super Descriptor. Depending on the SDI, two types of data flows are created:

Hardware data flows—data flows that have super descriptor originated by a hardware block. Currently, only OSSPv can originate a hardware data flow. OSSPv takes a SAS command, and starts posting super descriptor to queues in EGSM to transfer data. The following list contains some of the OSSPv initiated data flows:

Host Read data (drive to PCIe)
Host Write data (PCIe to drive)
Raid Destage from cache to DDR memory
Raid Destage DDR memory to drive
Host In-Line Encryption to/from disk drive
Host In-Line DIF to/from disk drive
Raid In-line XOR
Firmware data flows—data flows that have super descriptor originated by firmware. Firmware starts by building the descriptor for each block and then assemble them into a super descriptor. Then firmware posts it to an engine via a queue in EGSM. The following list contains some of the OSSPv initiated data flows:
Standalone XOR for Raid 5 operation
Standalone XOR for Raid 6 operation
Encryprion Key Wrap/Unwrap operation
Compressed Write Cache to DDR buffer
Compressed and Encrypted Write Cache to DDR buffer FIG. 13 shows the SDI initiating data flows with 3 engines. Although the current invention only limited SAS block (OSSPv) as hardware initiator, the architecture allows flexibility to add more initiators without affecting the per engine operations.

Miscellaneous Terminologies

Below are some of the terminologies related to OSSPv initiated data flows:

IOST—IO Context State Table, this table is located in eGSM. It is used to store per IO information, such as transfer size, host addresses etc.

SAS command—A SAS command is generated by OSSPv to start an IO. Before OSSPv initiates the super descriptor flows for data, it sends a command to the drive to indicate the request. Depending on whether the command is read or write, it kicks off super descriptor flows accordingly.

XFER_RDY frame—A SAS XFER_RDY frame is sent by a drive to indicate that it is ready to receive data frames from the controller.

End-to-End CRC—An end-to-end CRC is generated from one engine to other to ensure that data is protected via a CRC for that descriptor.

Message Frame Address Flow

Figures 14, 15, 16:
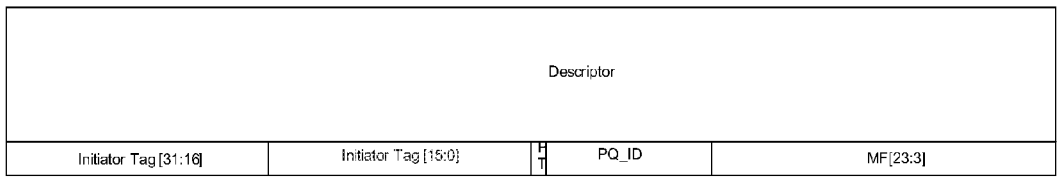
FIG. 14 shows the lower 32 bits of an MFA, according to embodiments of the present disclosure.
FIG. 15 shows the upper 32 bits of an MFA, according to embodiments of the present disclosure.
FIG. 16 shows an Inter-Descriptor field, according to embodiments of the present disclosure.

As MFA is passed from SDI to an engine, and then from one engine to another. The data flow is considered finished when the MFA hits the completion queue for a SDI and SDI puts it back to the Free Queue. The MFA plays an important role on the super descriptor architecture. As shown in FIG. 14, each engine's descriptor is connected via an Inter-descriptor. Each engine uses the information in the inter-descriptor to pass the MFA along.

Message Frame Address

The MFA format is shown in FIG. 14 and FIG. 15. MFA is 64 bit in length. Other than the MF pointer pointing to the descriptor, various fields are defined for different functions.

Fail
In conjunction with the Error Status field, this bit is used for each engine to signify that whether a descriptor operation is carried out successfully. Operations as follow:
1) When a engine first receives a MFA, it checks whether this bit is 1 or 0. If it is set to 0, it means previous engine has successfully completed the operation. If this is 1, the engine should leave the Fail, CRC Error and Error Status [4:0] as is, and writes back the MFA to the completion queue.
2) If the received MFA has the Fail bit set to '0', the engine operates on the MFA. If there is any error, the engine asserts the Fail bit and sets the Error Status and CRC Error accordingly.

0: The operation is completed successfully.
1: Error happens in the operations. OSSPv will report the Error Status and CRC Error to Firmware.
In-line XOR
field used by OSSPv to indicate whether the current data flow is in-line XOR or not.
CRC Error
This field is returned by engines which have CRC checking.
1: CRC Error
0: No CRC Error
Error Status[4:0]
This field is returned by individual engines. In various embodiments, success is set to '0' if Error Status is non-zero.
0x00: No Error
0x01-0x4: OSSPv
0x05-0x8: eRAAE
0x09-0xC: BDMAv
0x0D-0x0F: Compressor/Decompressor
0x10-0x1F: Reserved
CRC Enable
When this bit is set to '1', CRC is enabled. For the engines supporting CRC generation and CRC checking, it should carry out the necessary CRC processing (More details on individual engine CRC feature descriptions).
RAID Engine Num Enable[1:0]/PHYID[2:1]
In various embodiments, the RAID Engine num field is used by eRAAE only
0: MFA[43:40] is a reserved field. For HW flow, RAID Engine Number Enable is always set to '0'.
1: MFA[43:40] represents the RAID engine number for LSFR or data generation or data checking.
When MFA is the completion for OSSP, this field is used as PHYID[2:1].
RAID Type/PHYID[0]
In various embodiments, RAID Type is used by eRAAE only
0: Other RAID, MF size at 64 B
1: Inline, MF size at 32 B.
When the MFA is used for completion of OSSPv, this bit is used as PHYID[0].
MF[23:3]
MF is the starting word address of a Descriptor. In various embodiments, the descriptor is always a multiple of 8-Byte in eGSM address space, so hardware assumes the lower 3-bit of the Descriptor starting address will always be 0. MF[23:0] covers 16G of memory space.
Application Tag/IO Tag [15:0]
This field is setup by OSSPv on all hardware data flows. Depending on the flow type, OSSPv will put either IOST tag or Application specific tag.
Application Tag: the DMA initiator uses this field to track the DMA transfer. This field is application specific.
IO Tag: this is the IOST tag of an IO.
Reserved
This field is reserved for OSSPv.
BDMAv DNPC
When this bit is set to '1', BDMA would not post completion for that descriptor. Note that OSSPv initiated data flows do not have this bit set. This is only for PCSv initiated data flows to use.
RAID Engine Num [3:0]
When RAID Engine Num Enable bit is set to '1', this field represents the engine number for LSFR or data generation or data checking. When RAID Engine Num Enable bit is set to '0', this field is reserved.

Figure 17:
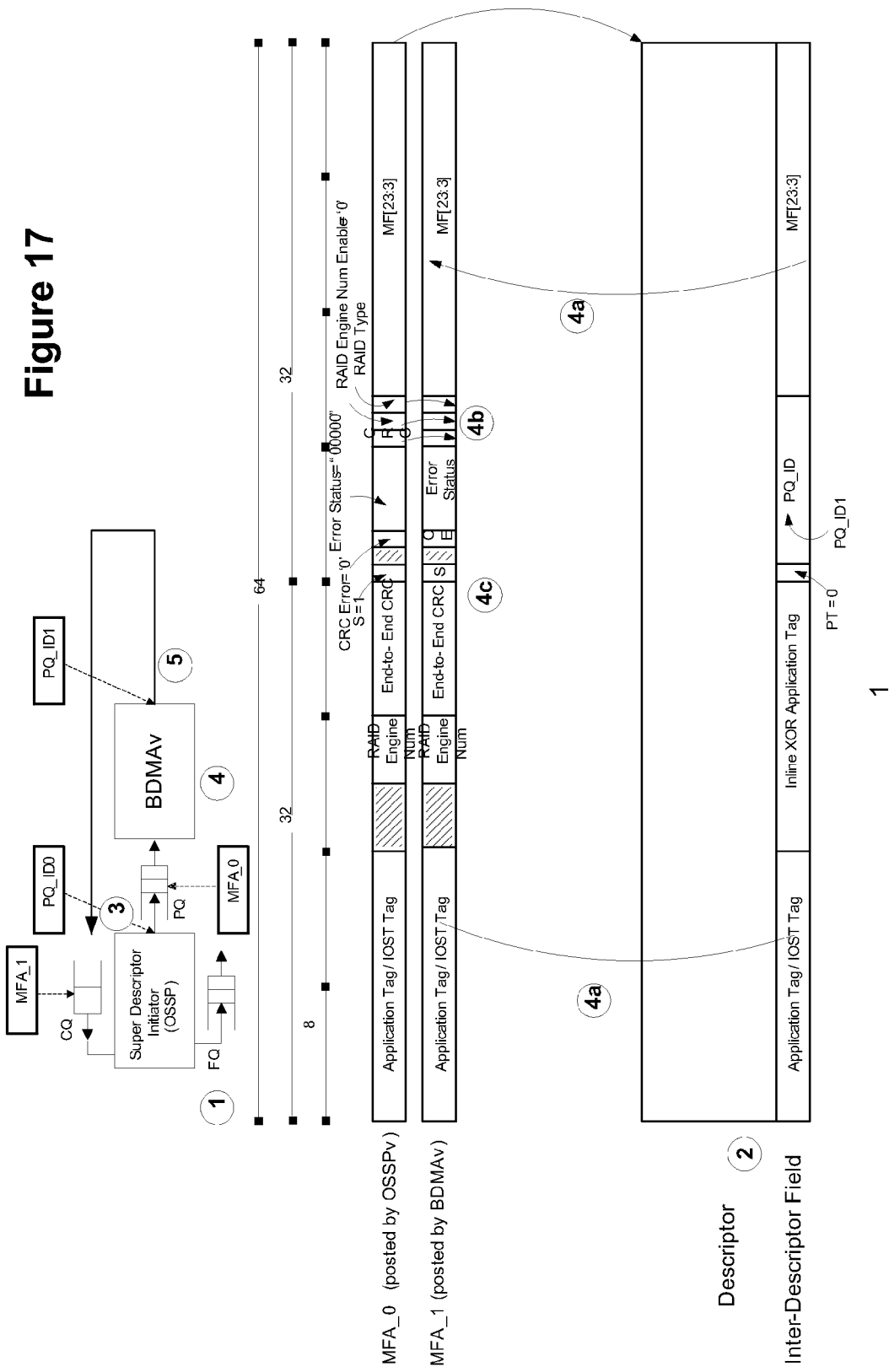
FIG. 17 shows an OSSPv-initiated data flow—RAID destage DDR, according to embodiments of the present disclosure.

End-to-end CRC [7:0]
This field is used to store the end-to-end CRC value.
Inter-Descriptor
An Inter-Descriptor field, such as shown in the example of FIG. 16, is a 64-bit word following each engine's descriptor. In various embodiments, each engine receiving a descriptor reads the inter-descriptor field. In some embodiments, this field is located right after the end of a descriptor.
Application/IOST Tag [15:0]:
This field represents the Application Tag or the IOST Tag
An engine should copy this field to MFA[63:48]
Inline XOR Application Tag [15:0]:
This field represents an additional Application Tag which is only used for Inline XOR by OSSPv
An engine should copy this field to MFA[47:32] only if PT='1'. Note that when PT=1, the Inline XOR Application Tag would overwrite the CRC field in the MFA.
PQ_ID[9:0]:
This field represents the post queue ID for the next transaction. When an engine is done with a descriptor, it writes the MFA to the queue number indicated by PQ_ID.
PT:
This field controls if the Inline XOR Application Tag is copied to MFA[47:32] or not.
1: Inline XOR Application Tag is copied to MFA[47:32]
0: Inline XOR Application Tag is not copied to MFA[47:32]
For engines supporting end-to-end CRC and if CRC_EN=1, it puts end-to-end CRC in MFA [39:32]
For engines not supporting end-to-end CRC or CRC_EN=0, it leaves MFA [47:32] untouched
MF[23:3]:
This field represents the starting word address of the next descriptor.
In various embodiments, an engine copies this field to MFA[20:0] and posts the MFA to completion for the next engine.
The following will show examples on how the MFA and inter-descriptors are related in the super descriptor data flows.
OSSPv Initiated Data Flows
As described above, the SAS block, OSSPv, is one of the super descriptor initiators in the controller. There are various data flows that are initiated by OSSPv. The following will cover some of the data flows as examples. Hardened SAS/SATA Transport Layer Block (HSST) is a block inside OSSPv which deals with SAS Transport layer. All the OSSPv initiated data flows are originated by HSST.
OSSPv Data Flow—Raid Destage DDR
The Raid Destage DDR data flow is used to move data (or Raid XOR results). In this data flow, the in-line operation involves HSST posting descriptors to BDMAv. When BDMAv completes each descriptor, it writes the MFA back to the completion queue. The flow starts off by Raid stack sending on-chip firmware a command to fetch data in DDR memory and write to a disk drive. HSST then sends a write command frame to the disk drive. Once the drive sends HSST a XFER_RDY frame, then HSST starts posting descriptor to BDMAv, requesting data (1 KB at a time) to be moved from DDR to eGSM shared memory. Once BDMAv is done, it writes the MFA to a completion queue for HSST to pick up. HSST reads the completion queue and sends the data to a disk drive. FIG. 17 shows a diagram of the MFA movement.
The process for this data flow is described below.
At 1701, HSST reads a pointer (MFA_0) from the descriptor free queue and a frame buffer from the frame buffer queue.

Figure 18:
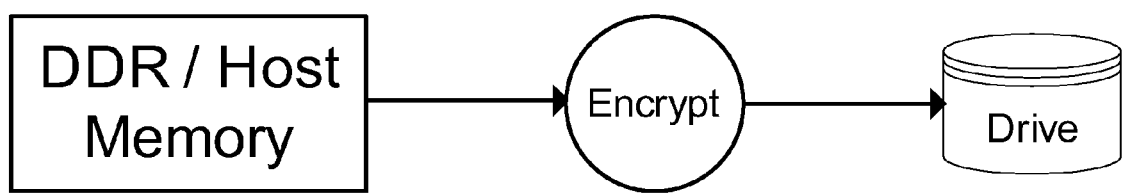
FIG. 18 shows an in-line encryption to drive, according to embodiments of the present disclosure.
Figure 19:
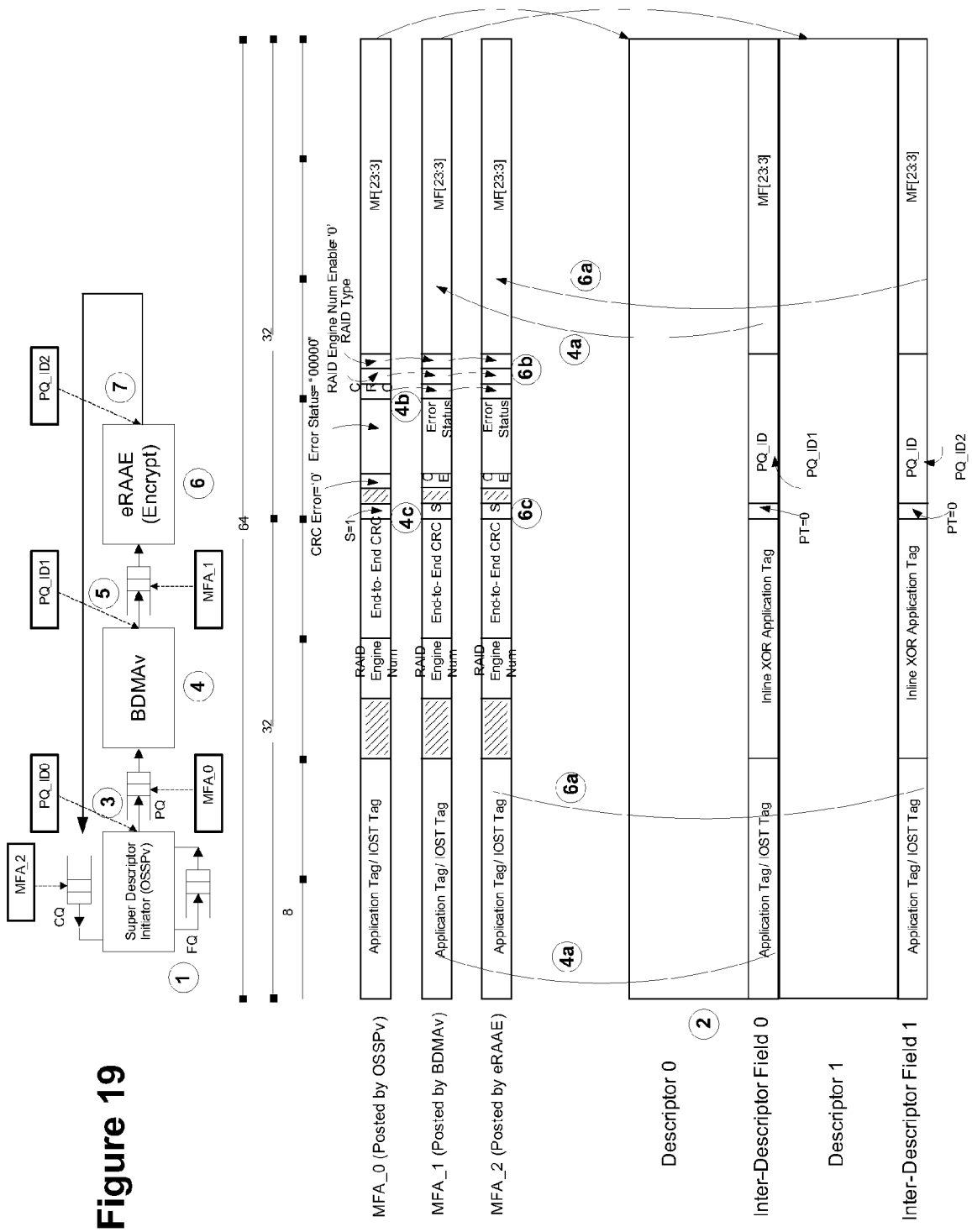
FIG. 19 shows an OSSPv-initiated data flow—in-line encryption, according to embodiments of the present disclosure.

HSST sets up BDMA Descriptor 0 and Inter-Descriptor Field 0. The descriptor content is a combination of IOST context and BDMA descriptor template stored in HSST. The Inter-Descriptor Field contains the next queue for BDMA to post (PQ_ID1). It also contains MF[23:3] for MFA_1 and the application tag.
At 1702, HSST posts MFA_0 to PQ_ID0 (the queue ID of each flow is defined in the queue ID table of HSST). The Fail bit is set to '0'. The CRC Error field is set to '0'. The Error Status field is set to "00000". CRC bit is set to '1' if end-to end CRC is enabled. The RAID Engine Num Enable bit is set to '0'.
At 1703, BDMA reads MFA_0 from queue PQ_ID0. It checks whether the Fail bit in MFA_0 is set to '0', if so, it performs the operation as indicated by the descriptor.
At 1704, after BDMA moves data from DDR to GSM, it starts to create MFA_1:
At 1704*a*, these fields are copied from Inter-Descriptor Field 0 to MFA_1:
MF [23:3] field in Inter-Descriptor 0[20:0] to MF[23:3] in MFA_1[20:0]
Application Tag/IOST Tag [15:0] in Inter-Descriptor 0 [63:48] to Application Tag/IOST Tag [15:0] in MFA_1[63:48] IF PT=1, the in-line XOR Application Tag in Inter-Descriptor 2[47:32] to MFA_1[47:32]
At 1704*b*, these fields are copied from MFA_0 to MFA_1:
RAID Type in MFA_0[21] to RAID Type in MFA_1[21]
CRC (CRC Enable) in MFA_0[23] to CRC in MFA_1[23]
RAID Engine Num Enable in MFA_0[22] to RAID Engine Num Enable in MFA_1[22]
The Reserved Fields
At 1704*c*, these Fields are updated by BDMA:
Fail bit: set to '0' when there is no error; set to '1' when error occurs
CRC Error: set to 0' when there is no CRC error; set to '1' when CRC error occurs
Error Status: set to a value defined for BDMA
If PT=0, and CRC Enable=1, BDMA writes the generated CRC in MFA_1[39:32].
If PT=0, and CRC Enable=0, BDMA writes 0x0000 in MFA_1[47:32].
At 1705, BDMA posts MFA_1 it created to PQ_ID1 (CQ for HSST) which is read from Inter-Descriptor Field 0.
As indicated above, when 5 is finished, the Super Descriptor flow is considered to be finished. HSST reads the completion queue and sends the data to the drive. To improve efficiency, HSST could pipeline multiple descriptors for the same data flow. After step 2, HSST could setup the sequent MFA and descriptor and post to PQ_ID0 again. The outstanding number of descriptors is determined by the memory space for the descriptor and the queue depth of PQ. As such, while sending data for the first completion MFA, the second completion could arrive, and HSST can continue to send data until the XFER_RDY size is fulfilled. This reduces the idle period of waiting for MFA completion.
OSSPv Data Flow—In-line Encryption
In this data flow (shown in FIG. 18), data is read from the DDR or host memory and is encrypted before sending to disk drive. The in-line operation involves HSST posting descriptors to BDMAv and eRAAE. When eRAAE completes each descriptor, it writes the MFA back to the completion queue. The flow starts off by host or RAID stack sending on-chip firmware a command to fetch data from host (DDR), encrypt the data and write the data to a disk drive. HSST then sends a write command frame to the disk drive. Once the drive sends HSST a XFER_RDY frame, then HSST starts posting descriptor to BDMAv, requesting data (1 KB each descriptor) to be moved from host to eGSM shared memory. Upon completion, BDMAv posts the next MFA to a queue, which is read by eRAAE. eRAAE then fetches the data and encrypts it. When completed, eRAAE writes back the completion to HSST. HSST then sends the 1 KB data out and assemble a SAS frame to send to a disk drive. FIG. 19 shows a diagram of the MFA movement.

The process for this data flow is described below.

At 1901, HSST reads a pointer (MFA__0) from the descriptor free queue and a frame buffer from the frame buffer queue HSST sets up Super Descriptor and Inter-Descriptor Fields. The descriptor content is a combination of IOST context and descriptor template stored in HSST. For Inter-Descriptor 0, it contains the next queue for BDMA to post (PQ_ID1). It also contains MF[23:3] for MFA__1 and the application tag.

At 1902, HSST posts MFA__0 to PQ_ID0 (the queue ID of each flow is defined in the queue ID table of HSST). The success (S) bit is set to '1'. The Error Status field is set to "00000". CRC bit is set to '1' if end-to-end CRC is enabled. The RAID Engine Num Enable bit is set to '0'.

At 1903, BDMA reads MFA__0 from PQ_ID0. It checks whether the success (S) bit in MFA__0 is set to '1', if so, it performs the operation as indicated by the descriptor.

At 1904, after BDMA moves data from host/DDR to eGSM, it starts to create MFA__1:

At 1904a, these fields are copied from Inter-Descriptor Field 0 to MFA__1:

MF [23:3] field in Inter-Descriptor 0[20:0] to MF[23:3] in MFA__1[20:0]

Application tag/IOST Tag[15:0] in Inter-Descriptor 0[63:48] to Application Tag/IO Tag[15:0] in MFA__1[63:48]

IF PT=1, the in-line XOR Application Tag in Inter-Descriptor 0[47:32] to MFA__1[47:32]

At 1904b, these fields are copied from MFA__0 to MFA__1:

RAID Type in MFA__0[21] to RAID Type in MFA__1[21]

CRC (CRC Enable) in MFA__0[23] to CRC in MFA__1[23]

RAID Engine Num Enable in MFA__0[22] to RAID Engine Num Enable in MFA__1[22]

The Reserved Fields

At 1904c, these fields are updated by BDMA:

Success (S) bit: set to '1' when there is no error; set to '0' when error occurs CRC Error: set to '0' when there is no CRC error; set to '1' when CRC error occurs Error Status: set to a value defined for BDMA If PT=0, and CRC Enable=1, BDMA writes the generated CRC in MFA__1[39:32]

If PT=0, and CRC Enable=0, BDMA writes 0x0000 in MFA__1[47:32]

At 1905, BDMA posts MFA__1 it created to PQ_ID1, which is read from Inter-Descriptor Field 0

At 1906, eRAAE reads MFA__1 from queue PQ_ID1. It checks whether the Fail bit in MFA__1 is set to '0', if so, it performs the operation as indicated by the descriptor After eRAAE completes its operation, it starts to create MFA__2:

At 1906a, these fields are copied from Inter-Descriptor Field 1 to MFA__2:

MF [23:3] field in Inter-Descriptor 1 [20:0] to MF[23:3] in MFA__2[20:0]

Application Tag/IOST Tag[15:0] in Inter-Descriptor 1[63:48] to Application Tag/IO Tag[15:0] in MFA__2[63:48]

IF PT=1, the in-line XOR Application Tag in Inter-Descriptor 1[47:32] to MFA__2[47:32]

At 1906b, these fields are copied from MFA__1 to MFA__2:

RAID Type in MFA__1[21] to RAID Type in MFA__2[21]

CRC (CRC Enable) in MFA__1[23] to CRC in MFA__2[23]

RAID Engine Num Enable in MFA__1[22] to RAID Engine Num Enable in MFA__2[22]

At 1906c, these fields are updated by eRAAE:

Fail bit: set to '0' when there is no error; set to '1' when error occurs

CRC Error: set to '0' when there is no CRC error; set to '1' when CRC error occurs Error Status: set to a value defined for eRAAE If PT=0, and CRC Enable=1, eRAAE writes the generated CRC in MFA__2[39:32]

If PT=0, and CRC Enable=0, eRAAE writes 0x0000 in MFA__2[47:32]

At 1907, eRAAE posts MFA__2 it created to PQ_ID2 (CQ for HSST) which is read from Inter-Descriptor Field 1

As indicated above, when 7 is finished, the Super Descriptor flow is considered to be finished. HSST reads the completion queue and sends the data to the drive. Similar to other data flows, to improve efficiency, in some embodiments, HSST posts multiple outstanding descriptors to a PQ. When sending the data for the first completion MFA, the second completion could arrive, and HSST can continue to send data using the subsequent completion MFA until the XFER_RDY size is fulfilled.

OSSPv Data Flow—RAID In-line XOR for Parity Calculation

The In-Line XOR data flow is for calculating Parity buffer for Raid operation. Data is first read from the disk and stored in the local buffer memory in eGSM. Meanwhile, temporary parity information is read from the DDR memory and stored in the local buffer memory. Then, the XOR engine computes the XOR operation and stores the result back into the DDR memory.

Figure 20:
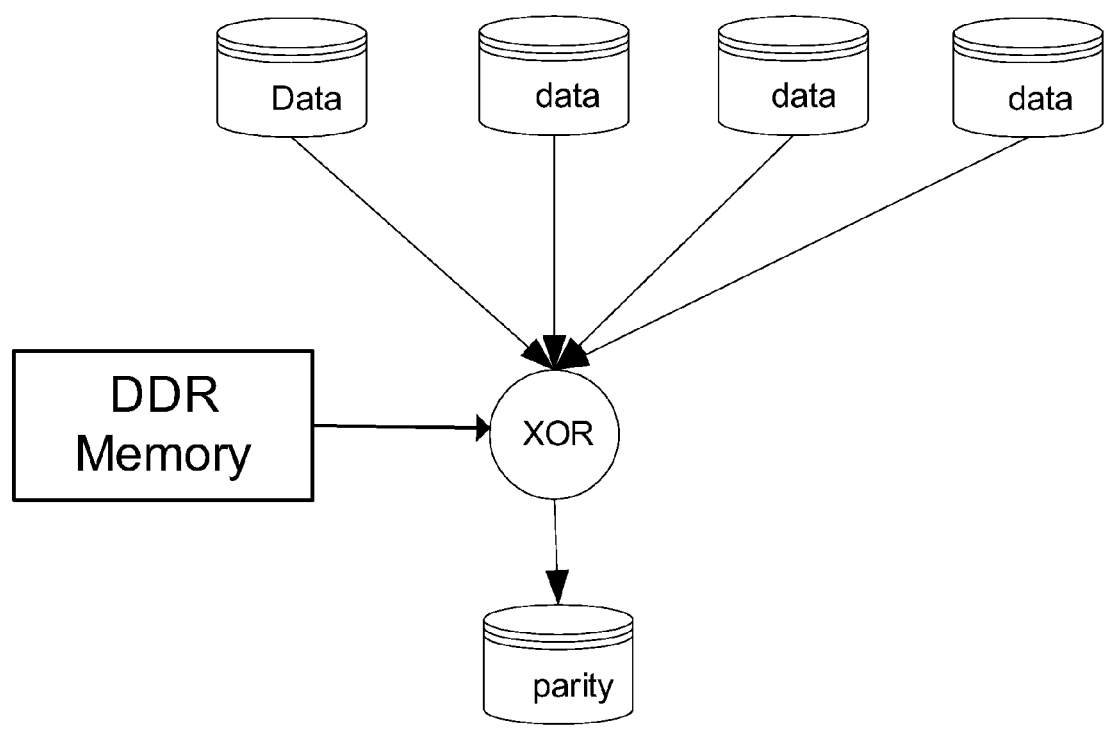
FIG. 20 shows in-line XOR for RAID parity calculation, according to embodiments of the present disclosure.
Figure 21:
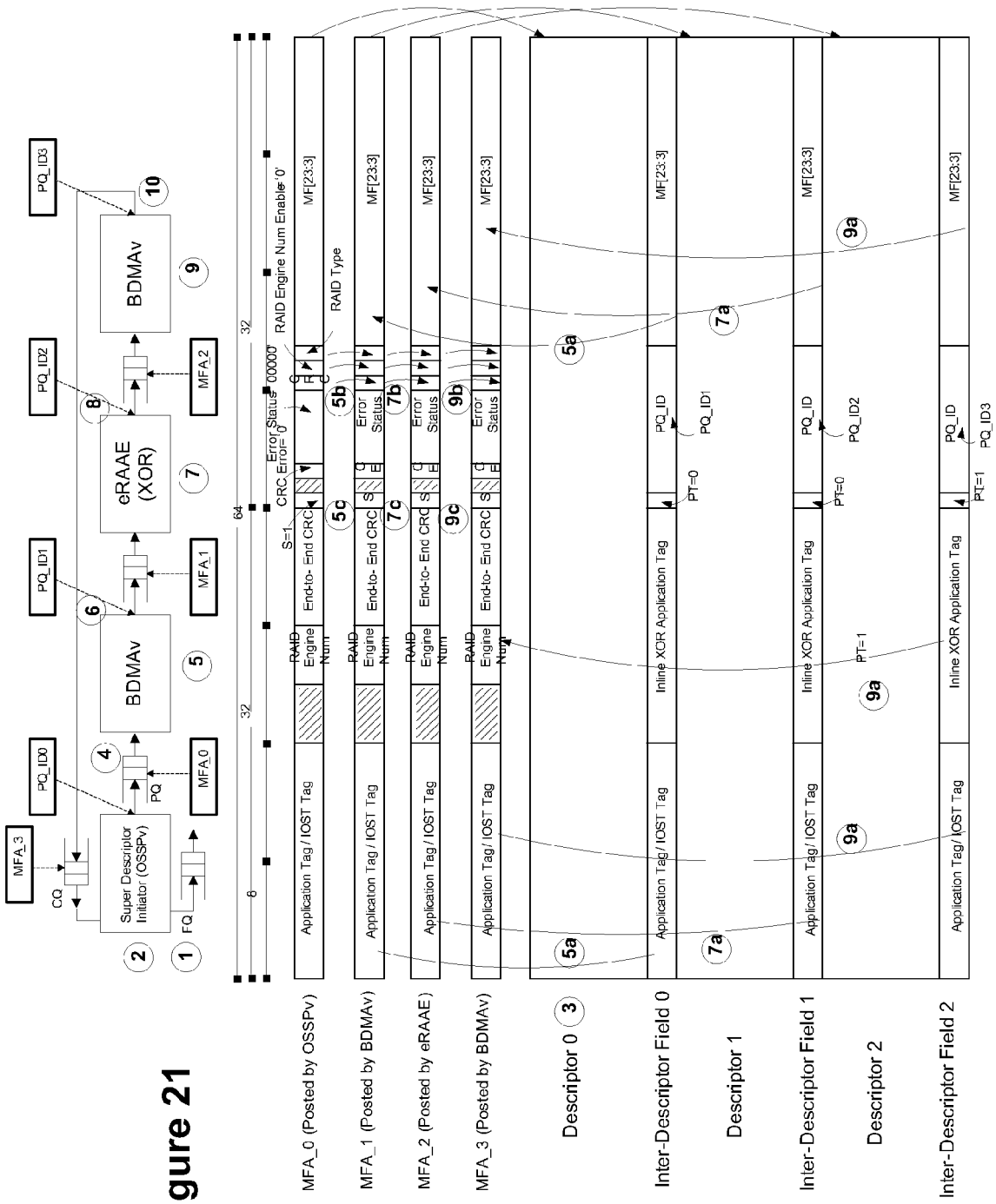
FIG. 21 shows an OSSPv-initiated data flow—RAID in-line XOR, according to embodiments of the present disclosure.

In this data flow (shown in FIG. 20), the in-line operation involves HSST posting descriptors to BDMAv and eRAAE. When eRAAE completes each descriptor, it writes the MFA to BDMAv to move data back to DDR memory. When BDMAv is done moving data back to DDR memory, it writes completion MFA back to HSST. The flow starts off by host or RAID stack sending on-chip firmware a command to fetch data from the disk drive, and as data frames come into the OSSPv, it creates super descriptor and starts posting it to BDMAv, requesting data (1 KB at a time) to be moved from DDR memory to eGSM shared memory. Upon completion, BDMAv posts the next MFA to a queue, which is read by eRAAE. eRAAE then fetches the data and carries out the XOR operation. When complete, eRAAE writes back the completion to HSST. HSST then frees up its' internal frame buffers. FIG. 21 shows a diagram of the MFA movement.

The process for this data flow is described below.

At 2101, HSST reserves a free buffer for incoming frame. It receives a data frame from a disk drive and writes to the free buffer.

At 2102, it reads a pointer (MFA__0) from the descriptor free queue and another frame buffer from frame buffer queue.

At 2103, HSST setup BDMA Descriptors and Inter-Descriptor Fields. The descriptor content is a combination of IOST context and descriptor templates stored in HSST. For Inter-descriptor 0, it contains the next queue for BDMA to post (PQ_ID1). It also contains MF[23:3] for MFA__1 and the Application Tag.

HSST posts MFA__0 to PQ_ID0 (the queue ID of each flow is defined in the queue ID table of HSST). The Fail bit is set to '0'. The Error Status field is set to "00000". CRC bit is set to '1' if end-to-end CRC is enabled. (End-to-end CRC is disabled for Inline XOR data flow). The RAID Engine Num Enable bit is set to '0'.

At 2104, BDMA reads MFA__0 from queue PQ_ID0. It checks whether the Fail bit in MFA__0 is set to '0', if so, it performs the operation as indicated by the descriptor.

At 2105, after BDMA moves data from DDR to eGSM, it starts to create MFA__1:

At 2105*a*, these fields are copied from Inter-Descriptor Field 0 to MFA__1:

MF [23:3] field in Inter-Descriptor 0[20:0] to MF[23:3] in MFA__1[20:0]

Application Tag/IOST Tag[15:0] in Inter-Descriptor 0[63:48] to Application Tag/IOST Tag[15:0] in MFA__1[63:48]

IF PT=1, the in-line XOR Application Tag in Inter-Descriptor 0[47:32] to MFA__1[47:32]

At 2105*b*, these fields are copied from MFA__0 to MFA__1:
RAID Type in MFA__0[21] to RAID Type in MFA__1[21]
CRC (CRC Enable) in MFA__0[23] to CRC in MFA 1[23]
RAID Engine Num Enable in MFA__0[22] to RAID Engine Num Enable in MFA__1[22]
The Reserved Fields At 2105*c*, these fields are updated by BDMA:
Fail bit: set to '0' when there is no error; set to '1' when error occurs
CRC Error: set to 0' when there is no CRC error; set to '1' when CRC error occurs
Error Status: set to a value defined for BDMA
If PT=0, and CRC Enable=1, BDMA writes the generated CRC in MFA__1[39:32]
If PT=0, and CRC Enable=0, BDMA writes 0x0000 in MFA__1[47:32]

At 2106, BDMA posts MFA__1 to PQ_ID1 which is read from Inter-Descriptor Field 0.

At 2107, RAAE reads MFA__1 from PQ_ID1. It checks whether the Fail bit in MFA__1 is set to '0', if so, it performs the operation as indicated by the descriptor.

After RAAE is completed, it starts to create MFA__2:

At 2107*a*, these fields are copied from Inter-Descriptor Field 1 to MFA__2:
MF [23:3] field in Inter-Descriptor 1 [20:0] to MF[23:3] in MFA__1[20:0]
Application Tag/IOST Tag[15:0] in Inter-Descriptor 1[63:48] to Application Tag/IOST Tag[15:0] in MFA__2[63:48]
IF PT=1, the in-line XOR Application Tag in Inter-Descriptor 1[47:32] to MFA__2[47:32]

At 2107*b*, these fields are copied from MFA__1 to MFA__2:
RAID Type in MFA__1[21] to RAID Type in MFA__2[21]
CRC (CRC Enable) in MFA__1[23] to CRC in MFA__2 [23]
RAID Engine Num Enable in MFA__1[22] to RAID Engine Num Enable in MFA__2[22]
The Reserved Fields At 2107*c*, these fields are updated by RAAE:
Fail bit: set to '0' when there is no error; set to '1' when error occurs
CRC Error: set to '0' when there is no CRC error; set to '1' when CRC error occurs
Error Status: set to a value defined for BDMA
If PT=0, and CRC Enable=1, BDMA writes the generated CRC in MFA__2[39:32]
If PT=0, and CRC Enable=0, BDMA writes 0x0000 in MFA__2[47:32]

At 2108, RAAE posts MFA__2 it created to PQ_ID2 which is read from Inter-Descriptor Field 1.

At 2109, BDMA reads MFA__2 from queue PQ_ID2. It checks whether the Fail bit in MFA__2 is set to '0', if so, it performs the operation as indicated by the descriptor.

At 2109*a*, after BDMA moves data from GSM to DDR, it starts to create MFA__3:

These fields are copied from Inter-Descriptor Field 2 to MFA__3:

MF[23:3] field in Inter-Descriptor Field 2 to MF[23:3] in MFA__3[20:0]

Application Tag/IOST Tag[15:0] in Inter-Descriptor 2[63:48] to Application Tag/IOST Tag[15:0] in MFA__3[63:48]

IF PT=1, the in-line XOR Application Tag in Inter-Descriptor 2[47:32] to MFA__3[47:32]

At 2109*b*, these fields are copied from MFA__2 to MFA__3:
RAID Type in MFA__2[21] to RAID Type in MFA__3[21]
CRC (CRC Enable) in MFA__2[23] to CRC in MFA 3[23]
RAID Engine Num Enable in MFA__2[22] to RAID Engine Num Enable in MFA__3[22]
The Reserved Fields At 2109*c*, these fields are updated by BDMA:
Fail bit: set to '0' when there is no error; set to '1' when error occurs
Error Status: set to a value defined for BDMA
If PT=0, and CRC Enable=1, BDMA writes the generated CRC in MFA__3[39:32]
If PT=0, and CRC Enable=0, BDMA writes 0x0000 in MFA__3[47:32]

BDMA posts MFA__3 it created to PQ_ID3 (CQ of OSSPv) which is read from Inter-Descriptor Field 2.

As indicated above, when 10 is finished, the Super Descriptor flow is considered to be finished for one frame (typically 1 KB). HSST reads the completion queue and frees up the frame buffers. The process repeats until all the data frames are XORed and the resulting parity data is moved into DDR memory.

PCSv Initiated Data Flows

The Processor Complex Sub-system (PCSv) initiated data flow is very similar to the OSSPv initiated ones. The main difference is that firmware running in the processor is responsible for creating the descriptors and inter-descriptors, as well as posting to the right queue and reading completion queue. As a result, the PCSv initiated data flows are not as efficient as ones from OSSPv as firmware overhead is incurred on a per super descriptor basis. However, PCSv as initiator provides a lot of flexibility as the data flows, i.e. the way the individual descriptors are connected, is completely controlled by firmware. As a result, the behavior can easily be changed. In essence, data flows are not fixed for PCSv initiated flows. An example PCSv initiated data flow is described below.

PCSv Data Flow—Standalone XOR for RAID 5

The Standalone XOR for Raid 5 operation is used to write encrypted data from write cache to a DDR buffer. Data is first read from the individual DDR buffers and are stored in the local buffer memories in eGSM. The XOR engine computes the XOR operation and stores the result back into the DDR memory. Note that XOR engine allows 2 input buffers per operation. As such, the data flow needs to go through all the DDR Memory in pipeline stages.

Figure 22:
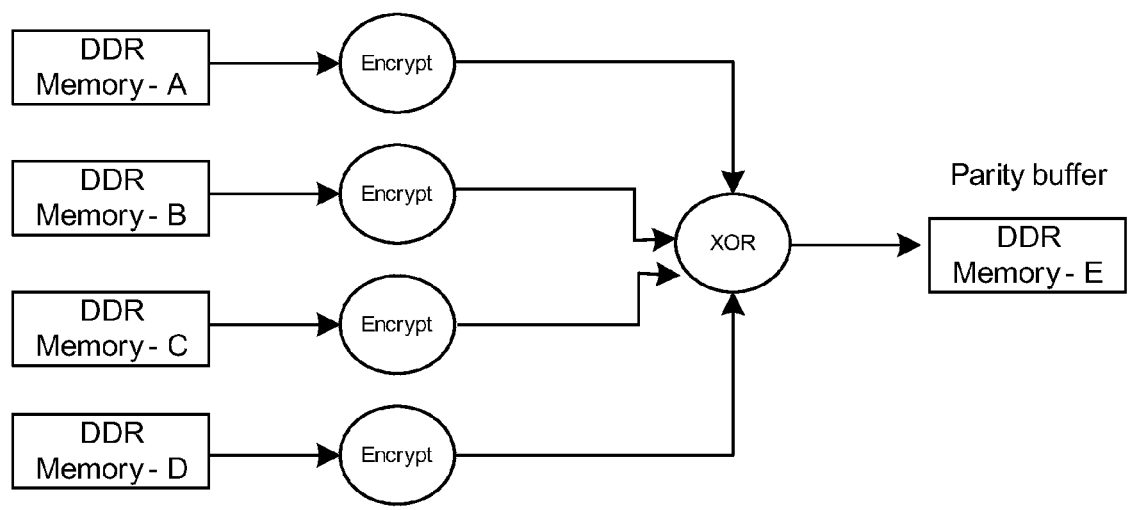
FIG. 22 shows a RAID standalone XOR data flow, according to embodiments of the present disclosure.

In the data flow shown in FIG. 22, the in-line operation involves PCSv posting descriptors to BDMAv and eRAAE (Encryption and XOR). This data flow is designed to support the RAID 5 parity generation or data re-generation function. When eRAAE XOR engine completes each descriptor, it writes the MFA back to the completion queue.

Figure 23:
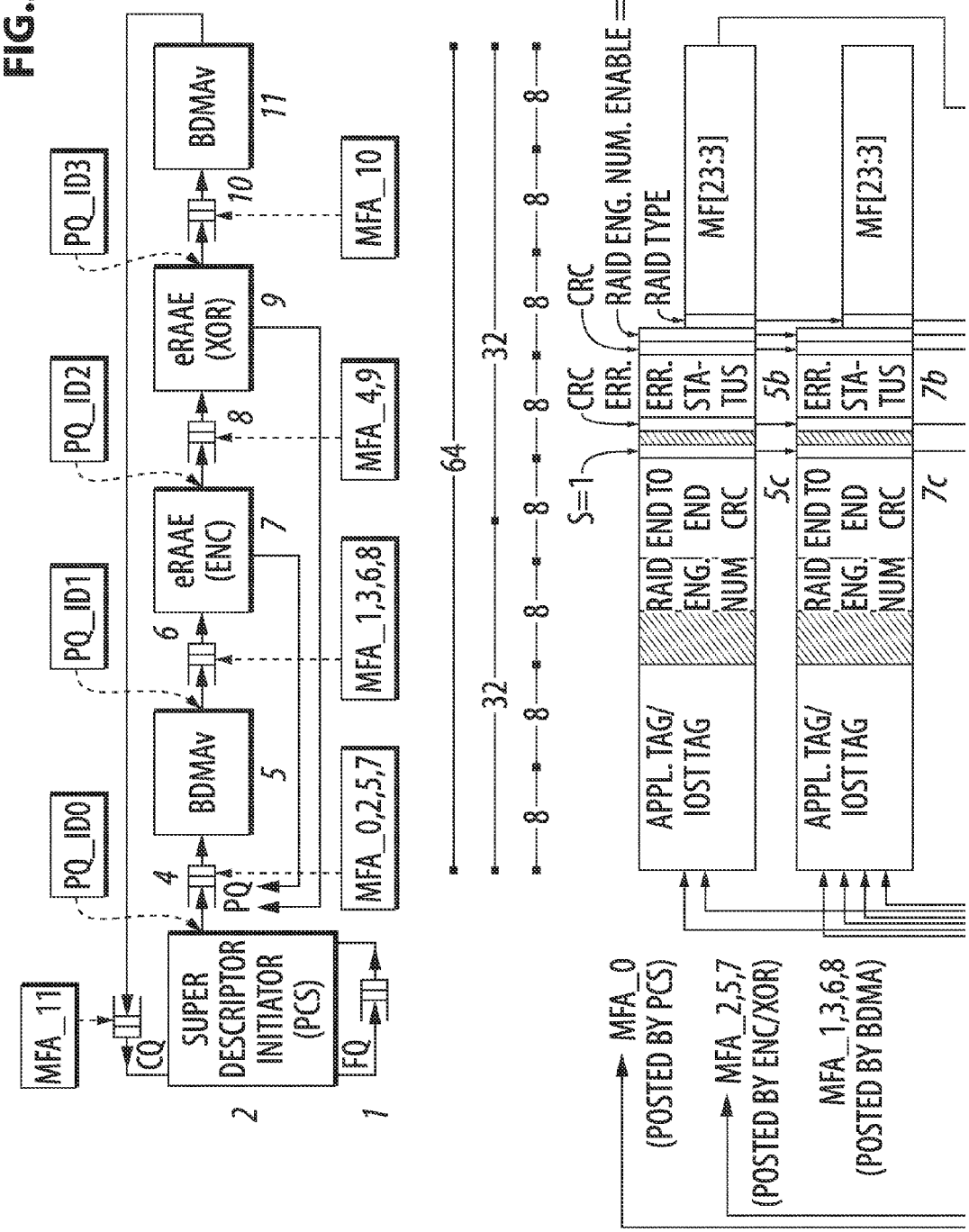
FIG. 23 shows a PCSv-initiated data flow—RAID XOR, according to embodiments of the present disclosure.

The major difference between PCSv initiated data flow and OSSPv data flow is that the data each descriptor processes has no relation to SAS frame size. As such, each descriptor can be larger than 1K byte. An example of PCSv-initiated Data Flow is shown at FIG. 23.

The process for this data flow is described below.

At 2301, PCS reads a pointer (MFA_0) from the descriptor free queue and allocates the necessary DDR buffers (A-E)

At 2302, PCS setup Descriptor 0 to 10 and Inter-Descriptor Field 0 to 10. The descriptor contains fields about the data to be fetched by BMDA, such as size and address, or information for encrypting the data, such as key value. The Inter-Descriptor Field 0 contains the next queue for BDMA to post (PQ_ID1). It also contains MF[23:3] for MFA_1 and the Application Tag.

At 2303, PCS posts MFA_0 to PQ_ID0 (the queue ID of each flow is defined in the queue ID). The Fail bit is set to '0'. The Error Status field is set to "00000". CRC bit is set to '1' if end-to-end CRC is enabled. The RAID Engine Num Enable bit is set to '0'.

At 2304, BDMA reads MFA_0 (or 2,5,7) from queue PQ_ID0. It checks whether the Fail bit in MFA is set to '0', if so, it performs the operation as indicated by the descriptor.

At 2305, after BDMA moves data from DDR (A,B,C,D) to internal GSM, it starts to create MFA_1 (or 3,6,8) for RAAE encryption engine:

At 2305*a*, these fields are copied from Inter-Descriptor Field 0 (or 2,5,7) to MFA_1 (or 3,6,8):
MF [23:3] field in Inter-Descriptor 0[20:0] to MF[23:3] in MFA[20:0]
Application Tag/IOST Tag[15:0] in Inter-Descriptor 0[63:48] to Application Tag/IOST Tag[15:0] in MFA[63:48]
IF PT=1, the in-line XOR Application Tag in Inter-Descriptor 0[47:32] to MFA[47:32]

At 2305*b*, these fields are copied from MFA_0 (or 2,5,7) to MFA_1 (or 3,6,8):
RAID Type in MFA_0[21] to RAID Type in MFA[21]
CRC (CRC Enable) in MFA_0[23] to CRC in MFA[23]
RAID Engine Num Enable in MFA_0[22] to RAID Engine Num Enable in MFA[22]
The Reserved Fields At 2305*c*, these fields are updated by BDMA:
Fail bit: set to '0' when there is no error; set to '1' when error occurs
CRC Error: set to '0' when there is no CRC error; set to '1' when CRC error occurs
Error Status: set to a value defined for BDMA
If PT=0, and CRC Enable=1, BDMA writes the generated CRC in MFA[39:32]
If PT=0, and CRC Enable=0, BDMA writes 0x0000 in MFA[47:32]

At 2306, BDMA posts MFA_1 (or 3,6,8) to PQ_ID1 which is read from Inter-Descriptor Field 0 (or 2,5,7). These descriptors are posted for RAAE Encryption engine to read At 2307, after RAAE encryption is completed, it starts to create MFA_2 (or 7) for BDMA to fetch more data or MFA_4 (or 9) for RAAE-XOR:

At 2307*a*, these fields are copied from Inter-Descriptor Field 1 (or 6) to MFA_2 (or 7) or Inter-Descriptor 3 (or 8) to MFA_4 (or 9):
MF[23:3] field in Inter-Descriptor [20:0] to MF[23:3] in MFA[20:0]
Application Tag/IOST Tag[15:0] in Inter-Descriptor 1[63:48] to Application Tag/IOST Tag[15:0] in MFA[63:48]
IF PT=1, the in-line XOR Application Tag in Inter-Descriptor 1[47:32] to MFA[47:32]

At 2307*b*, these fields are copied from MFA_1 (or 6) to MFA_2 (or 7) or from MFA_3 (or 8) to MFA_4 (or 9):
RAID Type in MFA[21] to RAID Type in MFA[21]
CRC (CRC Enable) in MFA[23] to CRC in MFA[23]
RAID Engine Num Enable in MFA[22] to RAID Engine Num Enable in MFA[22]
The Reserved Fields At 2307*c*, these fields are updated by RAAE:
Fail bit: set to '0' when there is no error; set to '1' when error occurs
CRC Error: set to '0' when there is no CRC error; set to '1' when CRC error occurs
Error Status: set to a value defined for BDMA
If PT=0, and CRC Enable=1, BDMA writes the generated CRC in MFA_2[39:32]
If PT=0, and CRC Enable=0, BDMA writes 0x0000 in MFA_2[47:32]

At 2308, at this point, the data flow either continues with XOR engine or goes back to BDMA to fetch more data. The decision is based on the number of PQ_ID in the MFA_1 (or 3,6,8). If it goes to BDMA, RAAE posts MFA_2 (or 5,7), then the flow goes back to step 4. If it goes to XOR, RAAE posts MFA_4 (or 9), it then continues to the next step.

At 2309, RAAE XOR reads MFA_4 (or 9) from queue PQ_ID2. It checks whether the Fail bit in MFA is set to '0', if so, it performs the operation as indicated by the descriptor.

After RAAE finishes XOR with data, it starts to create MFA_5 (or 10), depending on whether the data flow needs more data or completes with data written back to DDR buffer E:

At 2309*a*, these fields copied from Inter-Descriptor Field 4 (or 9) to MFA_5 (or 10):
MF [23:3] field in Inter-Descriptor Field to MF[23:3] in MFA[20:0]
Application Tag/IOST Tag[15:0] in Inter-Descriptor 2[63:48] to Application Tag/IOST Tag[15:0] in MFA[63:48]
IF PT=1, the in-line XOR Application Tag in Inter-Descriptor 2[47:32] to MFA[47:32]

At 2309*b*, these fields are copied from MFA_4 (or 9) to MFA_5 (or 10):
RAID Type in MFA[21] to RAID Type in MFA[21]
CRC (CRC Enable) in MFA[23] to CRC in MFA[23]
RAID Engine Num Enable in MFA[22] to RAID Engine Num Enable in MFA[22]
The Reserved Fields At 2309*c*, these fields are updated by RAAE:
Fail bit: set to '0' when there is no error; set to '1' when error occurs
Error Status: set to a value defined for BDMA
If PT=0, and CRC Enable=1, BDMA writes the generated CRC in MFA[39:32]
If PT=0, and CRC Enable=0, BDMA writes 0x0000 in MFA[47:32]

At 2310, RAAE posts MFA_5 (or 10) and posts it to PQ_ID0 or PQ_ID3 which is read from Inter-Descriptor Field. It goes to PQ_ID0 to fetch more data from host or it goes to PQ_ID3 to write data back to DDR buffer E.

At 2311, BDMA reads MFA_10 from queue PQ_ID3. It checks whether the Fail bit in MFA is set to '0', if so, it performs the operation as indicated by the descriptor.

After BDMA moves data from internal GSM to DDR buffer E, it starts to creates MFA_11:

At 2311*a*, these fields are copied from Inter-Descriptor Field 10 to MFA_11:
MF [23:3] field in Inter-Descriptor [20:0] to MF[23:3] in MFA[20:0]

Application Tag/IOST Tag[15:0] in Inter-Descriptor 0[63:48] to Application Tag/IOST Tag[15:0] in MFA[63:48]

IF PT=1, the in-line XOR Application Tag in Inter-Descriptor[47:32] to MFA[47:32]

At 2311*b*, these fields are copied from MFA__10 to MFA__11:

RAID Type in MFA[21] to RAID Type in MFA[21]
CRC (CRC Enable) in MFA[23] to CRC in MFA[23]
RAID Engine Num Enable in MFA[22] to RAID Engine Num Enable in MFA[22]

The Reserved Fields

At 2311*c*, these fields are updated by BDMA:

Fail bit: set to '0' when there is no error; set to '1' when error occurs

CRC Error: set to '0' when there is no CRC error; set to '1' when CRC error occurs Error Status: set to a value defined for BDMA If PT=0, and CRC Enable=1, BDMA writes the generated CRC in MFA[39:32]

If PT=0, and CRC Enable=0, BDMA writes 0x0000 in MFA[47:32]

BDMA posts MFA__11 to CQ for PCS to read.

As indicated above, when step 12 is finished, the Super Descriptor flow is considered to be finished for one strip. PCSv reads the completion queue and frees up the DRR frame buffers. The process repeats until all the data strips are XORed and moved to host/DDR memory.

SDS Supported Data Flows

The PCSv initiated data flows provide a flexible way to control the operation of the engines. However, it incurs overhead to PCS, as every descriptor is created by PCS. For repetitive descriptors that only change slightly (for example, only change address field from one super descriptor flow to another), the cost of interrupting the PCSv processor and re-create the super descriptors is very high. The data flow shown in FIG. 23 involves PCSv to create 10 descriptors, 10 inter-descriptors and reserve 10 MFA for 1 strip. If the RAID operations require hundreds of strips, the processor will spend a lot of power modifying some of the fields of the descriptors and re-posting them to the PQ.

As described above, the Super Descriptor Sequencer (SDS) provides programmability for data flows by using a small dedicated processor inside it. SDS can create or modify super descriptors related tasks that originated by PCSv. It can modify parameters inside descriptor fields for inter-descriptor communications. In addition, it can allocate resources, such as eGSM, DDR buffers.

SDS Data Flow—Raid Standalone XOR with SDS

The RAID Standalone XOR data flow is used in Raid 5 parity buffer calculation or data re-generation. In this data flow, shown in FIGS. 24 and 25, the in-line operation involves PCSv posting descriptors to BDMAv and eRAAE (Encryption and XOR). This data flow is designed to support the RAID 5 parity generation or data re-generation function. When eRAAE XOR engine completes each descriptor, it writes the MFA back to the completion queue.

The major difference between PCSv initiated data flow and OSSPv data flow is that the data each descriptor processes has no relation to SAS frame size. As such, each descriptor can be larger than 1K byte.

Figure 24:
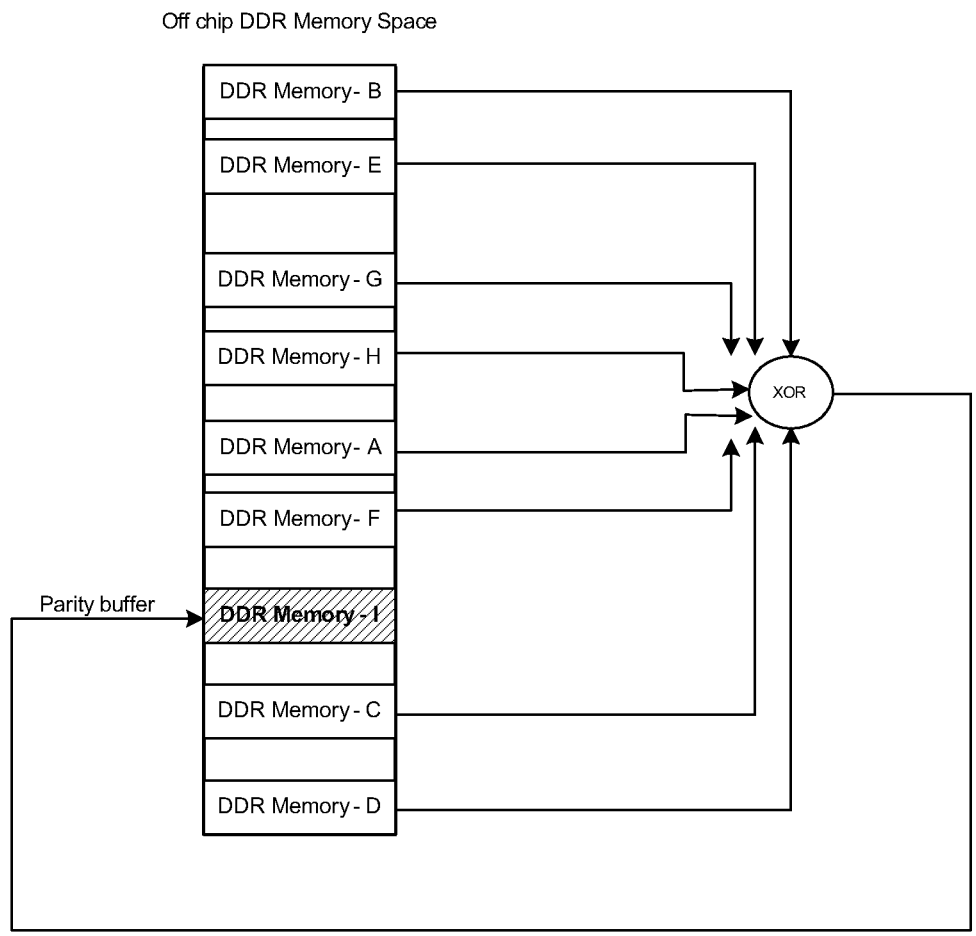
FIG. 24 shows a RAID XOR data flow with SDS, according to embodiments of the present disclosure.

The process for the data flow of FIGS. 24 and 25 is explained below:

At 2501, PCS reads a pointer (MFA__0) from the descriptor free queue and allocates the necessary DDR buffers (A-E)

At 2502, PCS setup SDS Descriptor 0 and Inter-Descriptor Field 0. The descriptor contains fields about the DDR buffers (A-H) to be fetched, such as size and address of each DDR buffer. The Inter-Descriptor Field contains the next queue for SDS to post (PQ_ID1). It also contains MF[23:3] for MFA__1 and the Application Tag.

At 2503, PCS posts MFA__0 to PQ_ID0 (the queue ID of each flow is defined in the queue ID).

At 2504, SDS reads MFA__0 from queue PQ_ID0. When SDS sees MFA__0, it starts building the actual super descriptors, that is descriptor 1,2,3 and inter-descriptors 1,2,3 (MFA__1,2,3). The super descriptor is setup such that after one pass through engines processing descriptors 1, 2, and 3, the completion goes back for SDS. SDS then modifies the address of the next DDR buffer. It then re-posts the modified super descriptors again.

SDS posts MFA__1 to PQ_ID1. The descriptor is posted for BDMAv engine to read to fetch DDR buffer into GSM.

At 2505, BDMA reads MFA__1 from queue PQ_ID1. It checks whether the Fail bit in MFA is set to '0', if so, it performs the operation as indicated by the descriptor.

At 2505*a*, after BDMA moves data from DDR (A, B . . . H) to internal GSM, it starts to create MFA__2 for RAAE XOR engine:

These fields are copied from Inter-Descriptor Field 1 to MFA__2:

MF [23:3] field in Inter-Descriptor 0[20:0] to MF[23:3] in MFA[20:0]

Application Tag/IOST Tag[15:0] in Inter-Descriptor[63:48] to Application Tag/IOST Tag[15:0] in MFA[63:48]

IF PT=1, the in-line XOR Application Tag in Inter-Descriptor[47:32] to MFA[47:32]

At 2505*b*, these fields are copied from MFA__1 to MFA__2:
RAID Type in MFA__0[21] to RAID Type in MFA[21]
CRC (CRC Enable) in MFA__0[23] to CRC in MFA[23]
RAID Engine Num Enable in MFA__0[22] to RAID Engine Num Enable in MFA[22]

The Reserved Fields

At 2505*c*, these fields are updated by BDMA:

Fail bit: set to '0' when there is no error; set to '1' when error occurs

CRC Error: set to '0' when there is no CRC error; set to '1' when CRC error occurs Error Status: set to a value defined for BDMA If PT=0, and CRC Enable=1, BDMA writes the generated CRC in MFA[39:32]

If PT=0, and CRC Enable=0, BDMA writes 0x0000 in MFA[47:32]

At 2506, BDMA posts MFA__2 to PQ_ID2 which is read from Inter-Descriptor Field 1. These descriptors are posted for RAAE XOR engine to read At 2507, RAAE XOR reads MFA__2 from queue PQ_ID2. It checks whether the Fail bit in MFA is set to '0', if so, it performs the operation as indicated by the descriptor.

After RAAE finishes XOR with data, it starts to create MFA__3.

At 2507*a*, these fields copied from Inter-Descriptor Field 2 to MFA__3:

MF [23:3] field in Inter-Descriptor Field to MF[23:3] in MFA[20:0]

Application Tag/IOST Tag[15:0] in Inter-Descriptor [63:48] to Application Tag/IOST Tag [15:0] in MFA[63:48]

IF PT=1, the in-line XOR Application Tag in Inter-Descriptor [47:32] to MFA[47:32]

At 2507*b*, these fields are copied from MFA__2 to MFA__3:
RAID Type in MFA[21] to RAID Type in MFA[21]
CRC (CRC Enable) in MFA[23] to CRC in MFA[23]
RAID Engine Num Enable in MFA[22] to RAID Engine Num Enable in MFA[22]

The Reserved Fields

At 2507c, these fields are updated by RAAE:

Fail bit: set to '0' when there is no error; set to '1' when error occurs

Error Status: set to a value defined for BDMA

If PT=0, and CRC Enable=1, BDMA writes the generated CRC in MFA[39:32]

If PT=0, and CRC Enable=0, BDMA writes 0x0000 in MFA[47:32]

At 2508, RAAE posts MFA_3 and posts it to PQ_ID3 which is read from Inter-Descriptor Field. It to PQ_ID3 to write data back to DDR buffer I.

At 2509, BDMA reads MFA_3 from queue PQ_ID3. It checks whether the Fail bit in MFA is set to '0', if so, it performs the operation as indicated by the descriptor.

After BDMA moves data from internal GSM (XOR results—Parity) to DDR buffer I, it starts to creates MFA_4:

At 2509a, these fields are copied from Inter-Descriptor Field 3 to MFA_4:

MF [23:3] field in Inter-Descriptor [20:0] to MF [23:3] in MFA[20:0]

Application Tag/IOST Tag[15:0] in Inter-Descriptor[63:48] to Application Tag/IOST Tag[15:0] in MFA[63:48]

IF PT=1, the in-line XOR Application Tag in Inter-Descriptor[47:32] to MFA[47:32]

At 2509b, these fields are copied from MFA_3 to MFA_4:

RAID Type in MFA[21] to RAID Type in MFA[21]

CRC (CRC Enable) in MFA[23] to CRC in MFA[23]

RAID Engine Num Enable in MFA[22] to RAID Engine Num Enable in MFA[22]

The Reserved Fields

At 2509c, these fields are updated by BDMA:

Fail bit: set to '0' when there is no error; set to '1' when error occurs

CRC Error: set to '0' when there is no CRC error; set to '1' when CRC error occurs Error Status: set to a value defined for BDMA If PT=0, and CRC Enable=1, BDMA writes the generated CRC in MFA[39:32]

If PT=0, and CRC Enable=0, BDMA writes 0x0000 in MFA[47:32]

At 2510, BDMA posts MFA_4 to CQ1 for SDS to read.

At 2511, SDS reads MFA_4 from CQ1. It then modifies the fields for super descriptor 1 to 3 for processing next DDR buffer (B-H).

If MFA_4 contains completion for DDR buffer A-G, SDS writes MFA_1 to PQ_ID1 to continue the process.

At 2512, If MFA_4 contains completion for DDR buffer H (the last buffer), SDS writes MFA_0 to CQ2 for PCS to read. This indicates the whole data flow is finished. PCS only got interrupted once.

As indicated above, when 12 is finished, the Super Descriptor flow is considered to be finished for all strips. PCSv reads the completion queue and frees up the DRR frame buffers. Note that PCSv (the main processor) is interrupted only once in the whole data flow.

Error Recovery

As described above, the super descriptor data flows include a way to pass error information. Some of the goals of having error information in MFA are:

When an error occurs in an engine for a descriptor, it does not block an engine from processing further descriptors.

Error information should include which engine experiences the error.

If there are multiple errors, only the first one needs to be reported.

Detail error information is captured in each engine, as there are only 64 bits in the MFA.

Super Descriptor Initiators are responsible to hold on to the error information and send to firmware or host for further examination.

For OSSPv initiated data flows, when an error occurs, the IO needs to be aborted as soon as possible to avoid corrupting drive or host memory.

MFA is used for inter-engine communications. Error information is stored in an MFA and passed along to the data flow until it goes back to the initiator through the completion queue.

Figure 26:
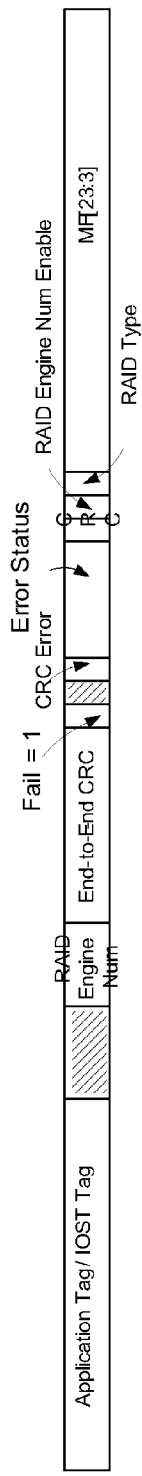
FIG. 26 shows an MFA with Fail bit set, according to embodiments of the present disclosure.

FIG. 26 shows an MFA with a Fail bit set.

Fail

In conjunction with the Error Status field, this bit is used for each engine to signify that whether a descriptor operation is carried out successfully. In various embodiments, operations are as follows:

1) When an engine first receives a MFA, it checks whether this bit is 1 or 0. If it is set to 0, it means that the previous engine has successfully completed the operation. If this is 1, the engine should leave the Fail, CRC Error and Error Status [4:0] as is, and writes back the MFA to the completion queue.

2) If the received MFA has the Fail bit set to '0', the engine operates on the MFA. If there is any error, the engine asserts the Fail bit and sets the Error Status and CRC Error accordingly.

Error Status [4:0]

This field is returned by individual engines. In various embodiments, Fail is set to '1' if Error Status is non-zero.

0x00: No Error

0x01-0x4: OSSPv

0x05-0x8: eRAAE

0x09-0xC: BDMAv

0x0D-0x0F: Decompressor

0x10-0x1F: Reserved

When error is detected from an engine, for example when an DMA transfer is unsuccessful, the error information is captured in the MFA. Fail bit is set in MFA, which is then passed to the downstream engines as normal data flow does. When downstream engines detect that MFA fail bit is set, it bypasses its operations and passes the MFA to the next engine. Eventually, the errored MFA reaches back the initiator and the error is reported back to on-chip firmware for further processing.

Figure 27:
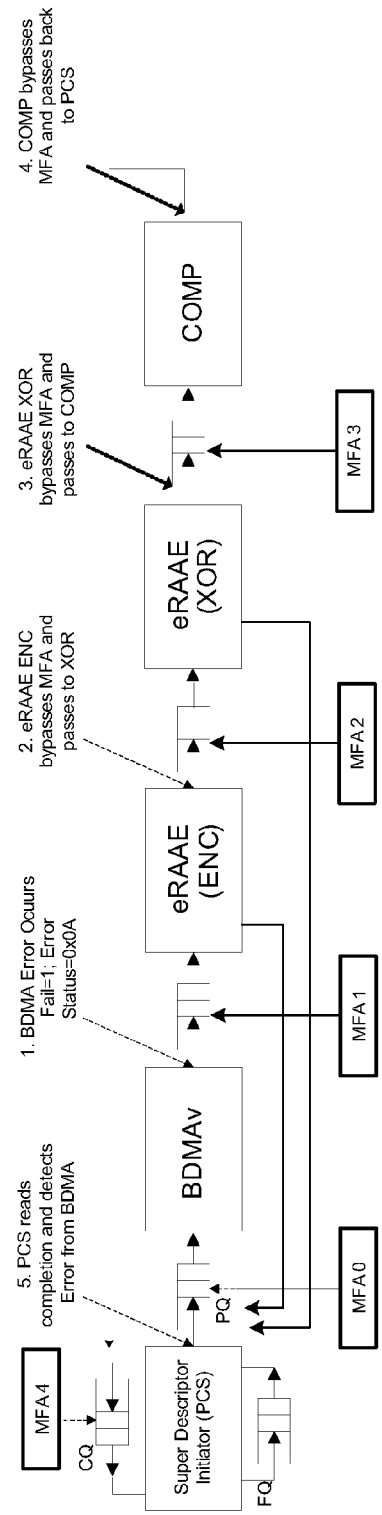
FIG. 27 shows a Super Descriptor flow with BDMA error, according to embodiments of the present disclosure.

FIG. 27 shows a Super Descriptor Flow with BDMA Error.

Flexibility of Adding and Removing Engines

Figure 28:
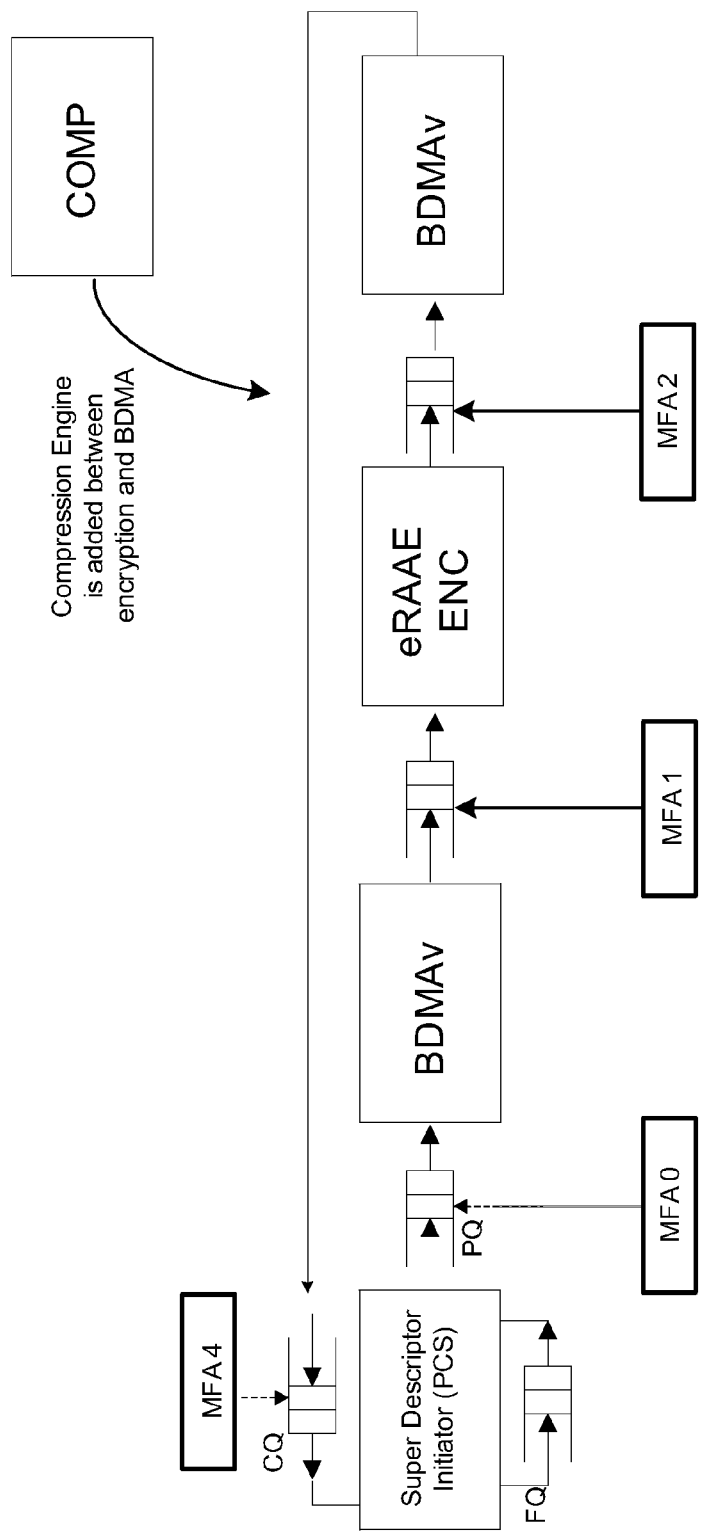
FIG. 28 shows adding compression engine to encryption data flow, according to embodiments of the present disclosure.
Figure 29:
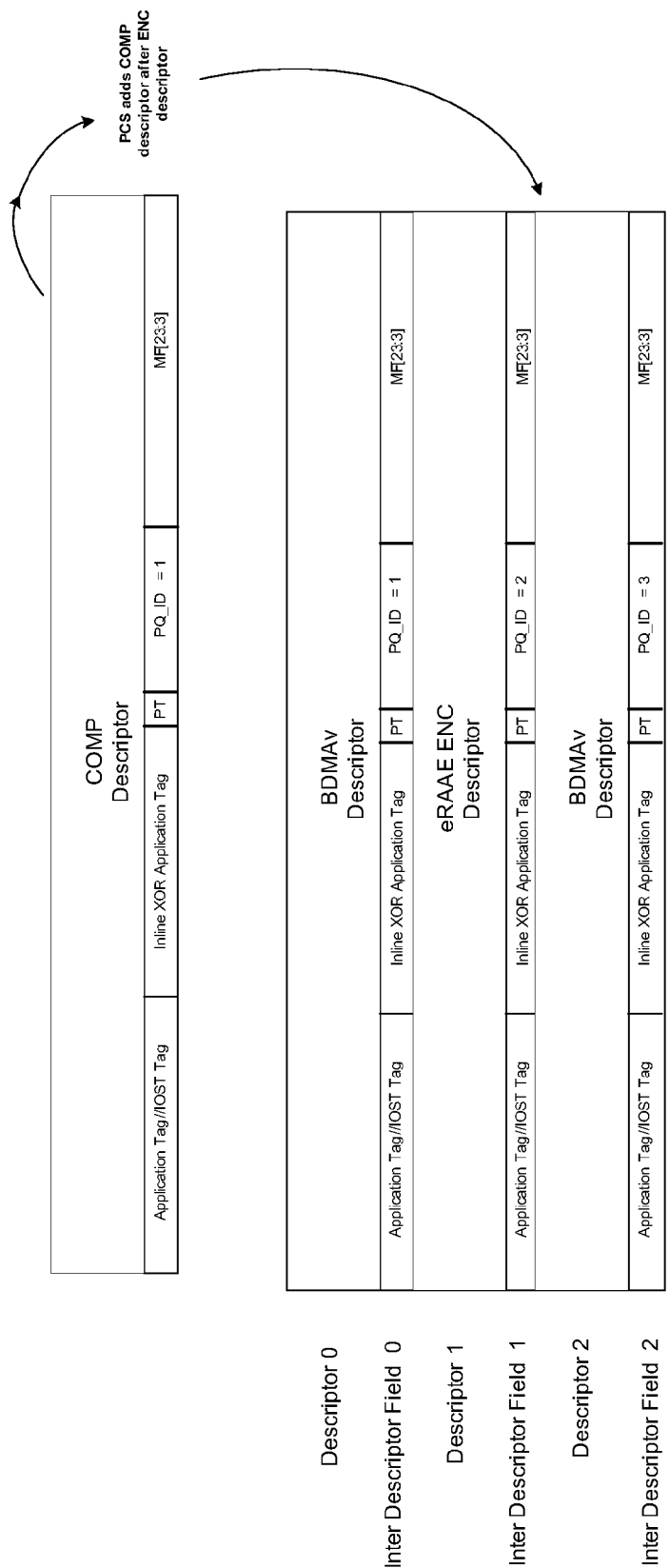
FIG. 29 shows adding compression engine descriptor to encryption data flow, according to embodiments of the present disclosure.

One of the advantages of having the super descriptor data flows is that when architecture of the controller and features it supported are changed, the data flows can be modified without impacting individual engines. The importance of having the descriptor format and hence functionality of each engine intact is important from a design re-use perspective. When a new controller is built, functionality can easily be added or removed without opening up all the blocks in the data flows. FIG. 28 and FIG. 29 show an example of adding an engine in the encryption data flow.

The present disclosure introduces a new way of doing RAID or storage controller. The descriptor chaining architecture provides a flexible way to configure the controller to carry out various functionalities. Various modifications and applications may occur to those familiar with the subject without departing the true spirit and scope the invention.

As will be apparent, the present disclosure directly impacts the SAS RAID controller architecture within the server and external storage RAID controller market. Given the competitiveness in this space, having a high performance and flexible architecture is beneficial. Considering the high attach rate of RAID controller in high volume server market, this invention could directly affect how every server in the world is built.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of chaining a plurality of engines for a system on chip (SOC) controller device, the method comprising:
   generating, at an initiator, a super-descriptor for providing instructions to the plurality of engines of the SOC controller;
   passing the super-descriptor from the initiator to a first engine of the plurality of engines; and
   executing a portion of the super-descriptor at each of the plurality of engines in series without the intervention of the initiator.

2. The method of claim 1, wherein the initiator comprises a hardware block.

3. The SOC controller device of claim 1, wherein the initiator comprises a processor.

4. The SOC controller device of claim 3, wherein the processor includes firmware.

5. The method of claim 1, further comprising passing the super-descriptor between each engine of the plurality of engines in series.

6. The method of claim 1, wherein the first engine passes the super-descriptor to a second engine by writing a pointer to a queue in a global shared memory, the queue corresponding the second engine, the pointer pointing to the super-descriptor.

7. The method of claim 1, wherein the super-descriptor comprises a plurality of descriptors, each descriptor comprising instructions for at least one of the engines of the plurality of engines.

8. The method of claim 1, wherein the super-descriptor specifies a loop in which the super-descriptor is passed to at least one of the engines of the plurality of engines at least twice.

9. The method of claim 1, wherein the SOC controller device comprises a RAID controller.

10. The method of claim 1, wherein the SOC controller device comprises a host bus adapter.

11. A system on chip (SOC) controller device, comprising:
    a plurality of engines, for carrying out the operations specified by a super descriptor; and
    an initiator configured to:
    generate a super-descriptor for providing instructions to the plurality of engines, the super descriptor specifying a series of operations to be carried out by the plurality of engines without the intervention of the initiator; and
    pass the super-descriptor to a first engine of the plurality of engines.

12. The SOC controller device of claim 11, wherein the initiator comprises a hardware block.

13. The SOC controller device of claim 11, wherein the initiator comprises a processor.

14. The SOC controller device of claim 13, wherein the processor includes firmware.

15. The SOC controller device of claim 11, wherein the plurality of engines are configured to pass the super-descriptor between each other in series.

16. The SOC controller device of claim 11, further comprising a global shared memory; wherein the first engine passes the super-descriptor to a second engine by writing a pointer to a queue in the global shared memory, the queue corresponding the second engine, the pointer pointing to the super-descriptor.

17. The SOC controller device of claim 11, wherein the super-descriptor comprises a plurality of descriptors, each descriptor comprising instructions for at least one of the engines of the plurality of engines.

18. The SOC controller device of claim 11, wherein the super-descriptor specifies a loop in which the super-descriptor is passed to at least one of the engines of the plurality of engines at least twice.

19. The SOC controller device of claim 11, wherein the SOC controller device comprises a RAID controller.

20. The SOC controller device of claim 11, wherein the SOC controller device comprises a host bus adapter.

* * * * *